United States Patent
Santamarina et al.

(10) Patent No.: US 10,150,205 B2
(45) Date of Patent: Dec. 11, 2018

(54) FASTENING TOOLS WITH FLOATING MAGNET SLEEVES

(71) Applicant: BLACK & DECKER INC., New Britain, CT (US)

(72) Inventors: Aland Santamarina, Columbia, MD (US); Michael P. Peters, Lutherville, MD (US); Mark E. Brunson, Bel Air, MD (US); Darren B. Moss, York, PA (US); David B. Lee, Baltimore, MD (US); Ruth E. Mitchener Keffer, Baltimore, MD (US); Denny Jiang, Jiangsu (CN); Michael Huang, Jiangsu (CN)

(73) Assignee: BLACK & DECKER INC., New Britain, CT (US)

( * ) Notice: Subject to any disclaimer, the term of this patent is extended or adjusted under 35 U.S.C. 154(b) by 157 days.

(21) Appl. No.: 15/296,546

(22) Filed: Oct. 18, 2016

(65) Prior Publication Data

US 2017/0036329 A1    Feb. 9, 2017

Related U.S. Application Data

(63) Continuation-in-part of application No. 14/837,105, filed on Aug. 27, 2015, now Pat. No. 10,040,179, and
(Continued)

(30) Foreign Application Priority Data

Aug. 15, 2014 (CN) .................. 2014 2 0463546 U
Aug. 15, 2014 (TW) ........................ 103214649 U

(51) Int. Cl.
*B25B 23/00* (2006.01)
*B23B 31/107* (2006.01)
*B25B 23/12* (2006.01)

(52) U.S. Cl.
CPC ...... *B25B 23/0035* (2013.01); *B23B 31/1071* (2013.01); *B23B 31/1074* (2013.01);
(Continued)

(58) Field of Classification Search
CPC ... B25B 15/004; B25B 15/002; B25B 15/001; B25B 15/00; B25B 15/007;
(Continued)

(56) References Cited

U.S. PATENT DOCUMENTS 1,119,276 A    12/1914   Griffith et al.
1,124,981 A    1/1915    Weaver
(Continued)

FOREIGN PATENT DOCUMENTS

CN    202528113 U    11/2012
DE    2934428 A1    3/1981
(Continued)

OTHER PUBLICATIONS

Screen shots of a bit holder with a floating ring magnet (2 pages)—date unknown.
(Continued)

*Primary Examiner* — David B Thomas
(74) *Attorney, Agent, or Firm* — Scott B. Markow

(57) ABSTRACT

A fastener driving tool includes a shaft with a working region disposed at a first end of the shaft and configured to drive a fastener, a shank portion disposed proximate a second end of the shaft and configured to couple the shaft to a power tool, and a reduced diameter torsion zone disposed between the shank portion and the working region, the torsion zone extending from a first shoulder closer to the working region to a second shoulder closer to the shank portion. A length (L) and a radius (c) of the torsion zone have been optimized so that approximately half of breakages
(Continued)

occur in the working region and approximately half of breakages occur in the torsion zone.

20 Claims, 42 Drawing Sheets

Related U.S. Application Data a continuation-in-part of application No. 14/817,323, filed on Aug. 4, 2015, now Pat. No. 9,943,946, which is a continuation-in-part of application No. 14/285,799, filed on May 23, 2014, now Pat. No. 9,505,108, which is a continuation-in-part of application No. 13/967,775, filed on Aug. 15, 2013, now Pat. No. 9,227,309, which is a continuation-in-part of application No. 13/766,135, filed on Feb. 13, 2013, now Pat. No. 9,156,147.

(60) Provisional application No. 62/249,403, filed on Nov. 2, 2015, provisional application No. 61/599,222, filed on Feb. 15, 2012.

(52) U.S. Cl.
CPC .......... *B25B 23/12* (2013.01); *B23B 2260/10* (2013.01); *Y10T 279/17411* (2015.01); *Y10T 279/17752* (2015.01); *Y10T 279/17794* (2015.01); *Y10T 279/17811* (2015.01); *Y10T 279/32* (2015.01)

(58) Field of Classification Search
CPC ... B25B 15/005; B25B 23/0035; B25B 23/12; B23B 31/1071; B23B 31/1074
See application file for complete search history.

(56) References Cited

U.S. PATENT DOCUMENTS

| | | |
|---|---|---|
| 1,138,465 A | 5/1915 | Fegley et al. |
| 1,656,450 A | 2/1925 | Steuer |
| 1,860,998 A | 5/1932 | Drazick |
| 2,101,347 A | 12/1937 | Robinette |
| 2,348,611 A | 5/1944 | Davidson |
| 2,409,899 A | 10/1946 | Resina |
| 2,622,217 A | 9/1950 | Fischer et al. |
| 2,524,095 A | 10/1950 | Williams |
| 2,671,484 A | 3/1954 | Clark |
| 2,677,294 A | 5/1954 | Clark |
| 2,762,408 A | 9/1956 | Baldwin |
| 2,933,114 A | 4/1960 | Bystrom |
| 3,007,504 A | 11/1961 | Clark |
| 3,019,027 A | 1/1962 | Klein et al. |
| 3,398,965 A | 8/1968 | Cox |
| 3,436,086 A | 4/1969 | Glenzer |
| 3,604,488 A | 9/1971 | Wishart |
| 3,707,894 A | 1/1973 | Stillwagon, Jr. |
| 3,726,533 A | 4/1973 | Lafferty, Sr. |
| 3,742,666 A | 7/1973 | Amos |
| 3,767,218 A | 10/1973 | Linthicum et al. |
| 3,788,658 A | 1/1974 | Benjamin et al. |
| 3,901,298 A | 8/1975 | Eby |
| 3,929,343 A | 12/1975 | Wanner et al. |
| 4,184,692 A | 1/1980 | Benson et al. |
| 4,309,042 A | 1/1982 | Fauth et al. |
| 4,317,578 A | 3/1982 | Welch |
| 4,577,875 A | 3/1986 | Miyakawa |
| 4,588,335 A | 5/1986 | Pearson, Jr. |
| 4,629,375 A | 12/1986 | Lieser |
| 4,669,932 A | 6/1987 | Hartley |
| 4,692,073 A | 9/1987 | Martindell |
| 4,787,278 A | 11/1988 | Bononi |
| 4,824,298 A | 4/1989 | Lippacher et al. |
| 4,858,939 A | 8/1989 | Riggs |
| 5,012,708 A | 5/1991 | Martindell |
| 5,013,194 A | 5/1991 | Wienhold |
| 5,058,387 A | 10/1991 | Cook |
| 5,062,749 A | 11/1991 | Sheets |
| 5,152,642 A | 10/1992 | Pitts et al. |
| 5,182,973 A | 2/1993 | Martindell |
| 5,188,378 A | 2/1993 | Erlenkeuser |
| 5,284,069 A | 2/1994 | Wellman |
| 5,385,420 A | 1/1995 | Newman, Sr. et al. |
| 5,398,946 A | 3/1995 | Quiring |
| 5,704,261 A | 1/1998 | Strauch et al. |
| 5,709,391 A | 1/1998 | Arakawa et al. |
| 5,709,393 A | 1/1998 | Von Keudell et al. |
| 5,724,872 A | 3/1998 | Shih |
| 5,724,873 A | 3/1998 | Hillinger |
| 5,868,047 A | 2/1999 | Faust et al. |
| 5,934,384 A | 8/1999 | Wang |
| 5,951,024 A | 9/1999 | Montjoy et al. |
| 5,988,957 A | 11/1999 | Wheeler |
| 5,992,274 A | 11/1999 | Lammers |
| 5,996,452 A | 12/1999 | Chiang |
| 6,053,675 A | 4/2000 | Holland et al. |
| 6,059,296 A | 5/2000 | Baeder |
| 6,074,140 A | 6/2000 | Cook |
| 6,082,233 A | 7/2000 | Han |
| RE36,797 E | 8/2000 | Eggert et al. |
| 6,126,370 A | 10/2000 | Wheeler |
| 6,148,699 A | 11/2000 | Han |
| 6,154,108 A | 11/2000 | Huang |
| 6,199,872 B1 | 3/2001 | Hasan |
| 6,209,426 B1 | 4/2001 | Takahashi |
| 6,224,303 B1 | 5/2001 | Wheeler et al. |
| 6,261,035 B1 | 7/2001 | Moores, Jr. et al. |
| 6,270,085 B1 | 8/2001 | Chen et al. |
| 6,311,989 B1 | 11/2001 | Rosanwo |
| 6,325,393 B1 | 12/2001 | Chen et al. |
| 6,341,926 B1 | 1/2002 | Liu |
| 6,343,901 B2 | 2/2002 | Wheeler et al. |
| 6,345,560 B1 | 2/2002 | Strauch et al. |
| 6,354,177 B2 | 3/2002 | Peters |
| 6,382,636 B1 | 5/2002 | Walker |
| 6,390,739 B1 | 5/2002 | O'Banion |
| 6,457,916 B2 | 10/2002 | Wienhold |
| 6,464,234 B2 | 10/2002 | Frauhammer et al. |
| 6,530,299 B1 | 3/2003 | Liu |
| 6,543,959 B1 | 4/2003 | Jore |
| 6,622,597 B2 | 9/2003 | Chen |
| 6,637,755 B2 | 10/2003 | Chen et al. |
| 6,651,990 B2 | 11/2003 | Higasi et al. |
| 6,666,114 B1 | 12/2003 | Lin |
| 6,684,740 B2 | 2/2004 | Lin |
| 6,695,321 B2 | 2/2004 | Bedi et al. |
| 6,698,319 B2 | 3/2004 | Huang |
| 6,722,667 B2 | 4/2004 | Cantlon |
| 6,834,864 B2 | 12/2004 | Girardeau |
| 6,840,143 B1 | 1/2005 | Lin |
| 6,860,489 B2 | 3/2005 | Chen |
| 6,863,280 B2 | 3/2005 | Chiu |
| 6,902,358 B2 | 6/2005 | Thomas |
| RE38,778 E | 8/2005 | Eggert et al. |
| 6,929,266 B2 | 8/2005 | Peters et al. |
| 6,931,967 B1 | 8/2005 | Chang |
| 6,973,858 B2 | 12/2005 | Huang |
| 6,986,517 B2 | 1/2006 | Lin |
| 7,063,332 B2 | 6/2006 | Mueller |
| 7,086,813 B1 | 8/2006 | Boyle et al. |
| 7,096,768 B1 | 8/2006 | Chen |
| 7,107,882 B1 | 9/2006 | Chang |
| 7,124,665 B1 | 10/2006 | Chen |
| 7,131,358 B2 | 11/2006 | Hsien |
| 7,159,493 B1 | 1/2007 | Huang |
| 7,214,009 B2 | 5/2007 | Quanz |
| 7,222,862 B2 | 5/2007 | Buchholz et al. |
| 7,250,023 B2 | 7/2007 | Bai |
| 7,261,023 B2 | 8/2007 | Taguchi |
| 7,278,342 B1 | 10/2007 | Chang |
| 7,284,936 B1 | 10/2007 | Rinner |
| 7,287,449 B2 | 10/2007 | Abel et al. |
| 7,290,470 B1 | 11/2007 | Peters |

(56) References Cited

U.S. PATENT DOCUMENTS

| | | |
|---|---|---|
| 7,306,396 B1 | 12/2007 | Chen |
| 7,308,948 B2 | 12/2007 | Furuta |
| 7,316,404 B1 | 1/2008 | Walker |
| 7,380,612 B2 | 6/2008 | Furuta |
| 7,380,613 B2 | 6/2008 | Furuta |
| 7,387,051 B1 | 6/2008 | Chiang |
| 7,387,054 B2 | 6/2008 | Rajotte |
| 7,424,841 B2 | 9/2008 | Liu |
| 7,469,909 B2 | 12/2008 | Strauch et al. |
| D589,319 S | 3/2009 | Peters |
| 7,565,854 B2 | 7/2009 | Chiang et al. |
| 7,574,946 B1 | 8/2009 | Chiang |
| 7,597,031 B2 | 10/2009 | Chiang |
| 7,669,860 B2 | 3/2010 | Chiang |
| D615,380 S | 5/2010 | Su |
| 7,726,664 B2 | 6/2010 | Peters |
| 7,735,400 B2 | 6/2010 | Chen |
| 7,779,734 B2 | 8/2010 | Nichols, Jr. |
| D623,036 S | 9/2010 | DeBaker |
| D624,383 S | 9/2010 | Hsu |
| D627,205 S | 11/2010 | Hsu |
| 7,823,890 B2 | 11/2010 | Chen |
| D631,723 S | 2/2011 | DeBaker |
| 7,896,357 B2 | 3/2011 | Peters |
| 7,913,592 B2 | 3/2011 | Hu |
| 7,922,180 B2 | 4/2011 | Meng |
| 7,942,426 B2 | 5/2011 | Peters |
| D644,903 S | 9/2011 | Chen |
| D646,138 S | 10/2011 | Hsu |
| D646,139 S | 10/2011 | Hsu |
| D646,547 S | 10/2011 | DeBaker |
| D653,096 S | 1/2012 | Lucio et al. |
| D653,517 S | 2/2012 | Lucio et al. |
| D658,465 S | 5/2012 | Hsu |
| 8,166,851 B2 | 5/2012 | Pohola et al. |
| 8,172,236 B2 | 5/2012 | Shibata |
| 8,176,817 B2 | 5/2012 | Liu |
| D662,802 S | 7/2012 | DeBaker |
| D663,186 S | 7/2012 | Hsu |
| D663,187 S | 7/2012 | DeBaker |
| 8,262,097 B2 | 9/2012 | Lai |
| 8,366,120 B2 | 2/2013 | Hu |
| 8,413,996 B2 | 4/2013 | Hu |
| 8,418,587 B2 | 4/2013 | DeBaker |
| 8,493,931 B1 | 7/2013 | Nix |
| 8,771,091 B1* | 7/2014 | Lin ............... B25B 15/001 403/383 |
| 8,800,407 B2* | 8/2014 | DeBaker ......... B25B 15/002 76/101.1 |
| 9,132,534 B2* | 9/2015 | Lai ................. B25B 15/005 |
| 9,849,570 B2* | 12/2017 | DeBaker .......... B25B 15/004 |
| 2002/0166421 A1 | 11/2002 | Bowerman |
| 2003/0025326 A1 | 2/2003 | Schulte |
| 2003/0145693 A1 | 8/2003 | Huang |
| 2004/0093997 A1 | 5/2004 | Huang |
| 2004/0164503 A1 | 8/2004 | Fan-Chiang et al. |
| 2004/0232631 A1 | 11/2004 | Chen et al. |
| 2005/0098002 A1 | 5/2005 | Holland-Letz |
| 2005/0166725 A1 | 8/2005 | Chen |
| 2006/0027057 A1 | 2/2006 | Hsien |
| 2006/0107801 A1 | 5/2006 | Hsien |
| 2006/0111723 A1 | 5/2006 | Chapolini et al. |
| 2006/0123957 A1 | 6/2006 | Hsien |
| 2007/0234856 A1 | 10/2007 | Liu |
| 2008/0184853 A1 | 8/2008 | Chen |
| 2008/0184854 A1 | 8/2008 | Peters |
| 2008/0216618 A1 | 9/2008 | Chen |
| 2009/0107304 A1 | 4/2009 | Chiang et al. |
| 2009/0139378 A1 | 6/2009 | Chiang et al. |
| 2009/0139379 A1 | 6/2009 | Chiang et al. |
| 2009/0165606 A1 | 7/2009 | Hsien |
| 2009/0174157 A1 | 7/2009 | Chang |
| 2009/0288525 A1 | 11/2009 | Chen |
| 2009/0314143 A1 | 12/2009 | Chen |
| 2010/0011918 A1 | 1/2010 | Ray |
| 2010/0133762 A1 | 6/2010 | Peters |
| 2010/0294092 A1 | 11/2010 | Hu |
| 2010/0307298 A1 | 12/2010 | Lai |
| 2011/0017029 A1 | 1/2011 | Chen |
| 2011/0023666 A1 | 2/2011 | Hsu |
| 2011/0167966 A1 | 7/2011 | Liu |
| 2011/0197721 A1 | 8/2011 | DeBaker |
| 2011/0215538 A1 | 9/2011 | Cornwell et al. |
| 2011/0283842 A1 | 11/2011 | Lai |
| 2012/0126497 A1 | 5/2012 | Lin |
| 2012/0267865 A1 | 10/2012 | Hsu |
| 2012/0272795 A1 | 11/2012 | Chen |
| 2012/0275875 A1 | 11/2012 | Gischus et al. |
| 2013/0220086 A1 | 8/2013 | Peters et al. |
| 2013/0238276 A1 | 9/2013 | Vock et al. |
| 2013/0328276 A1 | 12/2013 | Moss et al. |
| 2014/0318328 A1* | 10/2014 | DeBaker ............... B25B 15/002 81/438 |
| 2014/0333037 A1 | 11/2014 | Peters |
| 2015/0196995 A1* | 7/2015 | Neitzell ............... B25B 15/002 81/436 |
| 2016/0195183 A1* | 7/2016 | Matsuda ............... F16H 7/0037 464/97 |
| 2016/0325411 A1* | 11/2016 | Wang .................... B25B 15/001 |

FOREIGN PATENT DOCUMENTS

| | | |
|---|---|---|
| DE | 3243389 A1 | 11/1982 |
| DE | 3907567 A1 | 9/1989 |
| DE | 4243650 A1 | 12/1992 |
| DE | 10148943 A1 | 11/2002 |
| DE | 202004004469 U1 | 5/2004 |
| DE | 202005013315 U1 | 10/2005 |
| DE | 102007012892 A1 | 12/2007 |
| DE | 202008003131 U1 | 9/2008 |
| DE | 102010016053 A1 | 2/2011 |
| DK | 200101378 A | 4/2002 |
| EP | 1878524 A2 | 1/2006 |
| EP | 1637285 A1 | 3/2006 |
| EP | 1637285 A1 | 3/2006 |
| EP | 2151304 B1 | 3/2013 |
| EP | 2628570 A2 | 8/2013 |
| FR | 2631275 A1 | 11/1989 |
| JP | 59-059278 U1 | 4/1984 |
| JP | 08-229840 | 10/1996 |
| JP | 2000024946 A | 1/2000 |
| JP | 2000127058 A | 5/2000 |
| JP | 2000296474 A | 10/2000 |
| JP | 2003311641 A | 11/2003 |
| JP | 2004106473 A | 4/2004 |
| WO | WO-1991010541 A1 | 7/1991 |
| WO | WO-2002022314 A1 | 3/2002 |
| WO | WO-2012110453 A1 | 8/2012 |

OTHER PUBLICATIONS

Three (3) photographs of Vessel 2H drill bit with floating magnet sleeve (with packaging)—date unknown.
New Product Ideas/Inventions: Twist-Lok Drill & Drive System—Mar. 1, 2007—5 pages.
English Translation of JP-S59059278.
Garella, Mario—European Search Report re: EP14180985—dated Sep. 8, 2015—8 pages—The Hague.
Mioc, Marius—Extended European Search Report re: related application No. EP16196701.3-2709—dated Mar. 3, 2017—9 pages—The Hague.
Pastramas, Nikolas—Extended European Search Report re: related patent application No. 13155401.6—dated Jan. 4, 2018—The Hague.

* cited by examiner

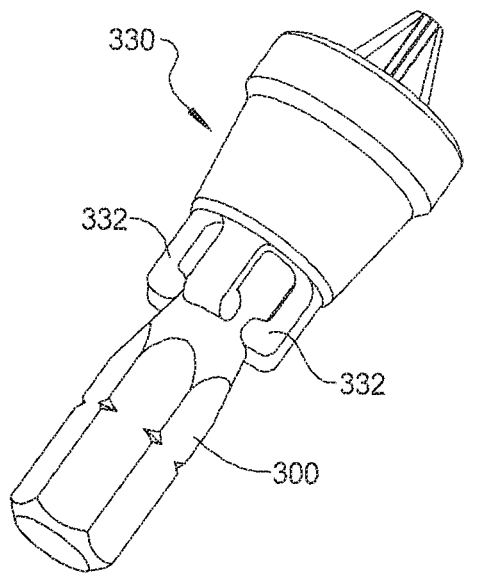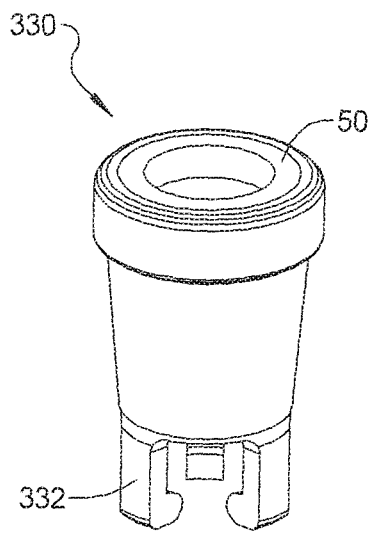
FIG 26
FIG 27
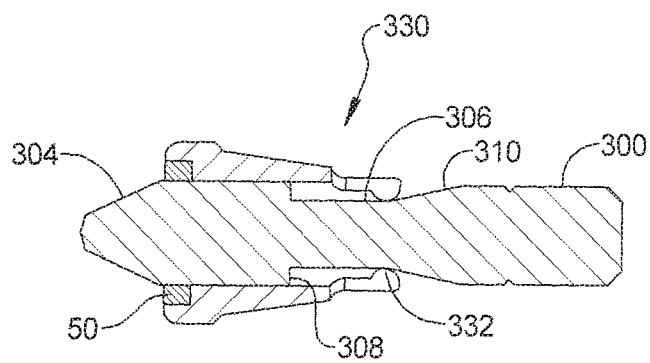
FIG 28
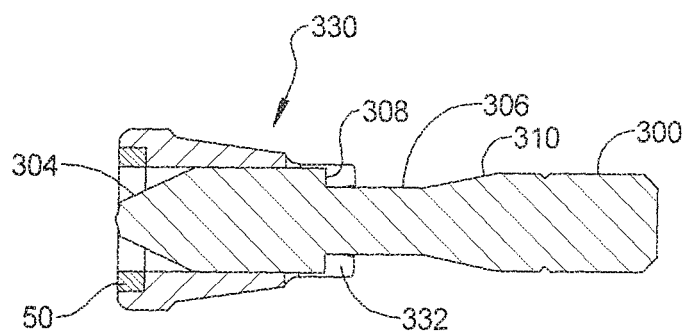
FIG 29

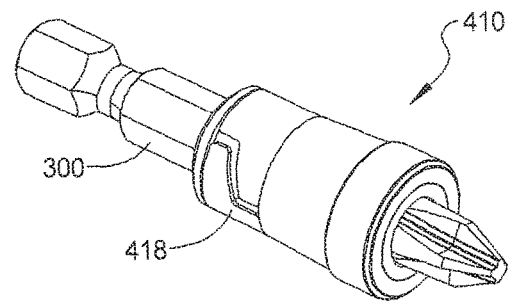
FIG 47
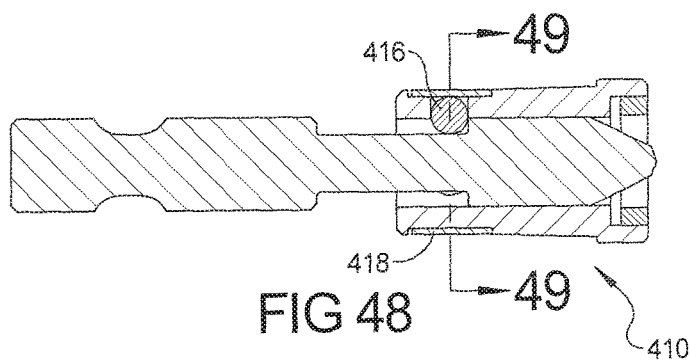 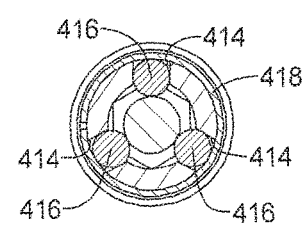
FIG 48     FIG 49
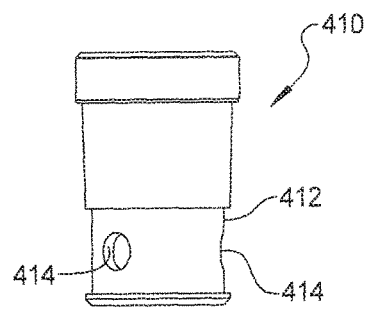 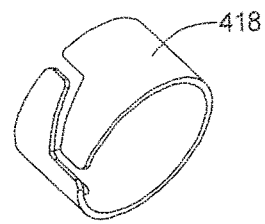
FIG 50     FIG 51

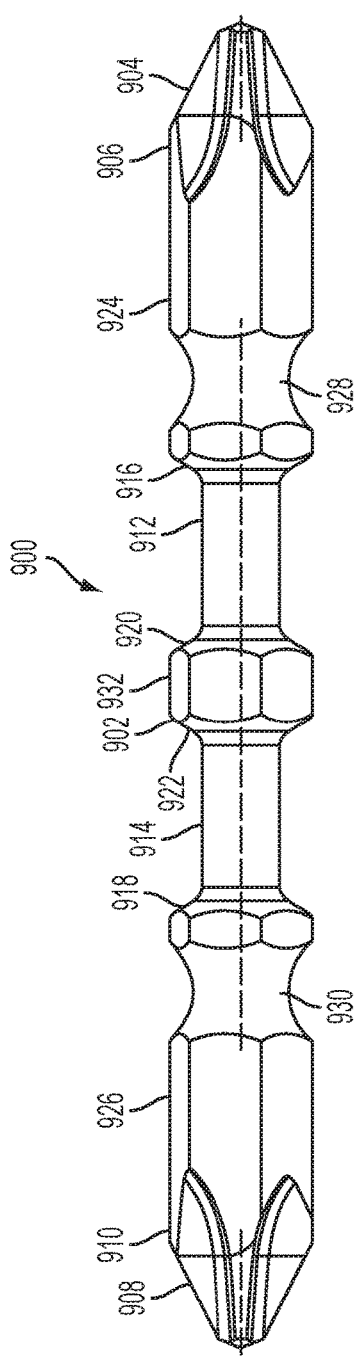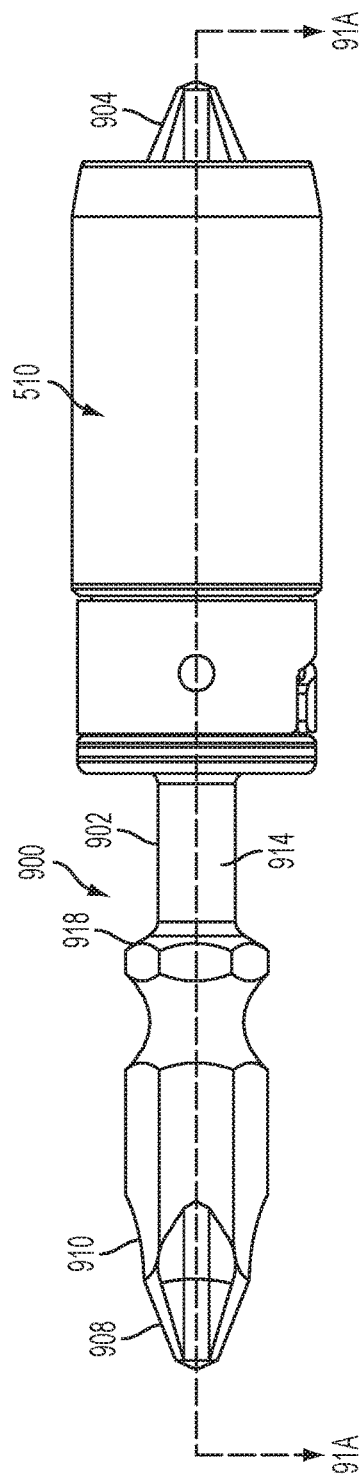

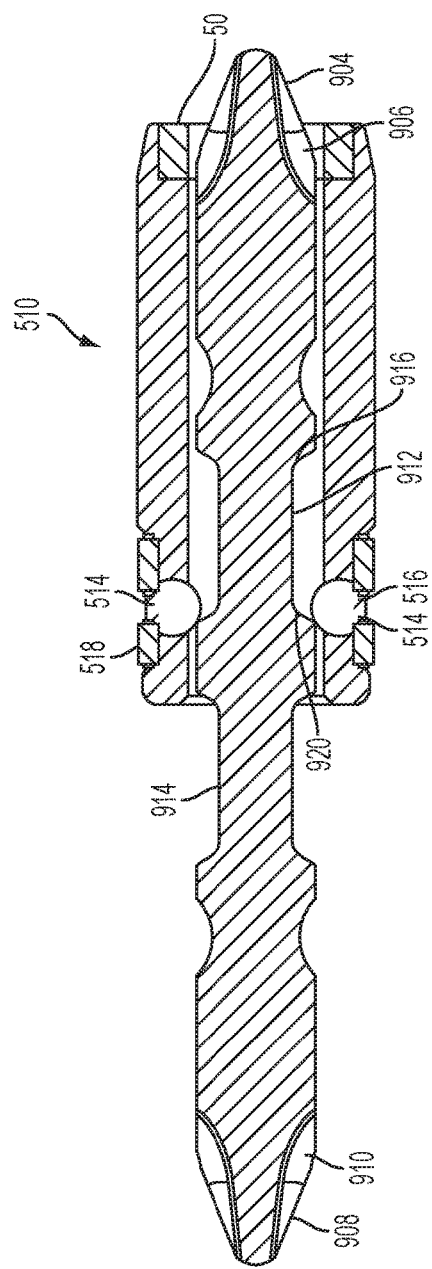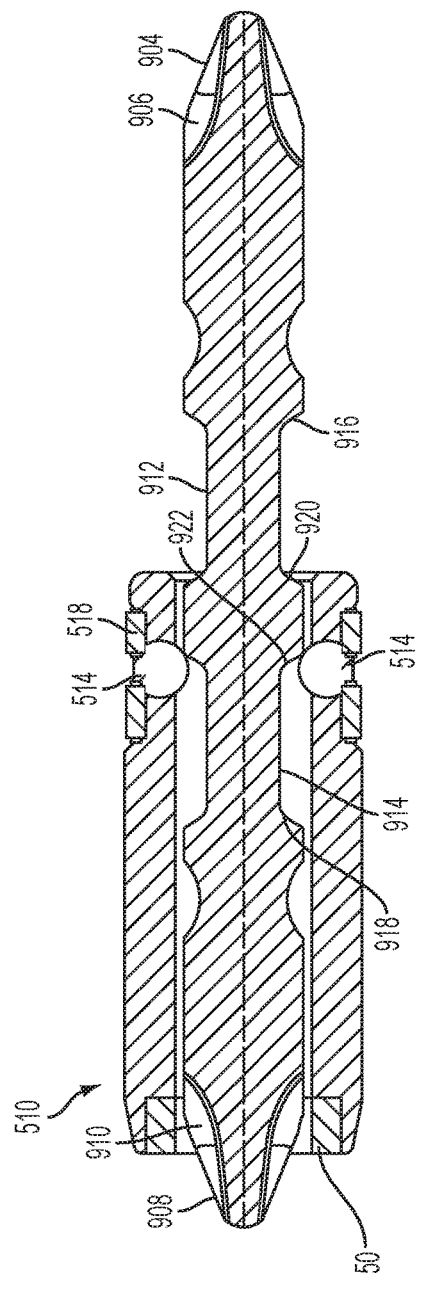
FIG. 91A
FIG. 91B

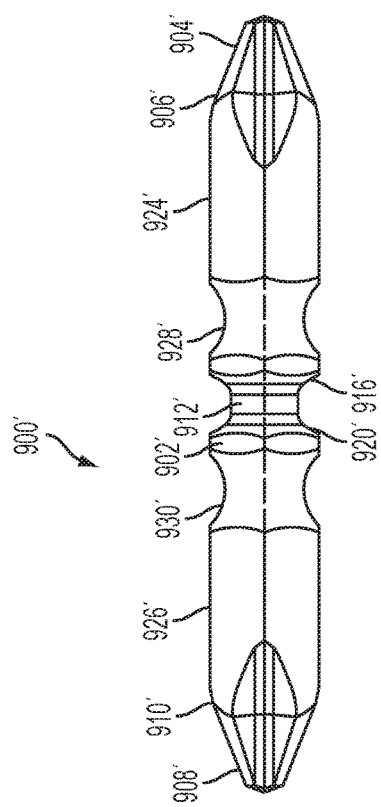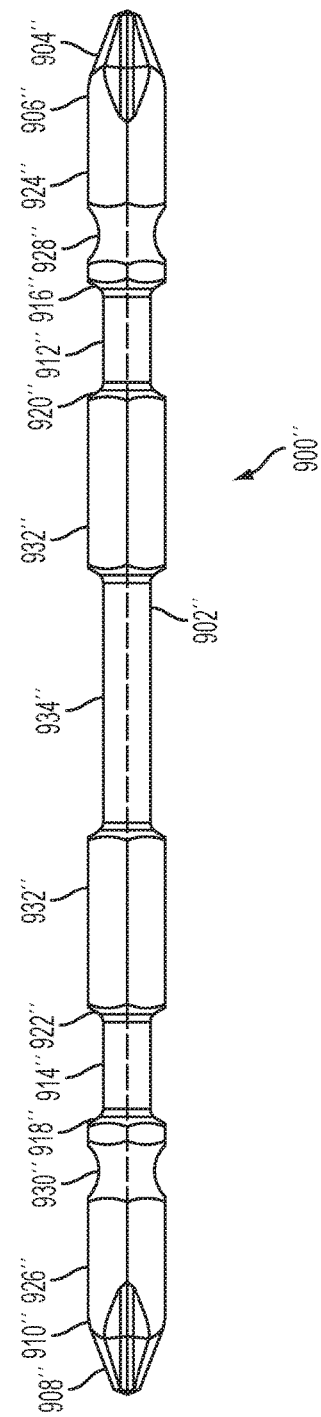

FASTENING TOOLS WITH FLOATING MAGNET SLEEVES

CROSS REFERENCE TO RELATED APPLICATIONS

This application claims priority, under 35 U.S.C. § 119(e) to U.S. Provisional Application No. 62/249,403, filed Nov. 2, 2015. This application is also a continuation-in-part of U.S. application Ser. No. 14/837,105, filed Aug. 27, 2015 (now pending) and is a continuation-in-part of U.S. application Ser. No. 14/817,323, filed Aug. 4, 2015 (now pending), which is a continuation-in-part of U.S. application Ser. No. 14/285,799, filed May 23, 2014 (now pending), which is a continuation-in-part of U.S. application Ser. No. 13/967,775, filed Aug. 15, 2013 (now U.S. Pat. No. 9,227,309), which is a continuation-in-part of U.S. application Ser. No. 13/766,135, filed Feb. 13, 2013 (now U.S. Pat. No. 9,156,147), which claims the benefit of U.S. Provisional Application No. 61/599,222, filed Feb. 15, 2012. This application also claims priority, under 35 U.S.C. § 119, to Taiwan Utility Model Application No. 103214649, filed Aug. 15, 2014 and Chinese Utility Model Application No. 201420463546.6, filed Aug. 15, 2014. The entire disclosures of the above applications are incorporated herein by reference.

TECHNICAL FIELD

The present disclosure relates to fastening tools, such as tool bits and tool bit holders, alone and with floating magnet sleeves.

BACKGROUND

This section provides background information related to the present disclosure which is not necessarily prior art.

Auxiliary chucks for power and hand tools have become increasingly common, especially as the need and desirability of wider versatility in the use of power tools and hand tools has increased. Such auxiliary chucks allow the hand or power tool to be used with any of a number of interchangeable bits. This, in turn, has resulted in demands for greater speed, convenience and ease of insertion and removal of tool bits from such chucks.

In one exemplary type of such conventional quick-release chucks, one or more detent balls are positioned within a hollow, barrel-shaped tool bit holder body and are resiliently biased into engagement with a circumferentially-extending groove or recess on the shank of the tool bit. An example of such a ball-type mechanism is disclosed in commonly assigned U.S. Pat. No. 5,988,957 which is herein incorporated by reference. In other conventional quick release chucks, a spring biased clip is used to engage the bit within the tool bit holder body. Examples of the spring biased clip design are disclosed in commonly assigned U.S. Pat. Nos. 7,086,813 and 6,929,266 which are herein incorporated by reference.

SUMMARY

This section provides a general summary of the disclosure, and is not a comprehensive disclosure of its full scope or all of its features.

In an aspect, a fastener driving tool includes a shaft with a working region disposed at a first end of the shaft and configured to drive a fastener, a shank portion disposed proximate a second end of the shaft and configured to couple the shaft to a power tool, and a reduced diameter torsion zone disposed between the shank portion and the working region, the torsion zone extending from a first shoulder closer to the working region to a second shoulder closer to the shank portion. A length (L) and a radius (c) of the torsion zone have been optimized so that approximately half of breakages occur in the working region and approximately half of breakages occur in the torsion zone.

Implementations of this aspect may include one or more of the following features. The length (L) and radius (c) may have been determined based on an equation $$\phi = T\left(\frac{2L}{\pi \cdot c^4}\right)\frac{1}{G}$$

where φ is an angle of twist, T is a torque input, and G is a shear modulus of the shaft. The working region may include one of a fastening bit tip and a holder for a fastening bit. The torsion zone may include a first reduced diameter torsion zone extending from the first shoulder to an intermediate shoulder between the first and second shoulders, and a second reduced diameter torsion zone extending from the intermediate shoulder to the second shoulder, the length (L) extending from the first shoulder to the second shoulder. Each of the first and second torsion zones may have the same radius (c). The first torsion zone may have a first length (L1) and the second torsion zone may have a second length (L2) that is equal to the first length (L1) or that is different from the first length (L1). A band may be around one of the first and second torsion zones.

A floating sleeve may have a radially inwardly projecting retention member and a magnet at a front end of the sleeve. The floating sleeve may be receivable over the shaft with the retention mechanism received in the torsion zone such that the floating sleeve may move axially between a forward position in which the magnet is proximate the working region and able to engage a fastener being driven by the working region and a rearward position in which the retention member abuts the second shoulder. The retention member may include one of an O-ring, a C-ring, a hog ring, a flexible finger, and a ball received in a window with a spring band biasing the ball radially inward.

In another aspect, a fastener driving tool may include a shaft with a first working region disposed at a first end of the shaft and configured to drive a fastener, a second portion disposed proximate a second end of the shaft and configured to couple the shaft to a power tool, and a reduced diameter torsion zone disposed between the second portion and the first working region. A floating sleeve may have a radially inwardly projecting retention member and a magnet at a front end of the sleeve. The floating sleeve may be receivable over the shaft with the retention mechanism may be received in the torsion zone such that the floating sleeve may move axially between a forward position in which the magnet is proximate the working region and able to engage a fastener being driven by the working region and a rearward position in which the magnet is retracted from the working region. A length (L) and a radius (c) of the torsion zone may have been optimized so that approximately half of breakages occur in the working region and approximately half of breakages occur in the torsion zone.

Implementations of this aspect may include one or more of the following features. The length (L) and radius (c) may have been determined based on an equation $$\phi = T\left(\frac{2L}{\pi \cdot c^4}\right)\frac{1}{G}$$

where φ is an angle of twist, T is a torque input, and G is a shear modulus of the shaft. The working region may include one of a fastening bit tip and a holder for a fastening bit. The torsion zone may include a first reduced diameter torsion zone extending from the first shoulder to an intermediate shoulder between the first and second shoulders, and a second reduced diameter torsion zone extending from the intermediate shoulder to the second shoulder, the length (L) extending from the first shoulder to the second shoulder. Each of the first and second torsion zones may have the same radius (c). The first torsion zone may have a first length (L1) and the second torsion zone may have a second length (L2) that is equal to the first length (L1) or that is different from the first length (L1). A band may be around one of the first and second torsion zones. A second working region may be disposed at the second end of the shaft and may be configured to drive a fastener, and the first end of the shaft may be further configured to couple the shaft to a power tool. The retention member may include one of an O-ring, a C-ring, a hog ring, a flexible finger, and a ball received in a window with a spring band biasing the ball radially inward.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 26 is a perspective view of the tool bit with a floating sleeve, according to the principles of the present disclosure;

FIG. 27 is a perspective view of the floating sleeve shown in FIG. 26;

FIG. 28 is a cross-sectional view of the tool bit and floating sleeve shown in FIG. 26;

FIG. 29 is a cross-sectional view similar to FIG. 28, with the floating sleeve in a forward position, according to the principles of the present disclosure;

FIG. 47 is a perspective view of a tool bit and alternative floating sleeve design according to the present disclosure;

FIG. 48 is a cross-sectional view of the tool bit and floating sleeve shown in FIG. 47;

FIG. 49 is a cross-sectional view taken along line 49-49 of FIG. 48;

FIG. 50 is a side plan view of the floating sleeve shown in FIG. 47;

FIG. 51 is a perspective view of a spring band utilized in the embodiment of FIG. 47;

FIG. 89 is a side view of a double ended tool bit for use with the floating magnet sleeve of FIG. 64.

FIG. 90 is a side view of the tool bit of FIG. 89 received in the floating magnet sleeve of FIG. 64.

FIGS. 91A and 91B are cross-sectional views of the tool bit of FIG. 89 with the floating magnet sleeve of FIG. 64 received over the first and second working regions of the tool bit.

FIG. 92. Is a side view of another embodiment of a double ended tool bit for use with the floating magnet sleeve of FIG. 64.

FIG. 93 is a side view of yet another embodiment of a double ended tool bit for use with the floating magnet sleeve of FIG. 64. Corresponding reference numerals indicate corresponding parts throughout the several views of the drawings.

DETAILED DESCRIPTION

Figure 1:
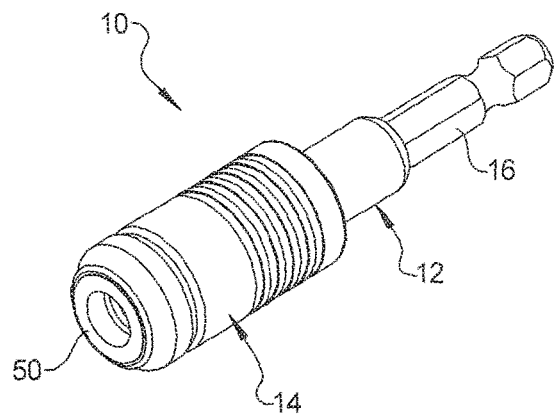
FIG. 1 is a perspective view of a bit holder assembly according to the principles of the present disclosure.

Corresponding reference numerals indicate corresponding parts throughout the several views of the drawings.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
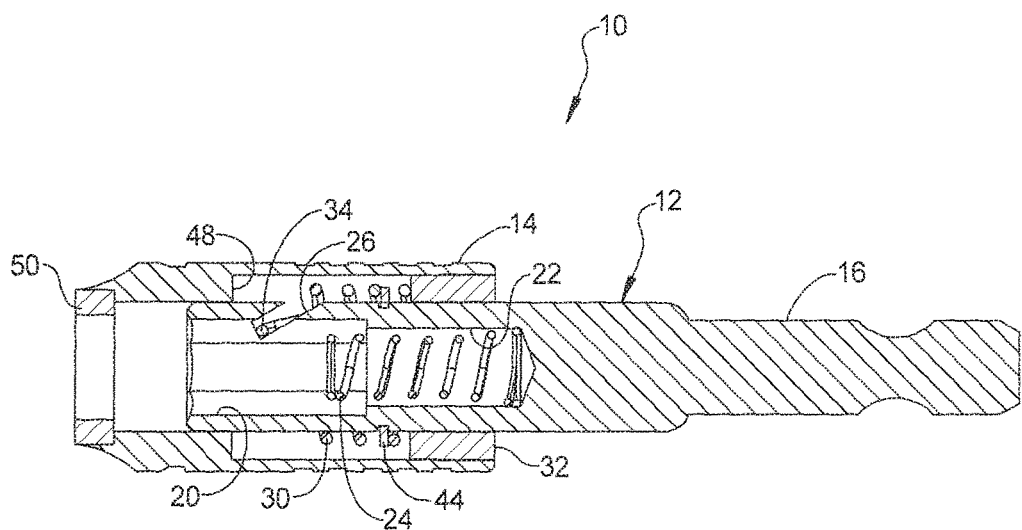
FIG. 2 is a longitudinal or axial cross-sectional view of the bit holder assembly of FIG. 1.

With reference to FIGS. 1-5, a first embodiment of the quick-change bit holder 10, according to the principles of the present disclosure, will now be described. The bit holder 10 includes a body 12 and retraction collar 14 slidably mounted on the body and retained in place by a sleeve bushing 32, as illustrated in FIG. 2. The body 12 can include a hex or polygonal-shaped shank 16 for mounting the bit holder 10 for rotation by a hand tool or a power tool.

With reference to FIG. 2, the body 12 also includes a hex or polygonal-shaped socket or bore 20 with the bore 20 opening axially outwardly toward the front or forward end of the bit holder 10. A plunger bore 22 extends axially from the hex-shaped socket or bore 20 toward the rear end of the bit holder assembly 10. Optionally, an ejection spring 24 can be disposed in the plunger bore 22. The body 12 includes an angular slot 26 formed transversely therein, with the slot 26 extending from the radially outer surface of the body 12 in an axially forward and radially inward direction to communicate with the interior of the hex bore or socket 20.

Figure 3:
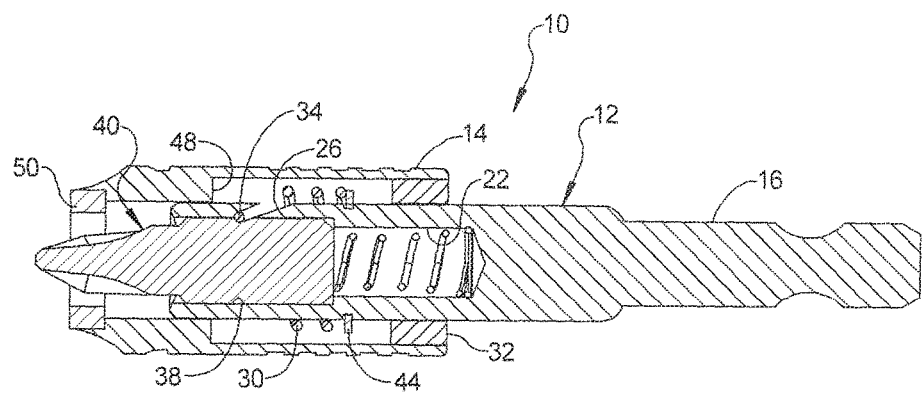
FIG. 3 is a longitudinal cross-sectional view similar to that of FIG. 2, but illustrating a tool bit fully inserted in the bit holder assembly.

A coil spring 30 surrounds a portion of the body 12 and is disposed between the body 12 and the retraction collar 14. The coil spring 30 abuttingly engages a clip 44 which is received in a groove around a mid-portion of the body 12 and terminates in an integrally formed clip 34 that is disposed in the angular slot 26 and is designed to releasably engage a recess 38 in a hex or polygonal-shaped bit tip 40 as illustrated in FIG. 3. An internal annular sleeve 32 attaches to the rear portion of the retraction collar 14. The sleeve 32 can be secured to the collar 14 by adhesive, a press fit, thermal bonding, fasteners, pins, or other known attachment techniques. Received in a groove around a mid-portion of the body 12 is a clip 44 that acts as a stop against the sleeve 32 to limit forward travel of the retractable collar 14. The retractable collar 14 includes a forward shoulder portion 48 that, when pulled rearward, can engage the spring 30 and pull the clip portion 34 of the spring 30 pulling it rearward out of engagement with a bit 40 received in the hex-shaped cavity 20.

The retractable collar 14 is of a non-magnetic material with the exception of a magnetic tip 50 that can be in the form of a ring magnet. Alternative magnetic arrangements can be used including multiple non-ring shaped magnets combined to form a ring-like shape mounted at the tip of the collar 14. Both faces and the internal bore of the magnet, however, may remain accessible.

Figure 4:
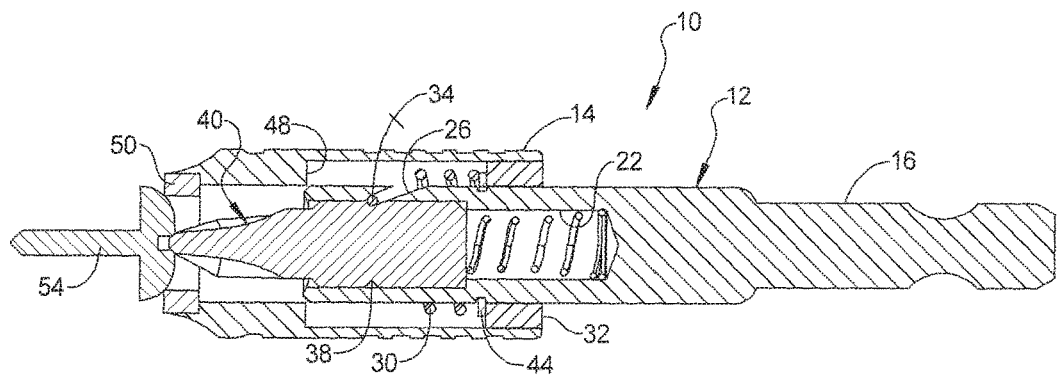
FIG. 4 is a longitudinal cross-sectional view similar to that of FIG. 3, but illustrating a fastener engaged with the tool bit and the retraction sleeve moved forward for magnetically engaging the fastener.

In operation, as shown in FIG. 2, the collar 14 starts in a neutral position with the collar biased forward and the spring clip 34 extending into the bore 20. Next, as shown in FIG. 3, a bit 40 is inserted into the bore 20 so that the spring clip 34 engages a notch 38 in the side of the bit 40 to prevent removal of the bit 40 from the bore 20. The bit 40 also compresses the ejection spring 24. The retraction collar 14 remains in the neutral position. Next, as shown in FIG. 4, when the bit 40 is used to drive a screw or fastener 54, the collar 14 floats as a result of the magnetic force radiating from the outer face to a forward position until the outer face of the magnet 50 reaches the fastener, enabling the outer face of the ring magnet 50 to magnetically adhere to the screw 54. This occurs before the bearing sleeve 32 engages the stop ring 44. The magnetic force, generating from the inner face of the magnet 50 by design, then draws the fastener 54 and the sleeve 14 jointly towards the body 12, the material of which it is made exhibiting magnet attractable properties resulting in holding the fastener 54 tight against the bit 40. The outer face of the magnet 50 also provides a stable surface to reduce movement of the fastener (wobble) during installation. The surface geometry of the face of the magnet 50 being such as to provide support to fasteners of multiple sizes, shapes, and configurations.

Figure 5:
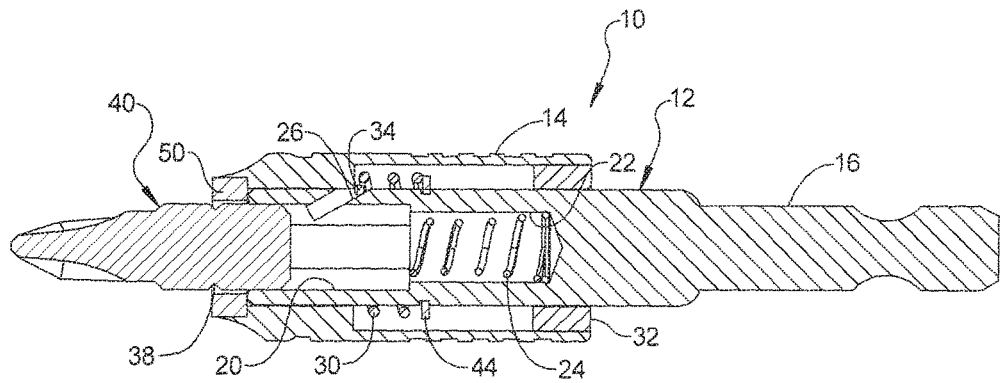
FIG. 5 is a longitudinal cross-sectional view similar to that of FIG. 2, but illustrating the retraction collar pulled rearward and the tool bit being removed from the bit holder assembly.

Next, as shown in FIG. 5, when the operation has finished and the user desires to remove the bit 40 from the bit holder 10, the user retracts the retraction collar 14 relative to the body 12, causing the spring 30 to compress, and the spring clip 34 to disengage from the bit 40, which allows the ejection spring 24 to attempt to eject the bit 40 from the holder 10. The ejection is, however, limited in movement to the point where the bit notch 38 is clear, and remains as such, of the clip 34 allowing for easy one handed removal, but not to the point where it leaves the bore 20. This controlled ejection is accomplished as a result of the magnetic field generating from the inner bore of the magnet 50 surrounding the bit 40.

Figure 6:
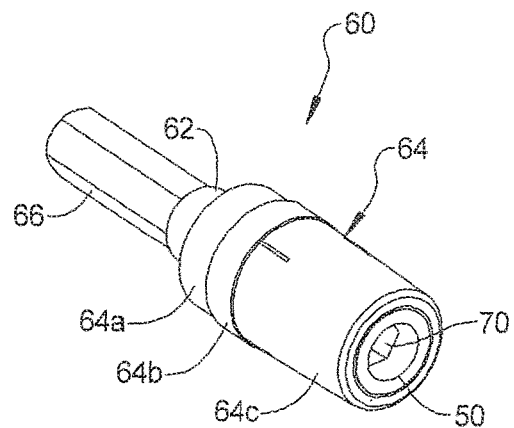
FIG. 6 is a perspective view of an alternative bit holder assembly according to the principles of the present disclosure.
Figure 7:
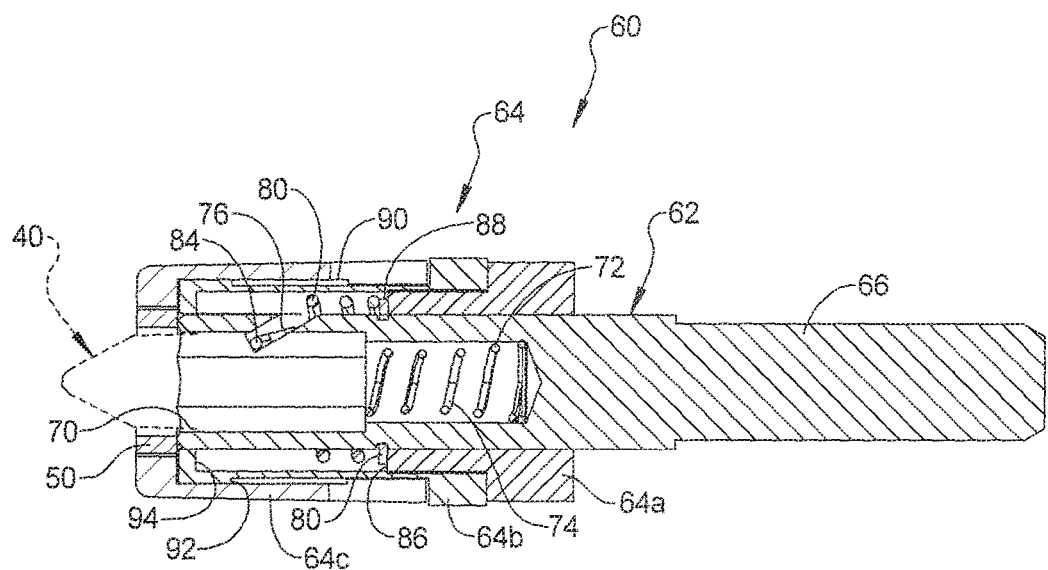
FIG. 7 is a longitudinal or axial cross-sectional view of the bit holder assembly of FIG. 6.

With reference to FIGS. 6 and 7, an alternative quick change bit holder 60, according to the present disclosure, will now be described. The bit holder 60 includes a body 62 and a retraction collar assembly 64 mounted thereon. The body 62 includes a hex shank 66 and a hex-shaped socket or bore 70 formed in the body 62, with the bore 70 opening axially outwardly toward the front or forward end of the bit holder assembly 60. A plunger bore 72 extends axially from the hex-shaped socket or bore 70 toward the rear end of the bit holder assembly 60. Optionally, an ejection spring 74 can be disposed in the plunger bore 72. The body 62 includes an angular slot 76 similar to the slot 26 as described above. A coil spring 80 having an integral spring dip 84 surrounds the body 62 and is disposed between the body and the clip 84 such that the spring clip 84 is disposed in the angular slot 76 for engaging a bit tip 40 in the manner as discussed above with regard to the previous embodiment.

The retraction collar assembly 64 includes a rear collar 64a, an intermediate collar 64b and a forward collar 64c. A retainer clip 86 is disposed in a recessed groove in the outer surface of the body 62 and is disposed against a forward facing shoulder 88 of the rearward collar 64a. The intermediate collar 64b is press fit onto the rearward collar 64a to trap the retainer clip 86 therebetween. A rearward facing shoulder 90 is provided in a forward direction from the spring 80 on the intermediate collar 64b. The forward collar 64c is slidably supported on a forward end of the intermediate collar 64b and includes a magnetic tip 50 in the form of a magnet ring. The forward collar 64c acts as a floating sleeve and includes a rearward shoulder portion 90 that engages a forward shoulder portion 92 of the intermediate collar 64b to limit the forward travel of the forward collar 64c. The rear end of the forward collar 64c can be stretched over the forward end of the intermediate collar 64b to complete the collar assembly 64. Slots can be provided in the rear end of the forward collar 64c to facilitate assembly on the intermediate collar 64b. Alternatively, the collar could be retained through the usage of a spring ring mounted in a groove on the OD of the intermediate collar 64*b* and a mating taper and groove in the ID of the forward collar 64*c*.

In operation, a bit tip 40 can be inserted into the hex-shaped bore 70 of the bit holder body 62. The spring dip 84 engages a recess 38 in the bit tip 40 in order to retain the bit tip 40 within the bore 70. The forward collar 64*c* is able to float in a forward direction to engage a fastener that is engaged by the bit tip 40 in order to magnetically retain the fastener to the bit tip 40. When the fastener is inserted and the user wishes to remove the bit tip 40, the retraction collar 64 can be pulled in a rearward direction so that rearward facing shoulder 94 of intermediate collar 64*c* pulls rearward on the spring 80 to disengage the spring clip portion 84 from the recess 38 in the bit tip 40. The magnetic sleeve on this bit holder 60 works just like the other in that it grabs the screw and pulls it back towards the body 62 and against the bit while reducing wobble.

Figure 8:
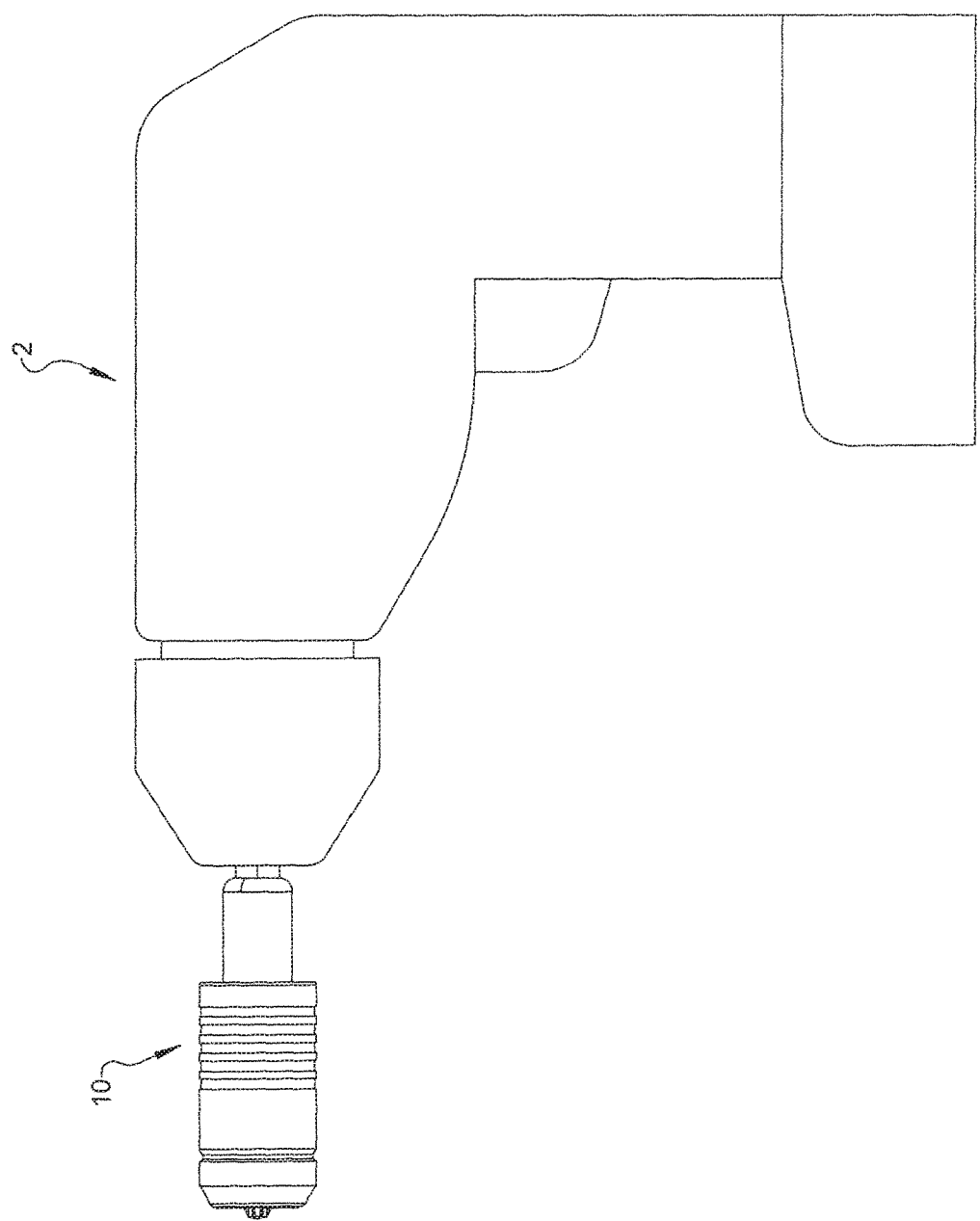
FIG. 8 is a side view of a power tool with the bit holder assembly of the present disclosure mounted therein.
Figure 9:
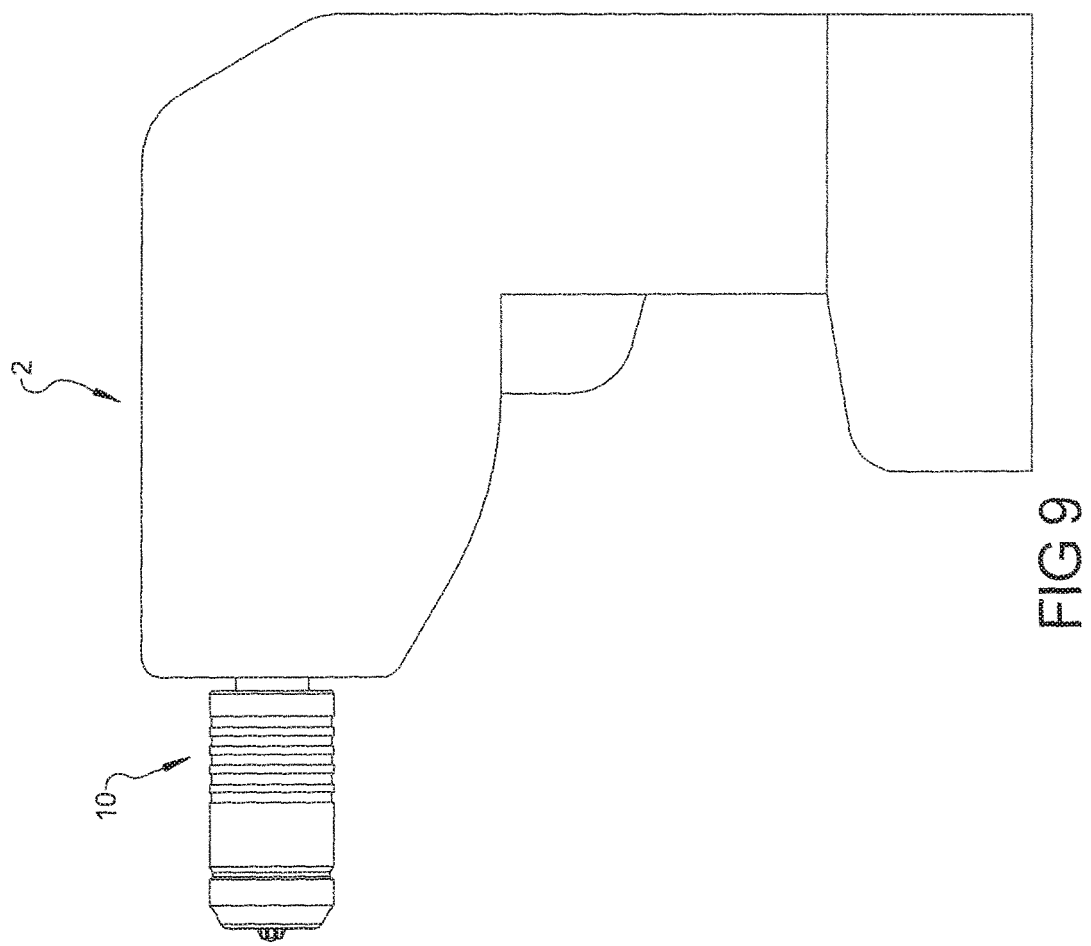
FIG. 9 is a side view of a power tool with the bit holder assembly integrally formed therein.

It should be understood that in each of the embodiments described herein, the bit holder 10, 60 can be mounted to a drill 2 as shown in FIG. 8 by inserting the hex-shaped shank 16, 66 into a chuck device. Alternatively, the bit holder of the present disclosure can be integrally constructed into the chuck device of the power tool 2, as shown in FIG. 9. Furthermore, although the present disclosure discloses a spring clip 34, 84 that is integral with the spring 30, 80, other arrangements of spring clips that are separate from the coil spring have also been utilized and can be utilized with the present disclosure. Examples of other arrangements include U.S. Pat. Nos. 7,086,813; 6,929,266; 6,261,035; and 5,988,957 which are incorporated herein by reference in their entirety. Furthermore, the use of a ball detent mechanism is also known in the art, and can be used in place of the integral spring clip and spring arrangement of the present disclosure. Further, other previous bit holder designs can be modified to include a ring magnet near the front of the outer actuation sleeve to allow the magnet and/or actuation sleeve to float forward to magnetize a fastener during operation.

Figure 10:
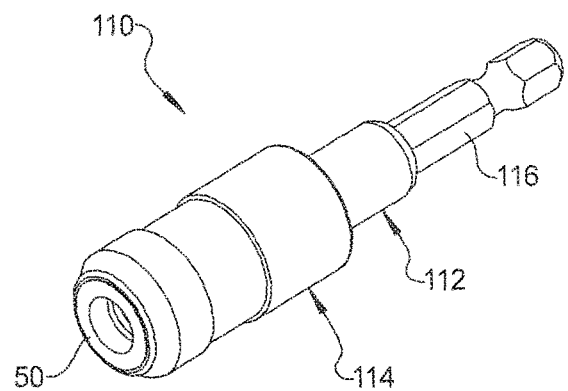
FIG. 10 is a perspective view of a bit holder assembly according to a third embodiment.
Figure 11:
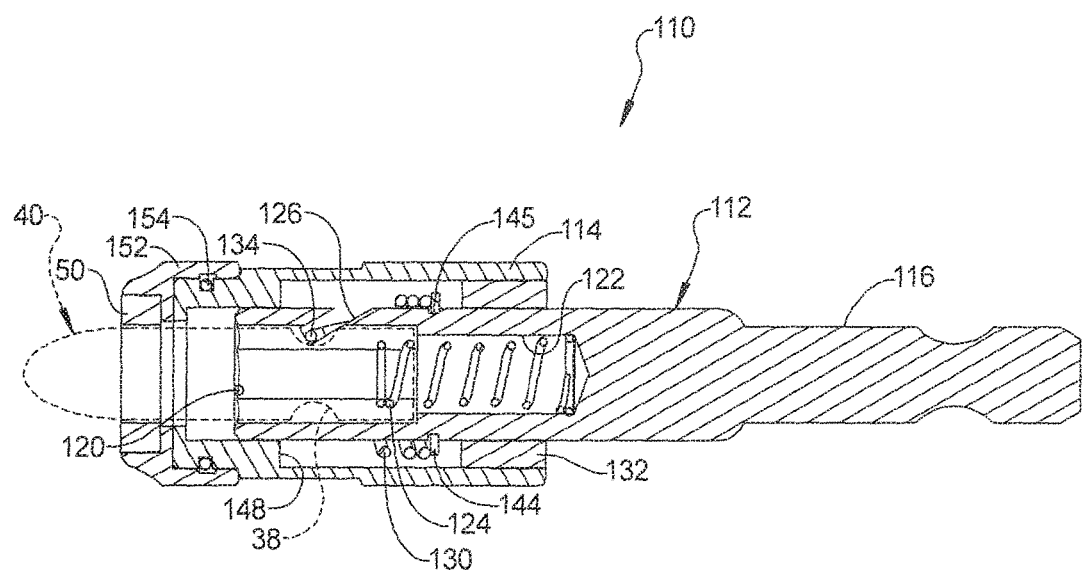
FIG. 11 is a cross-sectional view of the bit holder assembly of FIG. 10.

With reference to FIGS. 10 and 11, a third embodiment of the quick-change bit holder 110, according to the principles of the present disclosure, will now be described. The bit holder 110 includes a body 112 and a retraction collar 114 slidably mounted on the body 112 and retained in place by a sleeve bushing 132, as illustrated in FIG. 11. The body 112 can include a hex or polygonal-shaped shank 116 for mounting the bit holder 110 for rotation by a hand tool or a power tool.

With reference to FIG. 11, the body 112 also includes a hex or polygonal-shaped socket or bore 120 with the bore 120 opening axially outwardly toward the front end of the bit holder 110. A plunger bore 122 extends axially from the hex-shaped socket or bore 120 toward the rear end of the bit holder assembly 110. Optionally, an ejection spring 124 can be disposed in the plunger bore 122. The body 112 includes an angular slot 126 formed transversely therein, with the slot 126 extending from the radially outward surface of the body 112 in and axially forward and radially inward direction to communicate with the interior of the hex bore or socket 120.

A coil spring 130 surrounds a portion of the body 112 and is disposed between the body 112 and the retraction collar 114. The coil spring 130 abuttingly engages a clip 144 which is received in a groove 145 around a mid-portion of the body 112 and terminates as an integrally formed clip 134 that is disposed in the angular slot 126 and is designed to releasably engage a recess 38 in a hex or polygonal-shaped bit tip 40 in the same manner as the embodiment illustrated in FIGS. 3 and 4. The internal annular sleeve 132 attaches to the rear portion of the retraction collar 114. Sleeve 132 can be secured to the collar 114 by adhesive, a press fit, thermal bonding, fasteners, pins, or other known attachment techniques. The clip 144 acts as a stop against the sleeve 132 to limit for travel of the retractable collar 114. Retractable collar 114 includes a forward shoulder portion 148 that when pulled rearward can engage the spring 130 and pull the clip portion 134 of the spring 130, pulling it rearward out of engagement with a bit 40 received in the hex-shaped cavity 120.

Retractable collar 114 supports a removable magnet ring 150 that is supported by a removable sleeve 152. Removable sleeve 152 is secured to the retractable collar 114 by a retainer such as an O-ring or bull nose ring 154 that is received in a groove in a forward portion thereof. The sleeve 152' is press fit over top of the retainer ring in order to releasably secure the sleeve 152 to the retraction collar 114.

The operation of the bit tip holder 110 as described is the same as the bit tip holder 10 as described above.

Figure 12A:
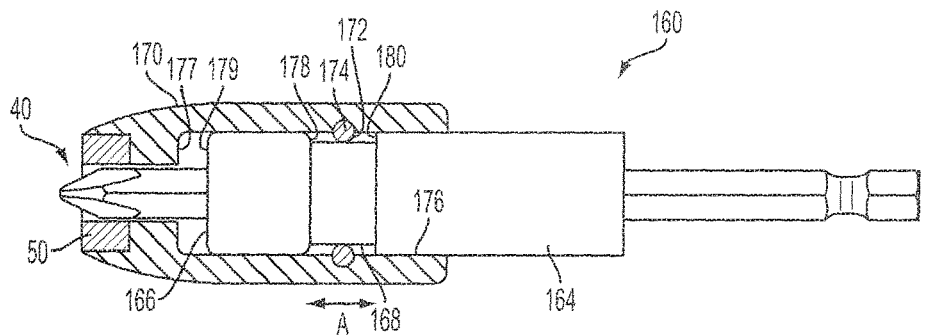
FIGS. 12A-12C are partial cross-sectional views of a bit holder assembly according to an alternative embodiment.
Figure 12B:
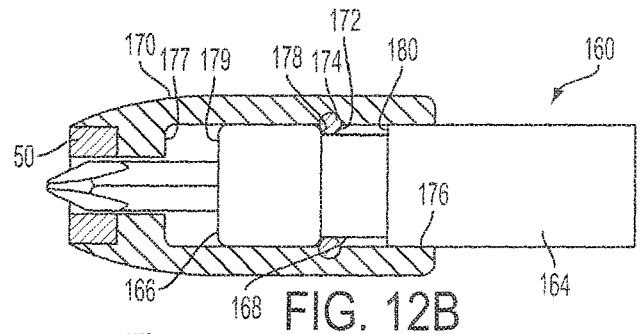
Figure 12C:
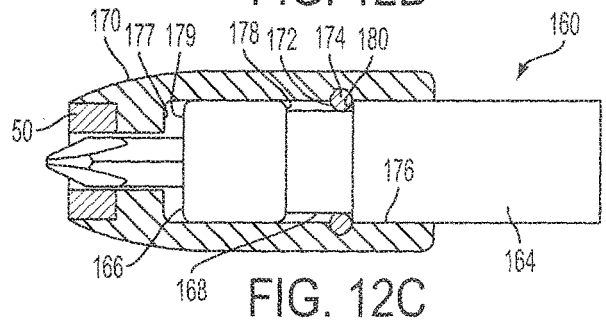

With reference to FIGS. 12A-12C, a bit holder 160 is shown including a hex-shaped or polygonal-shaped shank 162 and a body portion 164 including a hex-shaped or polygonal-shaped bore 166 in an end thereof for receiving a bit 40. The outer surface of the body 164 is provided with an elongated annular recess 168. A floating sleeve 170 is provided on the end of the body 164 and supports a ring magnet 50 at an end thereof. The floating sleeve 170 includes an interior annular groove 172 that receives a retainer 174 therein. The floating sleeve 170 can be removably attached to the body 164 by force fitting the body 164 into a rear opening 176 of the floating sleeve 170 until the retainer 174 is received in the recess 168 of the body 164.

Figure 13:
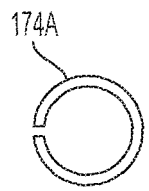
FIG. 13 is a plan view of a hog ring type retainer utilized in the embodiments of FIGS. 12A-12E.
Figure 14A:
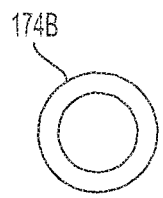
FIGS. 14A and 14B are plan views of an elastic O-ring and an elastic C-ring that can be utilized in the embodiments of FIGS. 12A-12E.
Figure 14B:
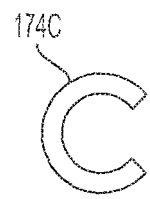

The recess 168 is provided with a forward shoulder 178 and a rearward shoulder 180 that allow the floating sleeve 170 to travel in a forward and rearward direction as indicated by arrow A while the shoulders 178 and 180 limit the travel of the floating sleeve 170 by engagement with the retainer member 174. Thus, the floating sleeve can float freely between a front position, as shown in FIG. 12B, in which the retainer 174 engages the front shoulder 178, and a rear position as shown in FIG. 12C, in which the retainer 174 engages the rear shoulder 180. As shown in FIGS. 13 and 14A-14B, the retainer 174 can take the form of a non-elastic member, such as a steel or elastic hog ring 174A, as shown in FIG. 13, or an elastic member, such as an elastic O-ring 174B as shown in FIG. 14A or an elastic C-ring 174C as shown in FIG. 14B.

Figure 12D:
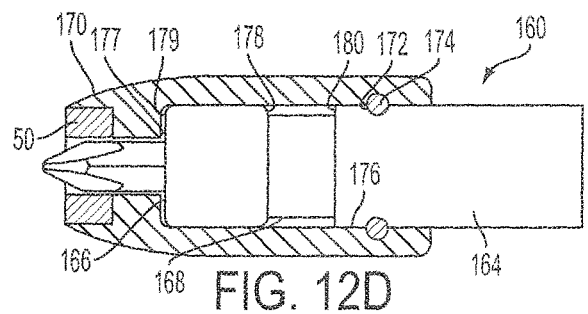
FIG. 12D is a partial cross-sectional view of a bit holder assembly according to an alternative embodiment.
Figure 12E:
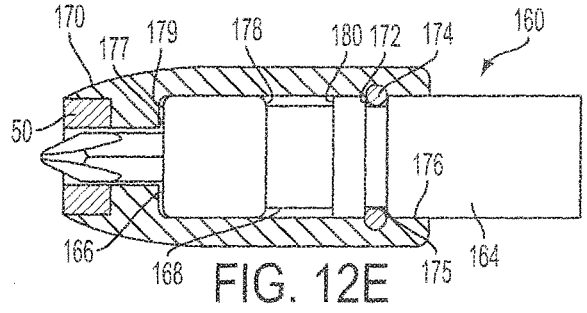
FIG. 12E is a partial cross-sectional view of a bit holder assembly according to an alternative embodiment.

With reference to FIG. 12D, in an alternative embodiment, the floating sleeve 170 can also be moved rearward to a parked position in which the retainer 174 is positioned rearward of the rear shoulder 180. In this embodiment, the retainer 174 comprises an elastic element (such as an elastic O-ring 174A or an elastic C-ring 174B) that is stretched and expands when the sleeve 170 is pulled axially rearward to the parked position. The expanded elastic retainer 174 frictionally engages the outer wall of the body portion 164 in a tight manner to maintain the sleeve in the parked position until the user pulls the outer sleeve forward back to one of the floating positions shown in FIGS. 12A-12C. An internal shoulder 177 on the front end of the sleeve 170 abuts a front end 179 of the body portion 164 to prevent further rearward movement of the sleeve 170 beyond the parked position. In the parked position, it is easier for the user to grasp and remove the bit 40 from the socket 166. Referring to FIG. 12E, in another embodiment, the body portion 164 may be formed with an annular parking groove 175 rearward of the annular recess 168 to more securely retain the retainer 174 and the sleeve 170 in the parked position.

Figure 15:
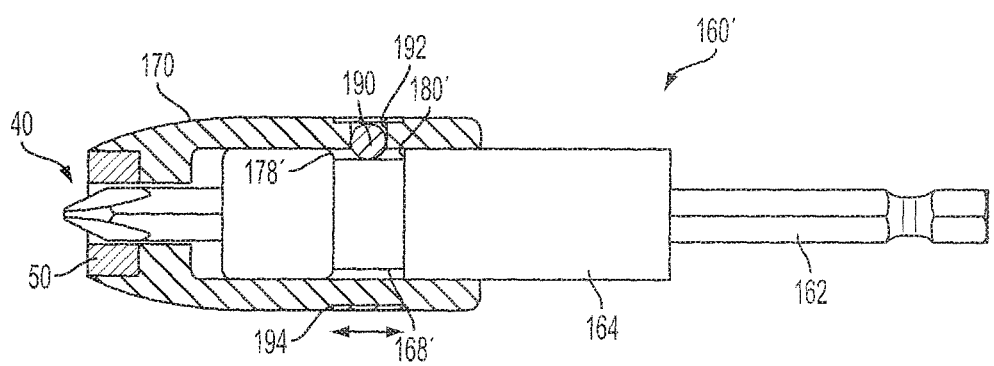
FIG. 15 is a partial cross-sectional view of a bit holder according to a further embodiment according to the principles of present disclosure.
Figure 16:
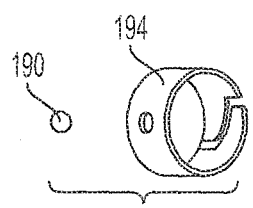
FIG. 16 is a perspective view of a ball and spring band which are utilized according to the alternative embodiment shown in FIG. 15.

As an alternative, as illustrated in FIG. 15, the bit holder 160' can use an alternative retainer in the form of a ball 190 which can be received in an opening 192 in the floating sleeve 170' and can be retained therein by an annular spring band 194 that can be made of steel or plastic or other suitable material. The ball is received in an annular recess 168' so that the floating sleeve 170' can float between a forward position in which the ball 190 engages a front shoulder 178' of the annular recess 168 and a rear position in which the ball engages a rear shoulder 180' of the annular recess 168'. In operation, the bit holder 160, 160' can be used to engage a fastener via the tool bit 40 and the floating sleeve 170, 170' allows the ring magnet 50 to float forward under its magnetic force to engage the fastener and magnetize the fastener to improve the retention of the fastener with the tool bit 40. In an alternative embodiment, the floating sleeve 170' may be moveable to a parked position where the ball 190 is rearward of the rear shoulder 180' and engages the body portion 164 or a parking groove in the body portion 164, to facilitate easier removal of the tool bit 40.

Figure 17:
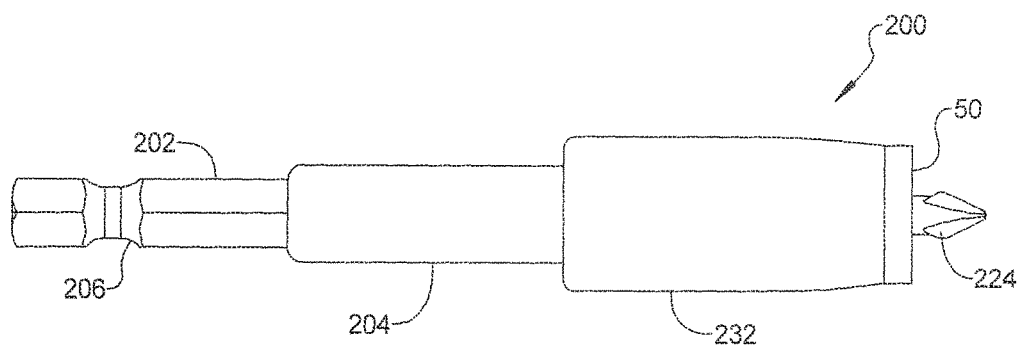
FIG. 17 is a side plan view of a six-in-one rotary tool having a floating ring magnet according to the principles of the present disclosure.
Figure 18:
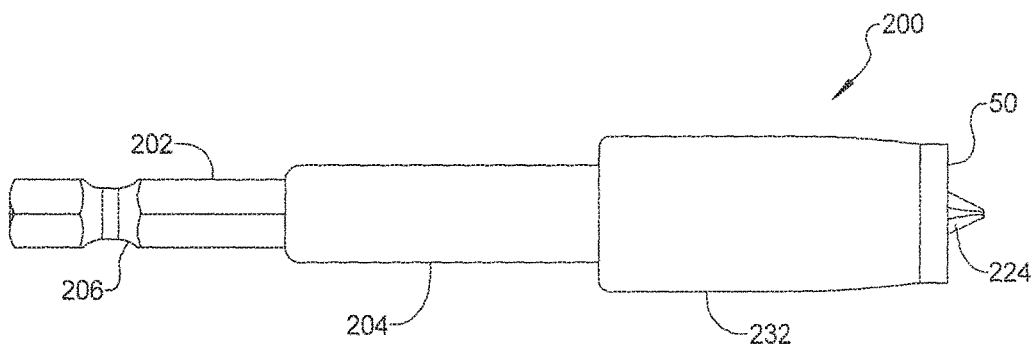
FIG. 18 is a side plan view of the six-in-one rotary tool shown in FIG. 17 with the ring magnet in a forward position.
Figure 19:
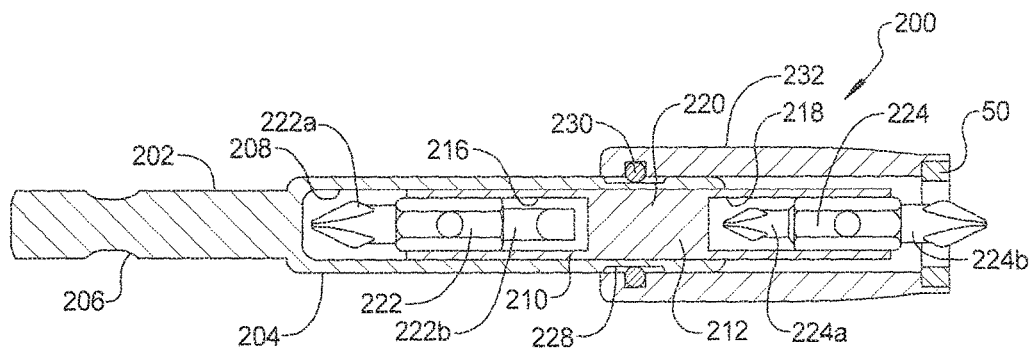
FIG. 19 is a cross-sectional view of the six-in-one rotary tool and floating ring magnet as shown in FIGS. 17 and 18.

In a still further alternative embodiment of the bit holder, as shown in FIGS. 17-19, the bit holder 200 can be configured as a six-in-one rotary tool that includes a floating ring magnet 50. In particular, as illustrated in FIG. 19, the tool holder 200 includes a shank 202 that is integral with, and that extends rearwardly from a socket 204. Shank 202 is preferably hex-shaped or polygonal and includes a circumferential groove 206. The tool socket 204 includes a bore 208 that extends axially from the socket end and that is also preferably hex-shaped or polygonal. A reversible bit assembly 210 is received in the bore 208 and includes a sleeve 212 having a pair of axial storage cavities 216, 218 separated by a web 220. The sleeve 212 receives a first and a second bit driver 222, 224 therein. The outer surface of the sleeve 212, each of the cavities 216, 218, as well as a center section of the first and second bit drivers 222, 224 are each again preferably hex-shaped or polygonal such that each of the bit drivers 222, 224 rotate with the sleeve 212 and socket 204. Each of the first and second bit drivers 222, 224 are reversible within their respective cavities such that either of the bit ends 22*a*, 22*b*, 224*a*, 224*b* of the first and second bit drivers 222, 224 can extend from the sleeve 212. Additionally, sleeve 212 is reversible within the socket bore 208 such that either the first or second bit drivers 222, 224 operably extend from the socket 204. Accordingly, the tool may be configured such that any of the four bit driver ends 222*a*, 222*b*, 224*a*, 224*b* operably project from the socket 204. Either of the bit drivers 222, 224 may be removed from the sleeve 212 to expose the hex-shaped cavity 216, 218 for use as a nut driver. Finally, the tools sixth driver is provided by removing the reversible bit assembly 210 from the socket bore to expose the hex-shaped bore 208 for use as a second nut driver. It is noted that the bore 208 is larger than the cavities 216, 218 thereby providing the ability to accommodate larger hex-shaped screw heads or nuts. In a preferred embodiment, the bore 208 is a 5/16 inch hex-opening while the cavities 216, 218 are each ¼ inch hex openings.

Similar to the above embodiments, the outer surface of the socket 204 can be provided with an elongated annular recess 228 that can be engaged by a retainer 230 of a floating sleeve 232 that supports a ring magnet 50 at a forward end thereof. Accordingly, as the tool holder 200 is used to engage a fastener, one of the bit drivers 222, 224 engage the fastener and the floating sleeve 232 allows the ring magnet 50 to move in a forward direction to engage the fastener to secure the fastener to the bit driver 222, 224. The floating sleeve 232 can be removed by applying a slight force in a forward direction to overcome the retaining force of the retainer 230 within the elongated annular recess 228. Upon removal of the floating sleeve 232, the reversible bit assembly 210 can be removed from the socket 204 so that the bit drivers 222, 224 can be chosen for use. In another embodiment, similar to the embodiments described above, the floating sleeve 232 can be moved to a parked position in which the retainer 230 engages the socket 204 or a parking groove in the socket 204, rearward of the annular recess 228 to facilitate easier removal of the bits from the sleeve 212.

Figure 20:
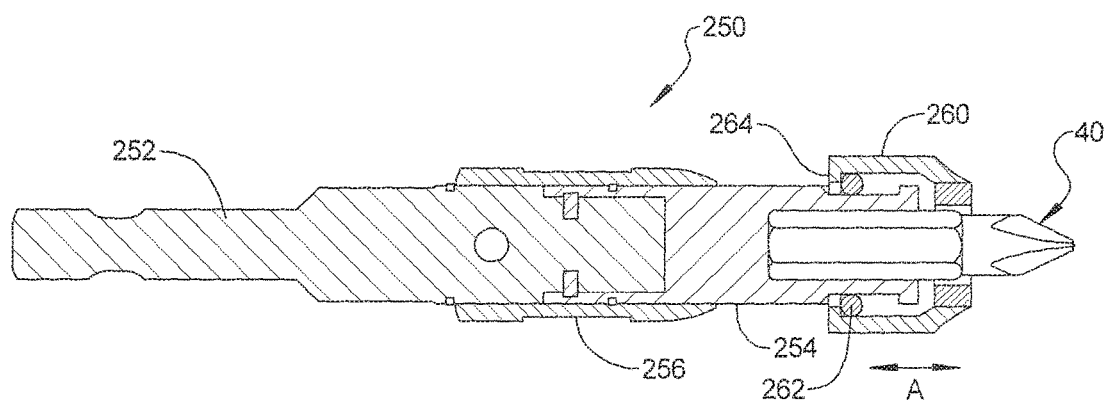
FIG. 20 is a cross-sectional view of a pivotal bit holder accessory having a floating ring magnet mounted on a forward end thereof.

With reference to FIG. 20, a pivotal/rigid accessory 250 for power and hand tools is disclosed and includes a drive component 252 adapted to be connected to a power tool or hand tool and a driven component 254 that is pivotally connected to the drive component 252. A locking sleeve 256 is provided for securing the driven component 254 for non-pivotal movement relative to the drive component 252, or the locking sleeve 256 can be moved to a disengaged position that allows the driven component 254 to pivot relative to the drive component 252. A pivot mechanism of this type is disclosed in U.S. Pat. No. 7,942,426, which is herein incorporated by reference. According to the principles of the present disclosure, a floating sleeve 260 can be provided at the forward end of the driven component 254 and supports a magnetic ring 50 at a forward end thereof to aid in retaining a fastener on a bit 40 received in a hex-shaped bore in the driven component 254. As illustrated in FIG. 20, the floating sleeve can include a retainer 262 that can be received in an elongated annular recess 264 on the outer surface of the driven component 254 to allow the floating sleeve 260 to move in a forward and rearward axial direction as indicated by arrow A. In another embodiment, similar to the previously described embodiments, the floating sleeve 260 can be moved to and retained in a parked position in which the retainer 262 frictionally engages the driven component 254 or a parking groove in the driven component 254, rearward of the annular recess 264, to facilitate easier removal of the bit 40 from the driven component 254.

Figure 21:
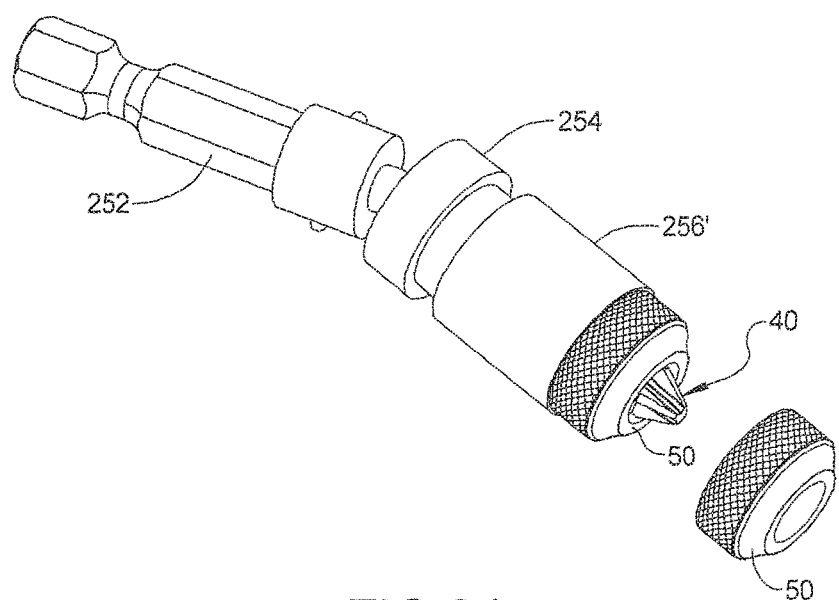
FIG. 21 is an alternative pivotal bit holder accessory having a ring magnet mounted to a floating locking sleeve of the accessory, according to the principles of the present disclosure.
Figure 22:
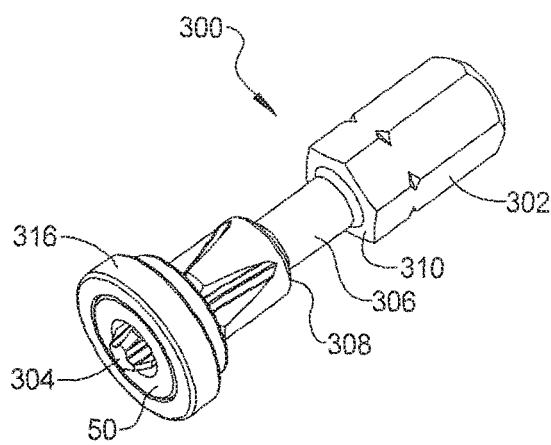
FIG. 22 is a perspective view of a tool bit having a magnetic ring supported by a floating sleeve, according to the principles of the present disclosure.
Figure 23:
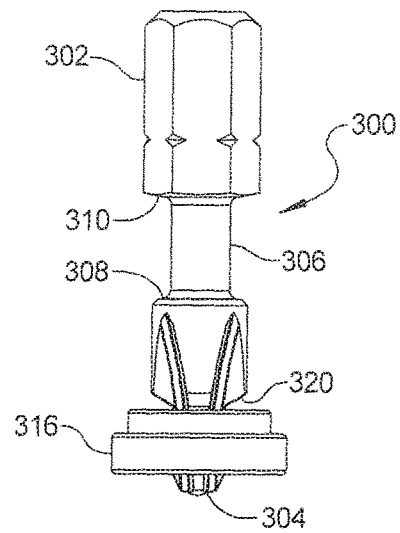
FIG. 23 is a side plan view of the tool bit and floating sleeve shown in FIG. 22.

As an alternative, as illustrated in FIG. 21, the ring magnet 50 can be secured to the front end of the locking sleeve 256' which can be allowed to float in a forward direction to allow the ring magnet 50 to engage a fastener secured to the tool bit 40 received in a bore in the driven component 254 of the tool holder. FIG. 21 illustrates the pivoting arrangement between the driving component and the driven component which, again, is detailed in U.S. Pat. No. 7,942,426, which is herein incorporated by reference in its entirety.

With reference to FIGS. 22-25, a tool bit 300 having a floating ring magnet 50, according to the principles of the present disclosure, will now be described. The tool bit 300 includes a shaft having a hex-shaped shank 302 at a first end, and a working region 304 disposed at a second end. The shaft can have a section between the hex-shaped shank 302 and the working region 304 that has a reduced diameter region 306 that is disposed between two shoulders 308, 310. The reduced diameter region 306 provides a torsion zone that allows the shaft to twist to absorb forces while the tool bit 300 is being used to drive a fastener. A tool bit 300 having a torsion zone of this type is generally known in the art as disclosed by U.S. Pat. No. 5,704,261.

Figure 24:
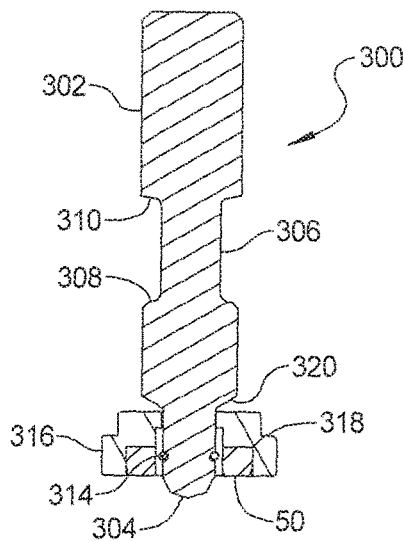
FIG. 24 is a cross-sectional view of the tool bit and floating sleeve shown in FIGS. 22 and 23.
Figure 25:
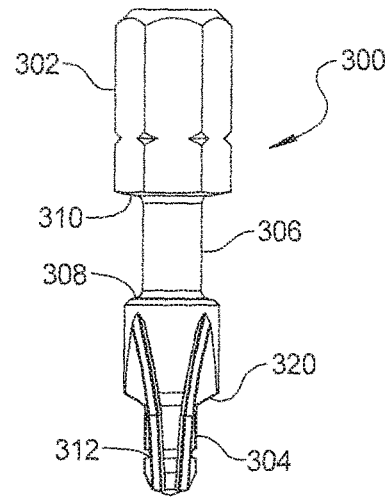
FIG. 25 is a side plan view of the tool bit shown in FIG. 22.

As illustrated in FIGS. 24 and 25, the working region 304 of the tool bit 300 can be provided with various types of drive heads such as Phillips, flat, hex, square, and other known types of drive heads. A recessed groove 312 is provided in the working region 304 for receiving a retainer ring 314 therein. A ring magnet 50 is supported by a sleeve 316 that is retained on the tool bit 300 by the retainer ring 314 that is received within the recessed groove 312. As the tool bit 300 is engaged with a fastener, the floating sleeve 316 is moved in a forward direction to allow the ring magnet 50 to engage the fastener to assist in retaining the fastener to the tool bit 300. The floating sleeve 316 includes an interior shoulder 318 that engages the retainer 314 to limit the sleeve's forward axial travel. The tool bit 300 includes a shoulder 320 at an end of the working region 304 that limits the axial travel of the floating sleeve 316 in the opposite direction. The floating sleeve 316 can optionally be removed from the tool bit 300 by pulling on the floating sleeve 316 in an axial direction to overcome the retainer 314. The retainer 314 can be a rubber O-ring or a steel hog ring that can be flexed inward when the floating sleeve 316 is either inserted onto or pulled off of the tool bit 300.

With reference to FIGS. 26-29, an alternative arrangement for mounting a ring magnet 50 to a tool bit 300 such as the tool bit as described above, will now be described. The ring magnet 50 is supported by a floating sleeve 330 that is slidably received on a forward end of the tool bit 300. The floating sleeve 330 includes a plurality of axially extending fingers 332 that are integrally formed with the sleeve 330 and releasably engage the reduced diameter region of the tool bit between the two shoulders 308, 310. FIG. 28 illustrates the floating sleeve 330 in a rearward position, while FIG. 29 illustrates the floating sleeve 330 in a forward position for the ring magnet 50 to engage a fastener to help retain the fastener on the tool bit 300. The floating sleeve 330 can be removed from the tool bit by pulling forward on the floating sleeve 330, thus causing the fingers 332 to flex radially outward over top of the increased diameter portion at the head 304 of the tool bit 300. It is noted that the floating sleeve 330 can be made from plastic, rubber, or other materials that allow flexibility of the fingers 332. The ring magnet 50 can be secured to the floating sleeve 330 by adhesives, in-molding, or other known fastening techniques.

Figure 30:
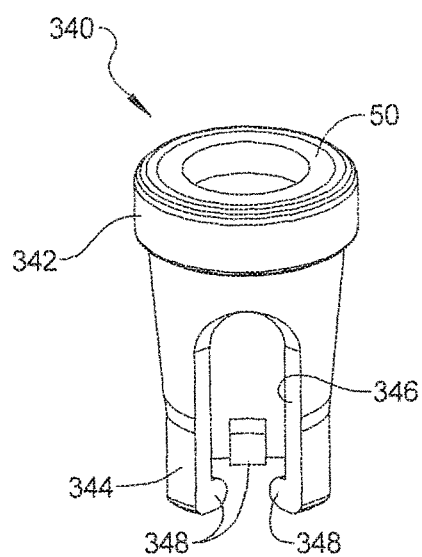
FIG. 30 is a perspective view of an alternative floating sleeve design, according to the principles of the present disclosure.
Figure 31:
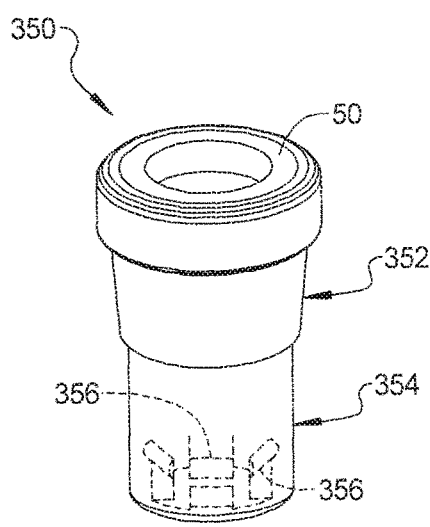
FIG. 31 is a perspective view of a floating sleeve according to an alternative embodiment of the present disclosure.

With reference to FIG. 30, an alternative floating sleeve 340 design is shown for supporting a ring magnet 50 that can be received on a tool bit 300. The sleeve 340 includes a first end 342 supporting the ring magnet 50 and a second end 344 including a single elongated slot 346 that allows the second end 344 of the sleeve 340 to flex outward for insertion of a tool bit 300 therein. The interior of second end 344 of the sleeve 340 includes a plurality of radially inwardly extending tabs 348 that are received in the reduced diameter portion 306 of the tool bit 300 and engage the forward and rearward shoulders 308, 310 to limit axial movement of the sleeve 340 along the length of the tool bit 300. The floating sleeve 340 can be made from plastic or rubber With reference to FIG. 31, a floating sleeve 350, according to an alternative embodiment, can include a plastic cup 352 that receives the ring magnet 50 at a forward end thereof and a rubber sleeve 354 at a rearward end thereof. The interior surface of the rubber sleeve 354 includes a plurality of radially inwardly extending tabs 356 at its rearward end, as illustrated in phantom in FIG. 31. The radially inwardly extending tabs 356 are flexible to allow a tool bit 300 to be inserted into the sleeve 350 so that the tabs 356 engage the reduced diameter portion 306 between the forward and rearward shoulders 308, 310 of the tool bit 300. Thus, the sleeve 350 is allowed to float in a forward and rearward direction in the manner as described with regard to the above described embodiments.

Figure 32:
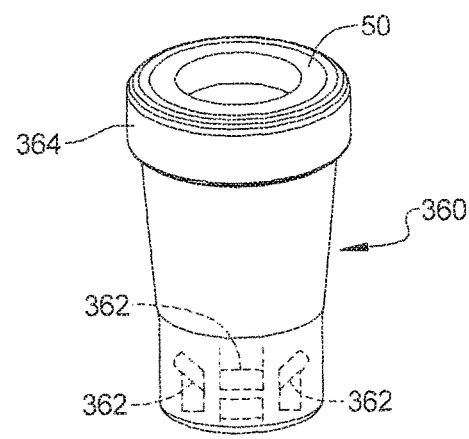
FIG. 32 is a perspective view of a floating sleeve according to the present disclosure.
Figure 33:
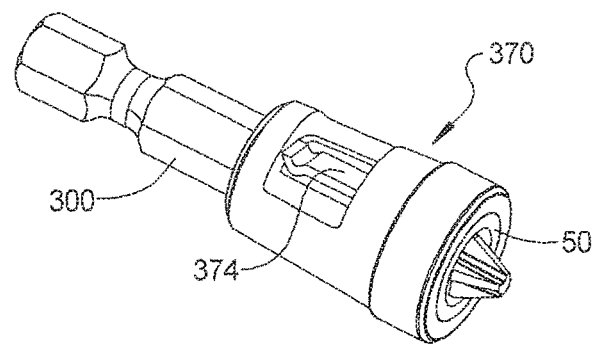
FIG. 33 is a perspective view of a tool bit having a floating sleeve, according to an alternative embodiment of the present disclosure.
Figure 34:
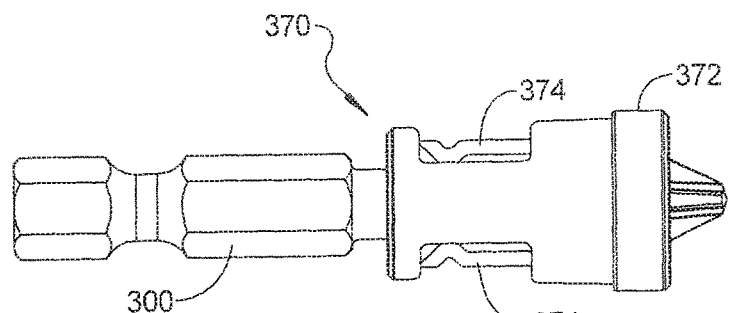
FIG. 34 is a side plan view of the tool bit and floating sleeve shown in FIG. 33.
Figure 35:
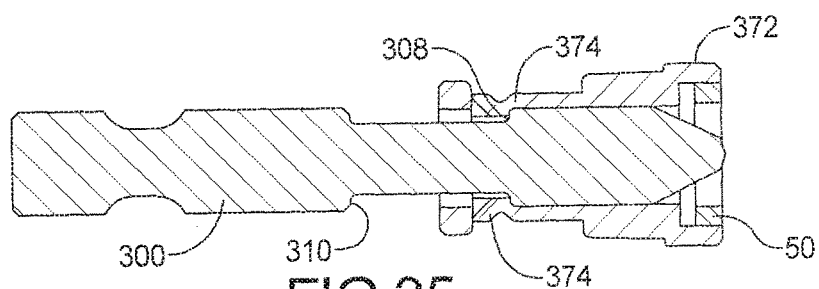
FIG. 35 is a cross-sectional view of the tool bit and floating sleeve shown in FIG. 33.
Figure 36:
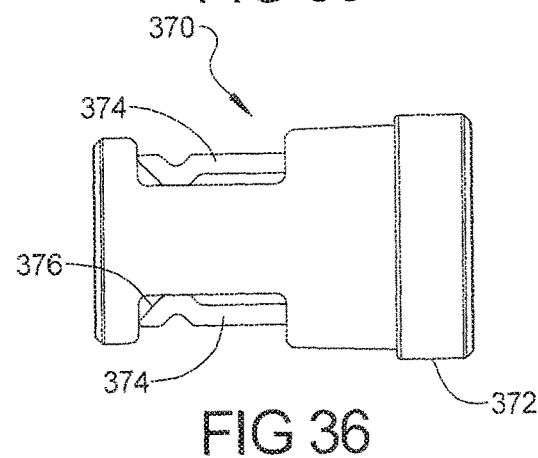
FIG. 36 is a side plan view of the floating sleeve shown in FIG. 33.

With reference to FIG. 32, an alternative floating sleeve 360 design is provided in which a floating ring magnet 50 is supported at a first end of a rubber sleeve 360. The second end of the sleeve includes a plurality of radially inwardly extending tabs 362 that are flexible to allow a tool bit 300 to be inserted into the sleeve 360 wherein the tabs 362 are disposed in the reduced diameter portion 306 between the forward and rearward shoulders 308, 310 of the tool bit 300. The ring magnet 50 can be reinforced with a metal or plastic cap 364 disposed between the ring magnet 50 and the first end of the rubber sleeve 360.

With reference to FIGS. 33-36, an alternative floating sleeve 370 is provided for supporting a ring magnet 50 in a forward end 372 thereof. The floating sleeve 370 can be made from plastic and can include one or more flexible fingers 374 that engage the reduced diameter portion 306 of the tool bit 300 between the forward and rearward shoulders 308, 310 thereof. The fingers 374 can include a radially inwardly protruding end portion 376 that engages the reduced diameter portion 306 of the tool bit 300. The elongated fingers 374 are integrally formed with the plastic sleeve 370 to allow the fingers 374 to flex radially outward when a tool bit 300 is inserted therein or removed therefrom.

Figure 37:
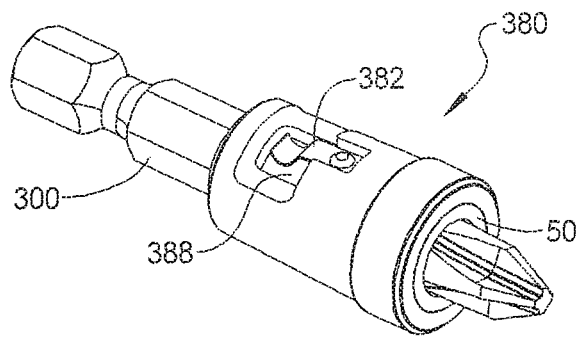
FIG. 37 is a perspective view of a tool bit and an alternative floating sleeve, according to the present disclosure.
Figure 38:
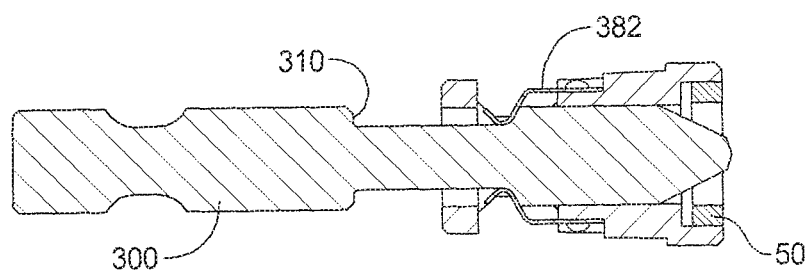
FIG. 38 is a cross-sectional view of the tool bit and floating sleeve shown in FIG. 37.
Figure 39:
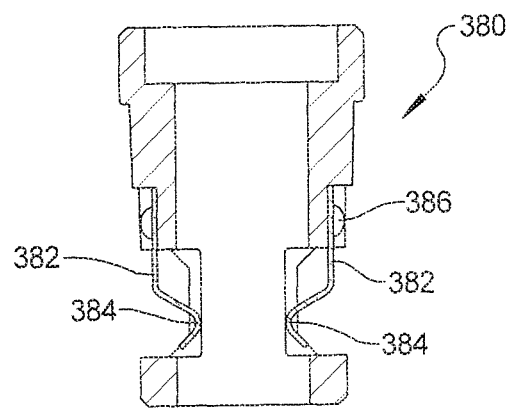
FIG. 39 is a cross-sectional view of the floating sleeve shown in FIG. 37.

With reference to FIGS. 37-39, an alternative arrangement of a floating sleeve 380 is provided wherein the flexible fingers 382 are made from a spring steel and are separately attached to the floating sleeve 380 which can be made from plastic or metal. The flexible fingers 382 operate in the same manner as the fingers 374 disclosed in FIGS. 33-36 to retain the floating sleeve 380 onto a tool bit 300 while allowing the sleeve 380 to float in a forward and rearward direction until the fingers 382 engage the forward or rearward shoulders 308, 310 of the tool bit 300. The fingers 382 include radially inwardly protruding portions 384 that engage the reduced diameter portion 306 of the tool bit 300. The flexible fingers 382 can be secured to the sleeve 380 by a rivet 386 or can be in-molded into the sleeve 380. The sleeve 380 includes a pair of opposing windows 388 to receive the fingers 382.

Figure 40:
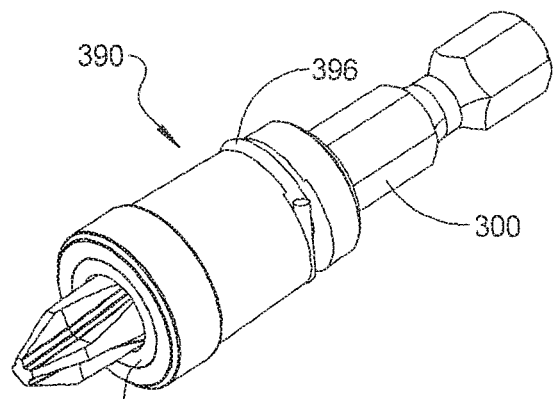
FIG. 40 is a perspective view of a tool bit and alternative floating sleeve design, according to the present disclosure.
Figure 41:
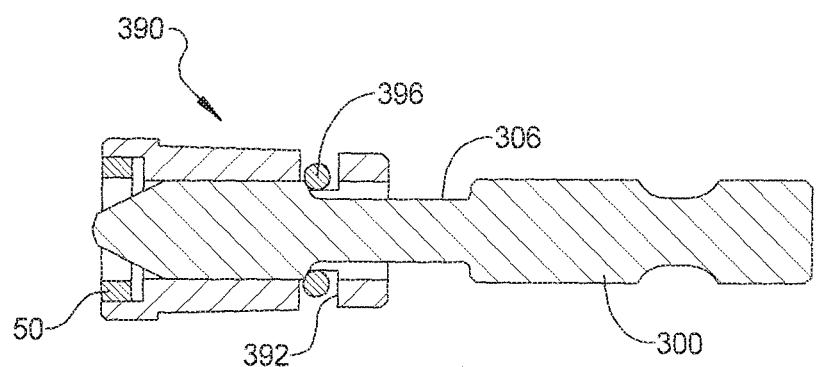
FIG. 41 is a cross-sectional view of the tool bit and floating sleeve shown in FIG. 40.
Figure 42:
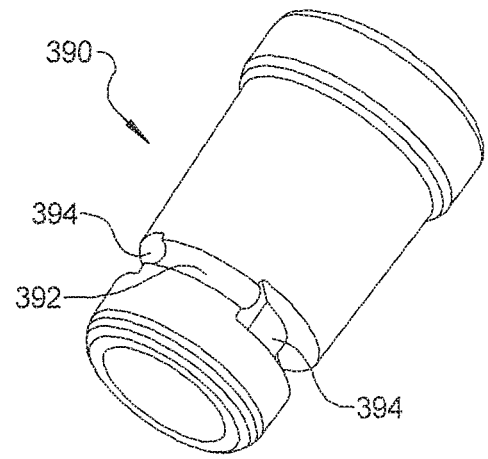
FIG. 42 is a perspective view of the floating sleeve shown in FIG. 40.
Figure 43:
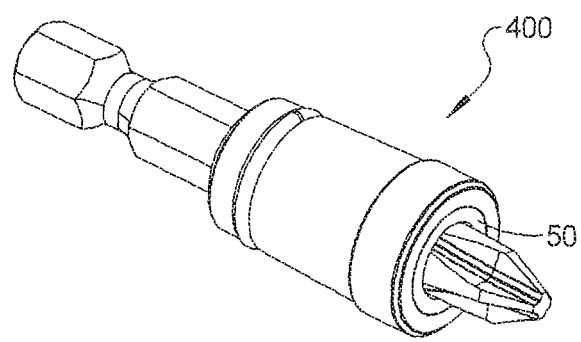
FIG. 43 is a perspective view of a tool bit having a floating ring magnet supported by a floating sleeve, according to a further embodiment of the present disclosure.
Figure 44:
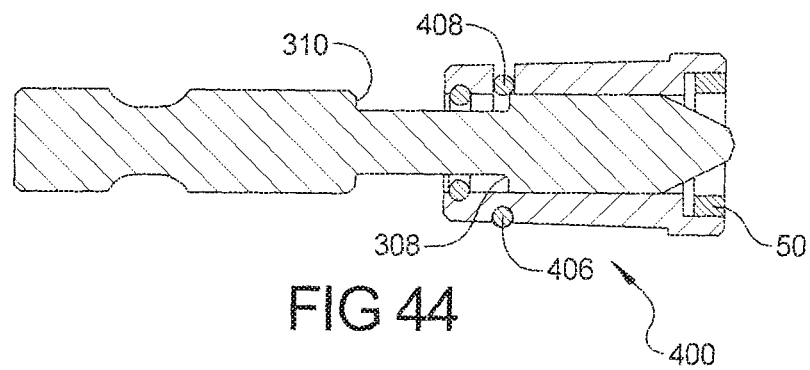
FIG. 44 is a cross-sectional view of the tool bit and floating sleeve shown in FIG. 43.
Figure 45:
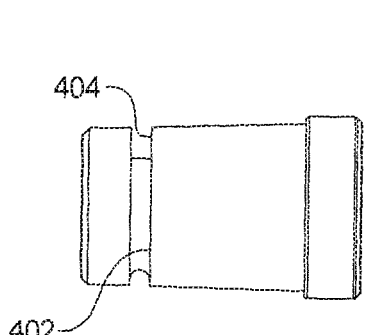
FIG. 45 is a side plan view of the floating sleeve shown in FIG. 43.

With reference to FIGS. 40-42, an alternative floating sleeve 390 is provided for supporting a ring magnet 50 in a forward end thereof. The floating sleeve 390 can be made from plastic, rubber, or metal and can include a recessed annular groove 392 on an exterior surface thereof as well as a pair of oppositely disposed windows 394 that extend from the groove 392 into the interior of the sleeve 390. A rubber O-ring or a hog ring 396 can be provided in the annular groove 392 so as to extend into the window portion 394 of the annular sleeve 390 in such a manner that the O-ring or hog ring 396 can be received in the reduced diameter portion 306 of the tool bit 300 between the forward and rearward shoulders 308, 310 thereby retaining the floating sleeve 390 onto the tool bit 300. The reduced diameter portion 306 of the tool bit allows the floating sleeve 390 to move in a forward and rearward direction to allow the ring magnet 50 to engage a fastener for securing the fastener to the tool bit 300.

Figure 46:
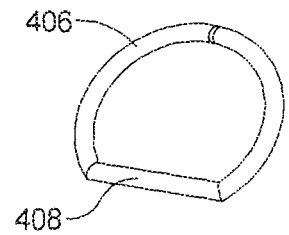
FIG. 46 is a perspective view of a D-shaped ring utilized with the floating sleeve shown in FIG. 45.

With reference to FIGS. 43-46, a still further alternative embodiment of the floating sleeve 400 is shown wherein the floating sleeve 400 supports a ring magnet 50 at a forward end and includes an exterior annular groove 402 with an opening 404 on one side that communicates to the interior of the sleeve 400. The annual groove 402 receives a D-shaped ring 406 having a generally flat portion 408 along one side thereof that is received in the window opening 404 of the annular groove 402 so that it communicates to the interior of the sleeve 400. The flat portion 408 of the D-shaped ring 406, as shown in FIG. 46, is received in the reduced diameter portion 306 of the tool bit 300 between the forward and rearward shoulders 308, 310 to limit the axial movement of the floating sleeve 400 in the forward and rearward directions.

With reference to FIGS. 47-51, an alternative arrangement of the floating sleeve 410, according to the principles of present disclosure, will now be described. The floating sleeve 410 includes an elongated annular recess 412 on an outer surface thereof and a plurality of window openings 414 extending therethrough within the elongated annular recess 412. The openings 414 each receive a ball 416 therein and a spring band 418 is received within the elongated annular recess 412 over top of the balls 416 to secure the balls 416 within the openings 414. The balls 416 are designed to be received in the reduced diameter portion 306 of the tool bit 300 between the forward and rearward shoulders 308, 310 to limit the axial movement of the floating sleeve 410 in the forward and rearward directions. During insertion of the tool bit 300 into the floating sleeve 410, the spring band 418 allows the balls 414 to be pushed radially outward against the spring force of the band 418 while the head of the tool bit 300 is inserted into, or removed from, the sleeve 410. As the balls 416 reach the reduced diameter portion 306, the balls 416 move radially inward reducing the force of the spring band 418 on the balls 414. It is intended that the balls 414 provide an interference when engaging the forward and rearward shoulders 308, 310 of the reduced diameter portion 306, but do not provide significant resistance to the floating motion of the sleeve 410 along the tool bit 300.

Figure 52:
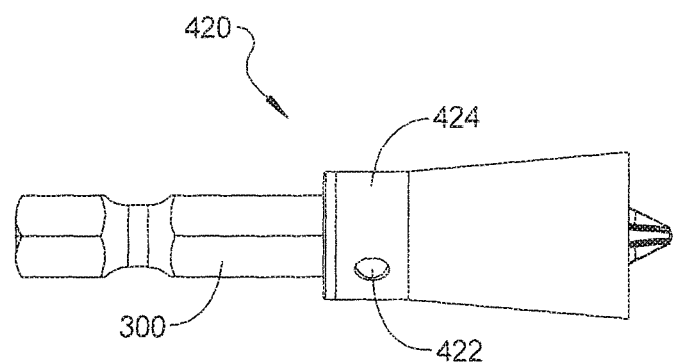
FIG. 52 is a side plan view of a tool bit having a floating sleeve according to an alternative embodiment.
Figure 53:
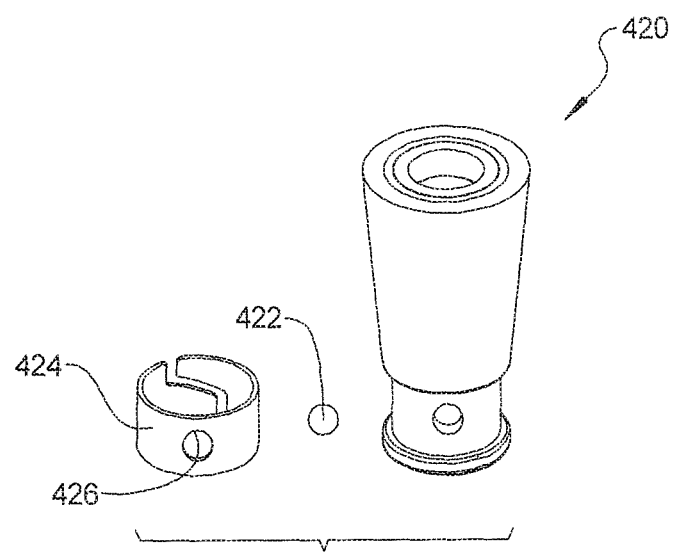
FIG. 53 is an exploded perspective view of the floating sleeve, ball, and spring band utilized in the embodiment of FIG. 52.

With reference to FIGS. 52 and 53, an alternative floating sleeve 420 is shown utilizing a single ball 422 wherein the spring band 424 is provided with an opening 426 therein for maintaining the position of the spring band 424 relative to the ball 422 that is received in the single opening 426 of the floating sleeve 420.

Figure 54:
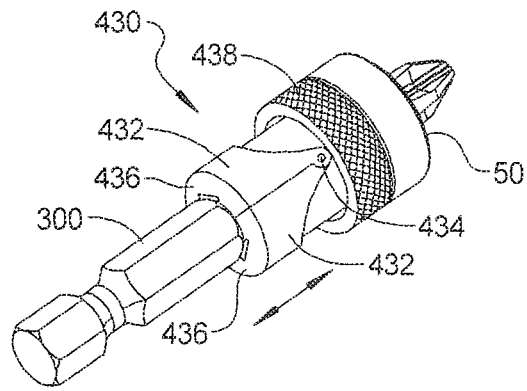
FIG. 54 is a perspective view of a tool bit and alternative floating sleeve design, according to the principles of the present disclosure.
Figure 55:
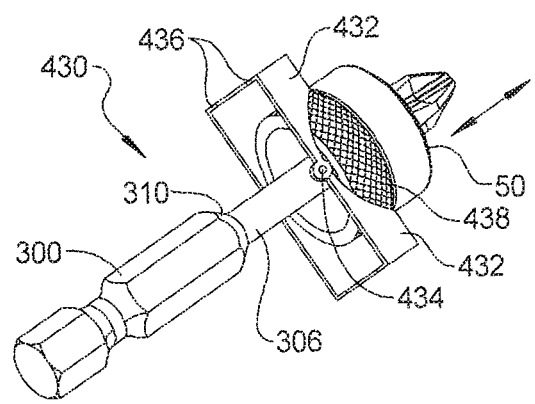
FIG. 55 is a perspective view of the floating sleeve design as shown in FIG. 54 with the locking jaws in a disengaged position.
Figure 56:
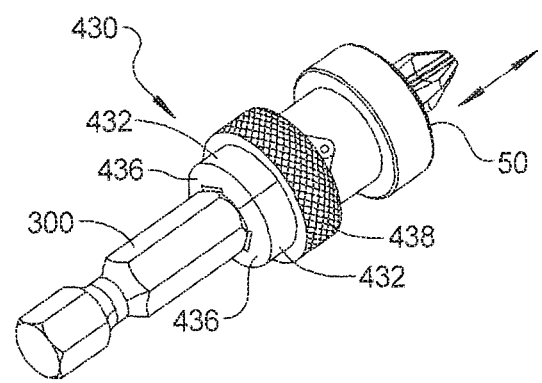
FIG. 56 is a perspective view of the floating sleeve design shown in FIG. 54 with the lock collar shown in the locked position for engaging the floating sleeve to the tool bit.

With reference to FIGS. 54-56, an alternative floating sleeve 430, according to the principles of present disclosure, will now be described. The floating sleeve 430 supports a ring magnet 50 at a forward end thereof and includes a pair of lock jaws 432 that are pivotally mounted to the floating sleeve by pivots 434. The lock jaws 432 each include radially inwardly extending tabs 436 that are designed to be engaged within the reduced diameter portion 306 of the tool bit 300. The lock jaws 432 can be pivoted to an engaged position, as illustrated in FIG. 54, and a lock collar 438 can be pulled over top of the lock jaws 432, as illustrated in FIG. 56, to secure the lock jaws 432 to the tool bit 300. The ring magnet 50 is supported at the forward end of the floating sleeve 430 and the lock jaws 432 limit the axial movement of the floating sleeve 430 along the tool bit 300 to allow the ring magnet 50 to float to an engaged position when the tool bit 300 is engaged with a fastener. In order to remove the sliding sleeve 430 from the tool bit 300, the lock collar 438 can be pulled in a forward position allowing the lock jaws 432 to be pivoted radially outward so that the tool bit 300 can be removed from the floating sleeve 430. It is noted that the lock collar 438 can be made of a flexible material, or can have a rigid outer ring with a flexible material on the interior thereof that allows the lock collar 438 to be retained on the lock jaws 432 when they are in the locked position.

Figure 57:
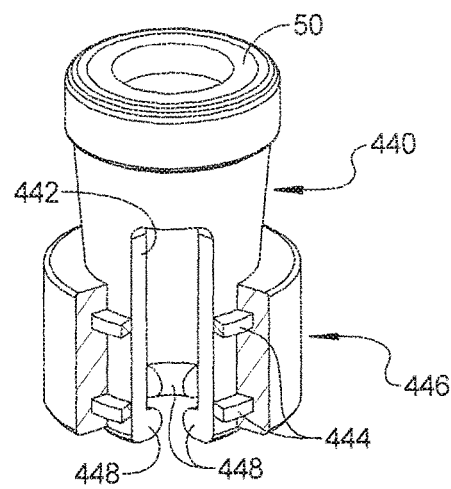
FIG. 57 is a partial cutaway perspective view of an alternative floating sleeve design according to the present disclosure.

With reference to FIG. 57, an alternative floating sleeve 440 is shown including a ring magnet 50 at a forward end of a plastic sleeve. The plastic sleeve 440 has a slot 442 therein and has exterior cam surfaces 444 thereon. A rotating sleeve 446 is engaged with the cam surfaces 444 of the sleeve 440 and the rotating sleeve 446 can be rotated to cause plastic sleeve 440 to be retained in a radially inward direction to positively engaged the radially inwardly extending tabs 448 of the sleeve 440 within the reduced diameter portion 306 of the tool bit 300 between the forward and rearward shoulders 308, 310 thereof. The rotating sleeve 446 can also be rotated to an unlocking position that allows the sleeve 440 to flex outwardly sufficiently enough to allow removal of the bit 300 from the floating sleeve 440.

Figure 58:
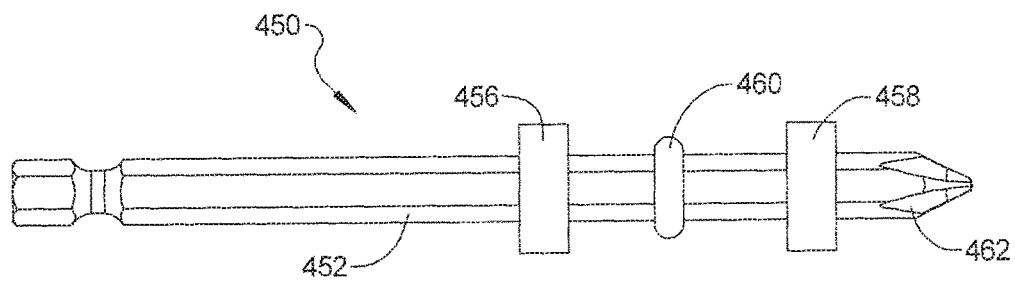
FIG. 58 is a side plan view of a pair of ring magnets disposed around a tool bit with a connecting sleeve removed for illustrative purposes, according to the principles of the present disclosure.
Figure 59:
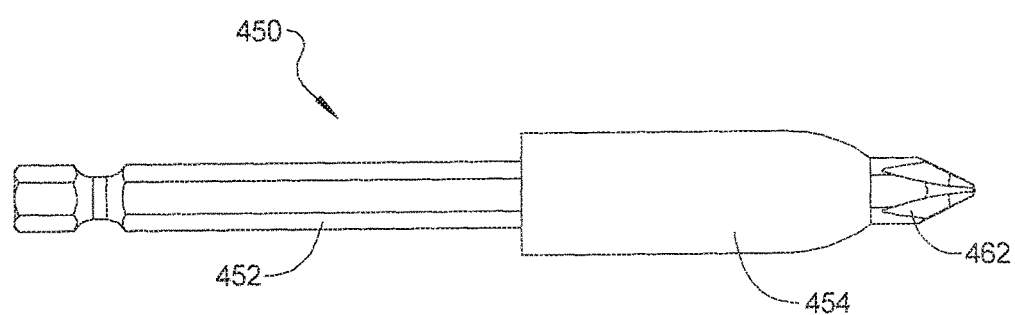
FIG. 59 illustrates a sleeve that is mounted to the pair of ring magnets as shown in FIG. 58.
Figure 60:
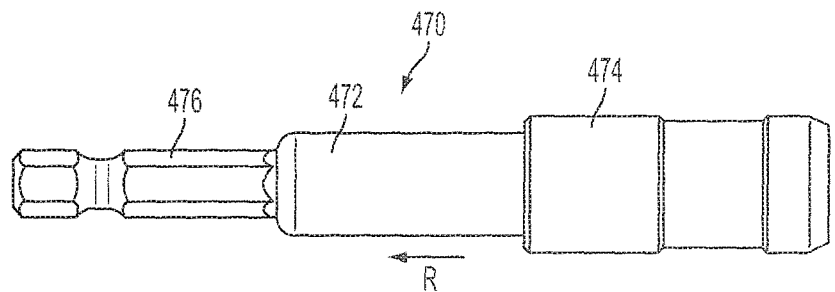
FIG. 60 is a side plan view of an alternative bit holder assembly according to the principles of the present disclosure.

With reference to FIGS. 58 and 59, a further embodiment of the present disclosure will now be described. With this embodiment, the use of a tool bit 450 having a hex-shaped shaft 452 without a reduced diameter portion is provided. A floating sleeve 454 is provided with two interior ring magnets 456, 458 (as illustrated in FIG. 58 with the sleeve 454 removed) which are positioned with both poles opposing one another at approximately 10 mm apart. With both poles of the ring magnets 456, 458 opposing one another, the sleeve 454 will move freely along a length of the tool bit 452 as they are captured by the non-magnetic sleeve 454. An O-ring 460 can optionally be placed between the two magnets 456, 458 to provide resistance to movement of the floating sleeve 454 if so desired. The opposing poles of the magnets 456, 458 cause the sleeve 454 to float on the bit 450 until a face of the forward magnet 458 contacts a head of a fastener that has been placed on the driving end 462 of the tool bit 450. Once that contact is made, the sleeve 454 then positions itself such that the fastener remains in place on the bit 450 during installation. Once the faster is securely started, the sleeve 454 can be drawn back onto the bit 450 if desired where it will remain during the driving and seating of the fastener.

With reference to FIGS. 60, 61A, 62 and 63, a bit holder assembly 470 is disclosed including a body 472 and a floating sleeve 474. The body 472 includes a first end defining a shank 476 and a second end defining a polygonal cavity 478 that can be hex-shaped or can have another polygonal shape. At the inner end of the polygonal cavity 478, an additional bore 480 can be provided for receiving a magnet 482 therein. An exterior surface of the body 472 at the second end includes a threaded portion 484 which is adapted to receive a threaded cap 486. The threaded cap 486 includes interior threads 488 that engage the threaded portion 484. The threaded cap 486 also includes a radially inwardly extending shoulder 490 that captures an O-ring 492 axially between the shoulder 490 and an end surface 494 of the body 472. At a rear end of the threaded portion 484, an annular groove 496 is formed having a forward shoulder 498. At the rearward end of the threaded cap 486, a shoulder 500 is formed for engagement with the shoulder 498 at the forward end of the annular groove 496. The shoulders 498, 500 limit the axial movement of the threaded cap 486 in the forward axial direction.

When a bit 40 (not shown) is inserted into the polygonal cavity 478, the threaded cap 486 can be tightened against the O-ring 492 causing the O-ring 492 to expand radially inwardly to engage the bit 40 and secure the bit 40 within the cavity 478. In order to remove the bit 40, the threaded cap 486 can be rotated to release the clamping force against the O-ring 492 thereby allowing the O-ring 492 to disengage the bit 40 and allow the bit 40 to be removed.

The body 472 also includes an annular groove 502 located at an intermediate location along the body 472. The annular groove 502 is disposed in the exterior surface of the body and is elongated in the axial direction so as to receive a C-shaped hog ring 504 that is received in an annular recess 506 on the interior of the floating sleeve 474. The C-shaped hog ring 504 can travel axially along the length of the annular groove 502 to allow the floating sleeve 474 to float in a forward and rearward direction. The annular groove 502 has forward and rearward shoulders that limit the axial movement of the floating sleeve. The C-shaped hog ring 504 is flexible to allow removal of the floating sleeve 474 from the body 472 in order to gain access to the threaded cap 486 for tightening and loosening the cap 486 to allow insertion and removal of bits 40 from the polygonal cavity 478. A forward end of the floating sleeve 474 supports a ring magnet 50 that is allowed to move in forward and rearward directions to engage and magnetize a fastener to retain the fastener to the tool bit 40. A spacer sleeve 508 can be disposed rearward of the ring magnet 50 and can limit the rearward movement of the floating sleeve 474 by engagement with a forward end of the threaded cap 486.

In operation, the shank 476 can be inserted into a drill either directly or indirectly via a quick release chuck device. The floating sleeve 474 can be removed from the body 472 and a bit 40 can be inserted into the polygonal cavity 478. The magnet 482 would attract the tool bit 40 to the rearwardmost location within the polygonal cavity 478. The threaded cap 486 can then be tightened in the rearward direction R to cause the O-ring 492 to expand radially inward while being compressed and thereby engage the bit 40 and secure the bit 40 in the polygonal cavity 478. The floating sleeve 474 can then be slid over the end of the body 472 so that the C-shaped hog ring 504 is received within the annular groove 502 to limit the axial movement of the floating sleeve 474. When a fastener 54 (not shown) is brought into engagement with the tool bit 40, the floating sleeve 474 under the influence of the ring magnet 50 can slide axially forward to engage the fastener 54 to thereby magnetize the fastener 54 and retain it to the bit 40.

Figure 61A:
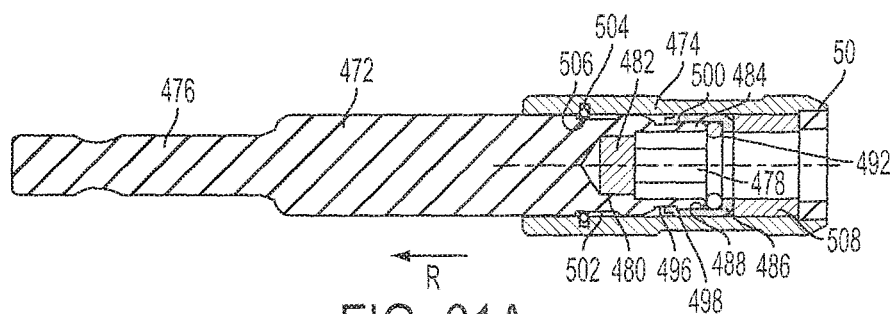
FIG. 61A is a longitudinal or axial cross-sectional view of the bit holder assembly of FIG. 60.
Figure 61B:
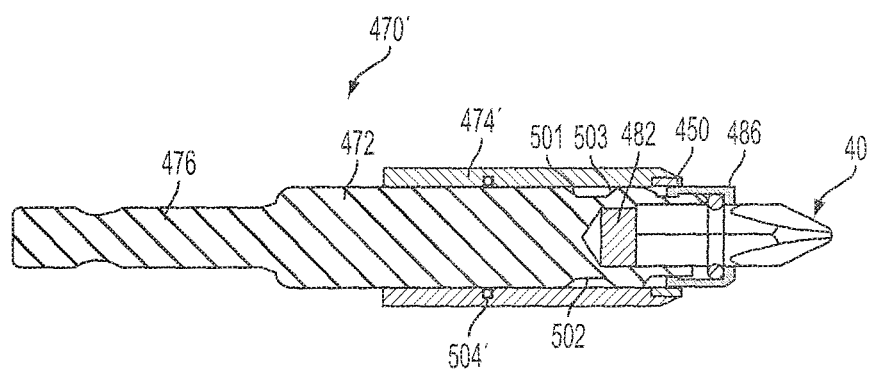
FIG. 61B is a longitudinal or axial cross-sectional view of an alternative embodiment of the bit holder assembly of FIG. 60.
Figure 62:
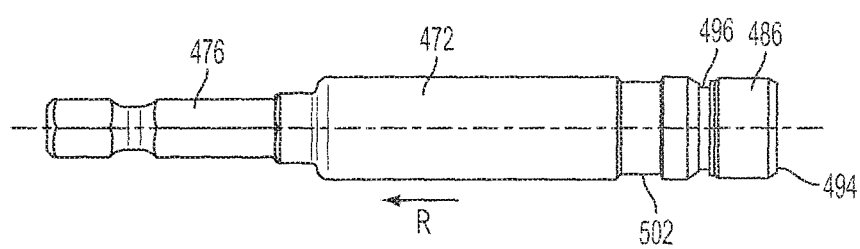
FIG. 62 is a side plan view of the body portion of the bit holder assembly shown in FIG. 60.
Figure 63:
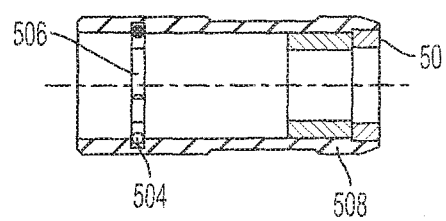
FIG. 63 is a longitudinal or axial cross-sectional view of the floating sleeve of the bit holder assembly of FIG. 60.
Figure 64:
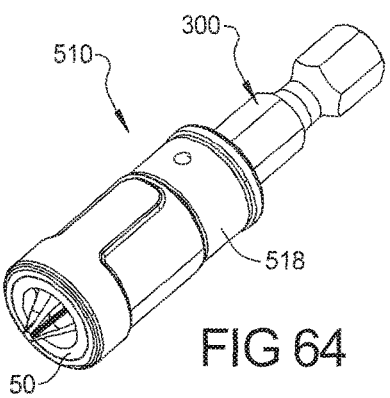
FIG. 64 is a perspective view of a tool bit and alternative floating sleeve design according to the present disclosure.

With reference to FIG. 61B, in an alternate embodiment, a bit holder assembly 470' may comprise the body 472, shank 476 and threaded cap 486 described above with a modified floating sleeve 474'. The floating sleeve 474' may include a retainer 504', such as an O-shaped or C-shaped elastic ring, that is received in the annular groove 502 on the exterior of the body 472 to allow the floating sleeve 474' to float between a forward position and a rearward position as limited by a forward shoulder 503 and a rearward shoulder 501 of the annular groove 502. The floating sleeve 474' supports a ring magnet 450 and that is allowed to move in forward and rearward directions to engage and magnetize a fastener to retain the fastener to the tool bit 40, as described above. The floating sleeve 474' differs from the floating sleeve 474 of FIG. 61A in that there is no spacer 508 and the floating sleeve 474' can be moved further rearward to a parked position as shown in FIG. 61B. In the parked position, the retainer 504' engages an outer wall of the body 472 (or a parking groove formed in the outer wall of the body 472). This exposes the threaded cap 486 to enable the threaded cap 486 to be removed from the body 472 without removing the floating sleeve 474' from the body 472.

With reference to FIGS. 64-70, an alternative arrangement of the floating sleeve 510, according to the principles of the present disclosure, will now be described. The floating sleeve 510 includes an elongated annular recess 512 on an outer surface thereof and a pair of tapered window openings 514 extending through the sleeve 510 opposite one another within the elongated annular recess 512. The window openings 514 each receive a ball 516 therein and a spring band 518 is received within the elongated annular recess 512 over top of the balls 516 to secure the balls 516 within the tapered window openings 514. The balls 516 are designed to be received in a reduced diameter portion 306 of the tool bit 300 between the forward and rearward shoulders 308, 310 to limit the axial movement of the floating sleeve 510 in the forward and rearward directions.

Figure 66:
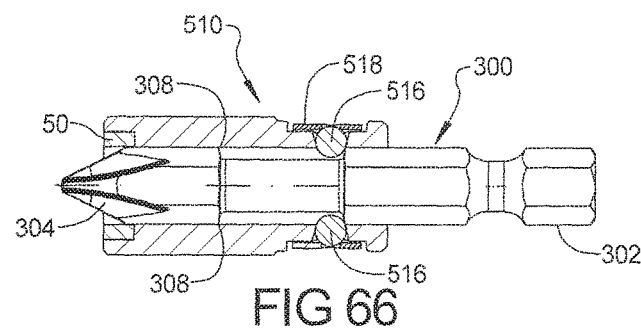
FIG. 66 is a cross-sectional view of the tool bit and floating sleeve shown in FIG. 64 with the floating sleeve in a rearward position.
Figure 65:
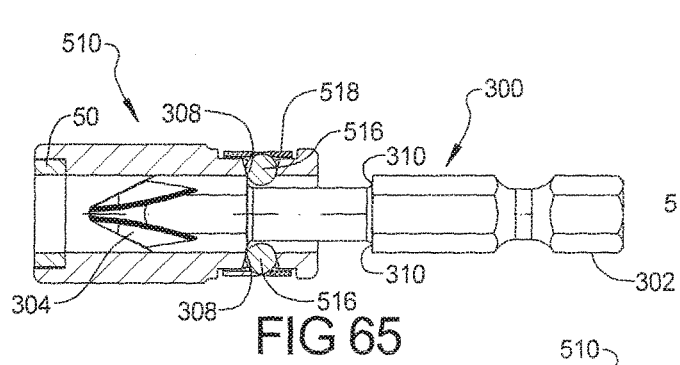
FIG. 65 is a cross-sectional view of the tool bit and floating sleeve shown in FIG. 64 with the floating sleeve in a forward position.
Figure 67:
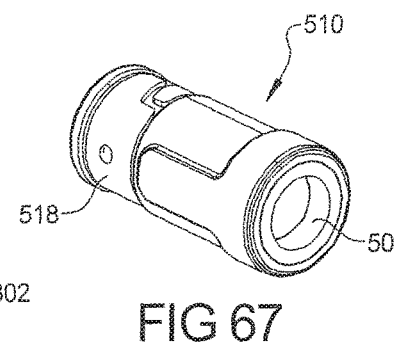
FIG. 67 is a perspective view of the floating sleeve shown in FIG. 64.
Figure 68:
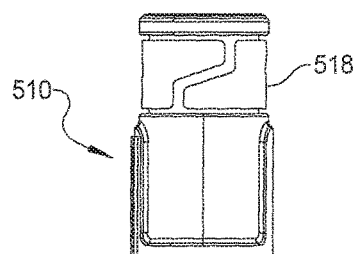
FIG. 68 is a side plan view of the floating sleeve shown in FIG. 64.
Figure 69:
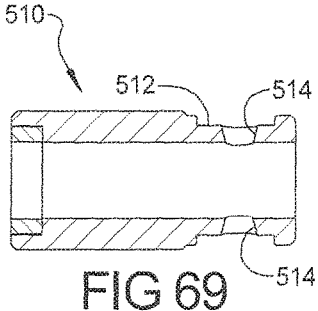
FIG. 69 is a longitudinal cross-sectional view of the floating sleeve shown in FIG. 64.
Figure 70:
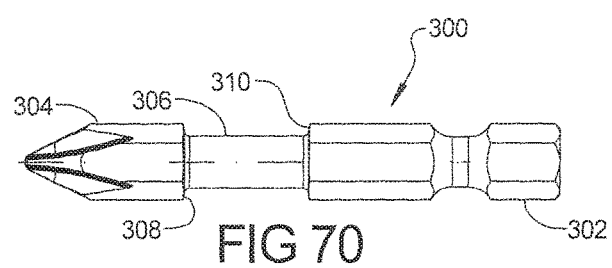
FIG. 70 is a side plan view of the tool bit shown in FIG. 64.
Figure 71A:
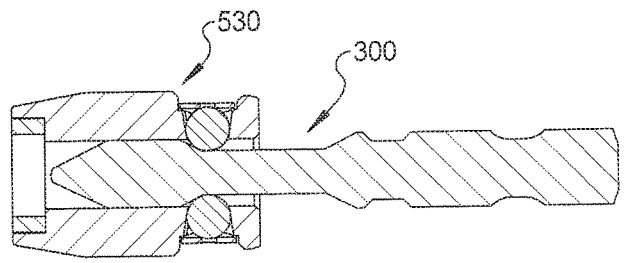
FIG. 71A is a cross-sectional view of a tool bit and floating sleeve according to a further embodiment of the present application with the floating sleeve shown in a forward direction.
Figure 71B:
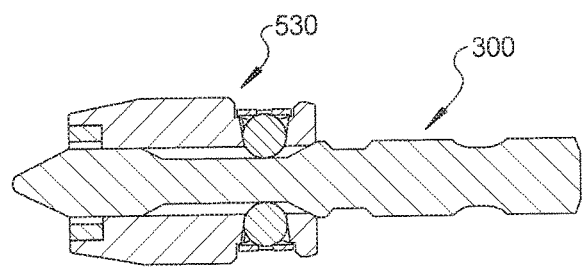
FIG. 71B is a cross-sectional view of the tool bit and floating sleeve shown in FIG. 71A with the floating sleeve in a rearward position.
Figure 72:
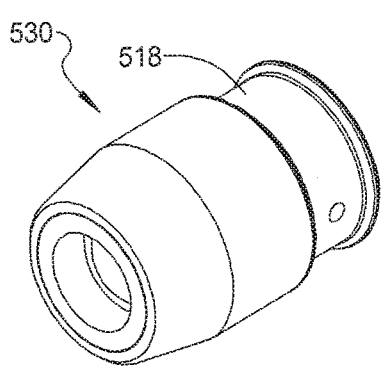
FIG. 72 is a perspective view of the floating sleeve shown in FIG. 71A.
Figure 73:
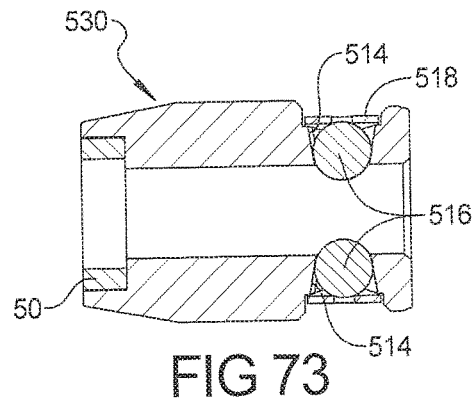
FIG. 73 is a longitudinal cross-sectional view of the floating sleeve assembly shown in FIG. 71A.
Figure 74:
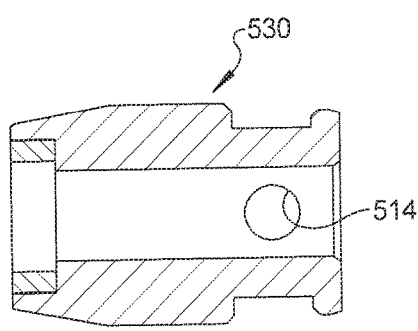
FIG. 74 is a longitudinal cross-sectional view of the floating sleeve shown in FIG. 71A.
Figure 75:
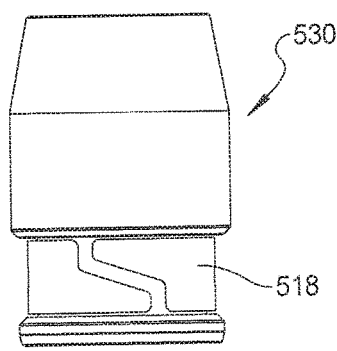
FIG. 75 is a side plan view of the floating sleeve shown in FIG. 71A.
Figure 78:
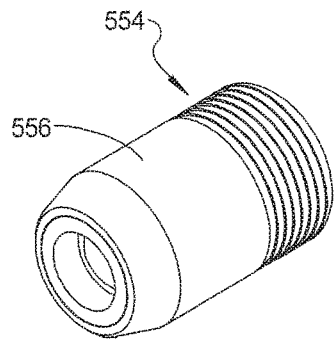
FIG. 78 is a perspective view of floating sleeve assembly shown in FIG. 76.
Figure 79:
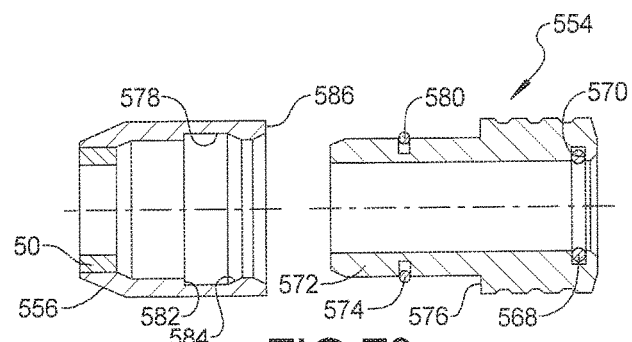
FIG. 79 is a disassembled cross-sectional view of the floating sleeve shown in FIG. 76.

During insertion of the tool bit 300 into the floating sleeve 510, the spring band 518 allows the balls 514 to be pushed radially outward against the spring force of the band 518 while the working region 304 of the tool bit 300 is inserted into, or removed from, the sleeve 510. As the balls 516 reach the reduced diameter portion 306 of the tool bit 300, the balls 516 move radially inwardly reducing the force of the spring band 518 on the balls 514. It is intended that the balls 514 provide an interference when engaging the forward and rearward shoulders 308, 310 of the reduced diameter portion 306, but do not provide significant resistance to the floating motion of the sleeve 510 along the tool bit 300. A ring magnet 50 is disposed at the forward end of the floating sleeve 510 and is designed to magnetize a fastener 54 (not shown) that is engaged to the bit 300. FIG. 65 shows the floating sleeve 510 in a forward position while FIG. 66 shows the floating sleeve 510 in a rearward position.

Referring also to FIGS. 89 and 90, the floating sleeve 510 can be received over the end of a double ended tool bit 900. The double ended tool bit 900 comprises a shaft 902 with a first working portion (e.g., a screw driving head) 904 at a first end 906 and a second working portion (e.g., a screw driving head) 908 at a second end 910. The shaft also includes a first reduced diameter portion 912 proximate the first working portion 904 and a second reduced diameter portion 914 proximate the second working portion 908. Each of the reduced diameter portions 912, 914 is defined by a front shoulder 916, 918 that is closer to the respective working portion 904, 908, and a rear shoulder 920, 922 that is further from the respective working portion 904, 908. The reduced diameter portions 912, 914 may function as torsion zones that reduce torsional stresses and breakage in the shaft 902.

Adjacent the first and second working portions 904, 908 are first and second shank portions 924, 926, each of which is disposed between the respective working portion 904, 908 and reduced diameter portion 912, 914. The shank portions 924, 926 each have a hex-shaped cross-section and are interrupted by an annular groove 928, 930. The first shank portion 924 is configured to be retained in a tool holder of a fastening tool when the second working region 908 is being used to drive a fastener. The second shank portion 926 is configured to be retained in a tool holder of a fastening tool when the first working region 904 is being used to drive a fastener. Disposed between the reduced diameter portions 912, 914 is an intermediate portion 932 also having a hex-shaped cross-section.

Referring also to FIGS. 90A and 90B, the floating sleeve 510 is alternatively receivable over the first end 906 of the tool bit 900 (FIG. 90A) or the second end 910 of the tool bit 900 (FIG. 90B). During insertion of the tool bit 900 into the floating sleeve 510, the spring band 518 allows the balls 514 to be pushed radially outward against the spring force of the band 518 while the working region 904, 908 of the tool bit 900 is inserted into, or removed from, the sleeve 510. As the balls 516 reach the respective reduced diameter portion 912, 914 of the tool bit 900, the balls 516 move radially inwardly reducing the force of the spring band 518 on the balls 514. The balls 514 provide an interference when engaging the forward shoulder 916, 918 and the rearward shoulder 920, 922 of the first and second reduced diameter portions 912, 914, but do not provide significant resistance to the floating motion of the sleeve 510 along the tool bit 900. The ring magnet 50 disposed at the forward end of the floating sleeve 510 floats forward to attract and magnetize the head of a fastener (not shown) that is engaged to the respective working region 904, 908 of the tool bit 900.

Referring to FIG. 92, another embodiment of a double ended tool bit 900' to be used with the floating sleeve 510 includes a shaft 902' with a first working portion (e.g., a screw driving head) 904' at a first end 906' and a second working portion (e.g., a screw driving head) 908' at a second end 910'. The shaft includes a single reduced diameter portion 912' disposed equidistant between the first working portion 904' and the second working portion 908'. The reduced diameter portion 912' is defined by a first shoulder 916' that is closer to the first working portion 904' and a second shoulder 920' that is closer to the second working portion 908'. The reduced diameter portions 912', 914' may function as torsion zones that reduce torsional stresses and breakage in the shaft 902'.

Adjacent the first and second working portions 904', 908' are first and second shank portions 924', 926', each of which is disposed between the respective working portion 904', 908' and reduced diameter portion 912', 914'. The shank portions 924', 926' each have a hex-shaped cross-section and are interrupted by an annular groove 928', 930'. The first shank portion 924 is configured to be retained in a tool holder of a fastening tool when the second working region 908 is being used to drive a fastener. The second shank portion 926 is configured to be retained in a tool holder of a fastening tool when the first working region 904 is being used to drive a fastener. The floating sleeve 510 is alternatively receivable over the first end 906' or the second end 910' of the tool bit 900'. In either case, the balls 514 are received in the reduced diameter portion 912' and move between the first shoulder 916' and the second shoulder 920', which allows the sleeve 510 to float relative to the respective working region 904', 908' of the tool bit 900'.

Referring to FIG. 93, another embodiment of a double ended tool bit 900" to be used with the floating sleeve 510 includes a shaft 902" with a first working portion (e.g., a screw driving head) 904" at a first end 906" and a second working portion (e.g., a screw driving head) 908" at a second end 910". The shaft also includes a first reduced diameter portion 912" proximate the first working portion 904" and a second reduced diameter portion 914" proximate the second working portion 908". Each of the reduced diameter portions 912", 914" is defined by a front shoulder 916", 918" that is closer to the respective working portion 904", 908", and a rear shoulder 920", 922" that is further from the respective working portion 904", 908". The reduced diameter portions 912", 914" may function as torsion zones that reduce torsional stresses and breakage in the shaft 902".

Adjacent the first and second working portions 904", 908" are first and second shank portions 924", 926", each of which is disposed between the respective working portion 904", 908" and reduced diameter portion 912", 914". The shank portions 924", 926" each have a hex-shaped cross-section and are interrupted by an annular groove 928", 930". The first shank portion 924" is configured to be retained in a tool holder of a fastening tool when the second working region 908" is being used to drive a fastener. The second shank portion 926" is configured to be retained in a tool holder of a fastening tool when the first working region 904" is being used to drive a fastener. Disposed between the reduced diameter portions 912", 914" is an intermediate portion 932" having a hex-shaped cross-section and a third reduced diameter portion 934". The third reduced diameter portion 934" may function as yet another torsion zone that reduces torsional stresses and breakage in the shaft 902".

The floating sleeve 510 is alternatively receivable over the first end 906" or the second end 910" of the tool bit 900". In either case, the balls 514 are received in the reduced diameter portion 912" and move between the first shoulder 916" and the second shoulder 920", which allows the sleeve 510 to float relative to the respective working region 904", 908" of the tool bit 900".

FIGS. 71-75 illustrate an alternative arrangement of the floating sleeve 530 which is arranged with the same construction as the floating sleeve 510 with different external dimensions and appearance. Accordingly, the same reference numerals used for describing the components of the floating sleeve 510 are used for the components of the floating sleeve 530 and a detailed description of the floating sleeve 530 is not believed to be necessary, other than to note that its dimensions are different from that of the ring magnet assembly 510 in order to be used with a different type of bit having a smaller working head region and/or longer reduced diameter portion.

With reference to FIGS. 76-81, an alternative tool bit assembly 550 will now be described. The tool bit assembly 550 includes a tool bit 552, a base collar 554 that is received on the tool bit 552, and a floating sleeve 556 that is slidably received on the base collar 554. A front end of the sleeve 556 is tapered inwardly. This intuitively prevents the user from attaching the sleeve backwards on the bit.

Figure 76:
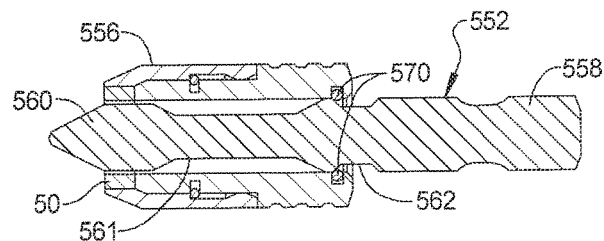
FIG. 76 is a cross-sectional view of a tool bit and floating sleeve according to a further embodiment of the present application.
Figure 80:
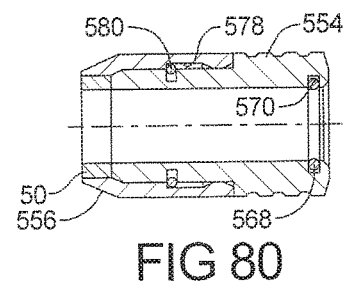
FIG. 80 is a cross-sectional view of the floating sleeve shown in FIG. 76 with the floating sleeve in a rearward position.
Figure 77:
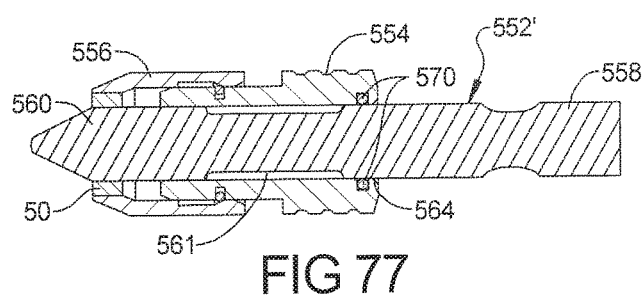
FIG. 77 is a cross-sectional view of the floating sleeve shown in FIG. 76 with an alternative tool bit.
Figure 81:
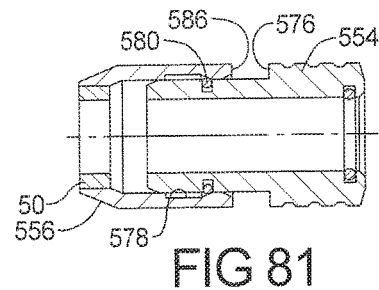
FIG. 81 is a cross-sectional view of the floating sleeve shown in FIG. 76 with the floating sleeve in a forward position.

As shown in FIG. 76, the tool bit 552 can be of the type that includes a shank portion 558 and a working end 560 with a reduced diameter portion 561 and an annular groove 562 disposed in an intermediate location thereon. As an alternative, the tool bit 552', as shown in FIG. 77, can include recessed grooves at the corner edges of the hex-shaped shank 558 instead of the annular groove 562.

The base collar 554 includes an internal recessed groove 568 that receives a retainer ring 570 therein. The retainer ring 570 is designed to be received in the annular groove 562 of the tool bit 552 or within the recessed grooves 564 of the alternative bit 552'. Retainer ring 570 secures the base collar to the tool bit 552, 552'. The base collar 554 includes a reduced diameter portion 572 having a recessed groove 574 in an outer surface thereof. A stop shoulder 576 is disposed at a rearward end of the reduced diameter portion 572. The floating sleeve 556 is movably received on the reduced diameter portion 572. The floating sleeve 556 includes an internal annular groove 578 that receives a retaining ring 580 received in the recessed groove 574. Retaining ring 580 limits the axial movement of the floating sleeve 556 via the forward and rearward shoulders 582, 584 of the annular groove 578. The rearward end 586 of the floating sleeve 556 engages the stop shoulder 576 of the base collar 554. A ring magnet 50 is received in a forward end of the floating sleeve 556 and is designed to magnetize a fastener to retain the fastener to the working head region 560 of the tool bit 552.

Figure 82:
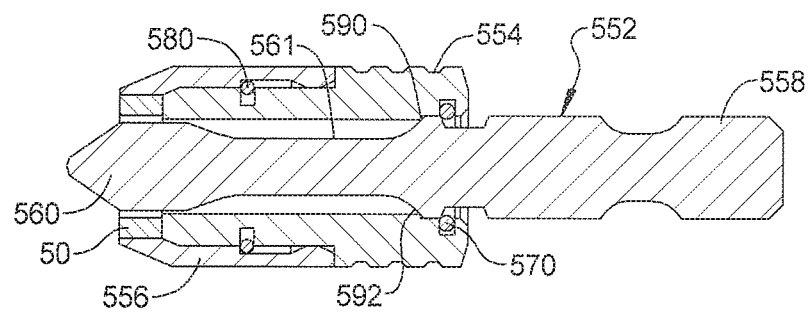
FIG. 82 is a cross-sectional view of a tool bit and floating sleeve according to a further embodiment of the present application.
Figure 83:
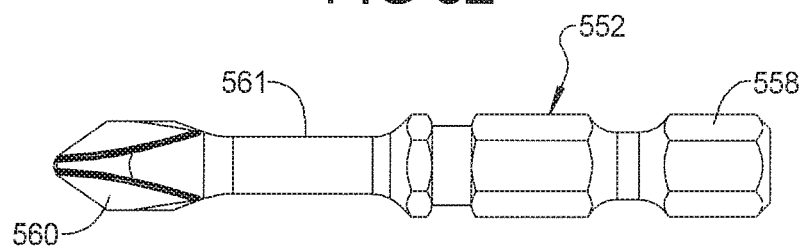
FIG. 83 is a side plan view of the tool bit shown in FIG. 82.
Figure 84:
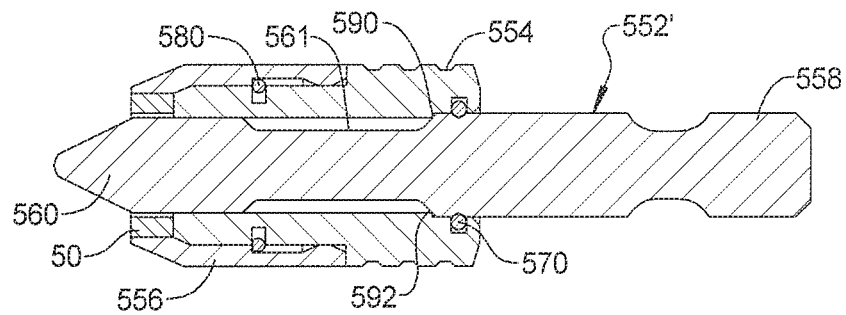
FIG. 84 is a cross-sectional view of a tool bit and floating sleeve according to a further embodiment of the present application.
Figure 85:
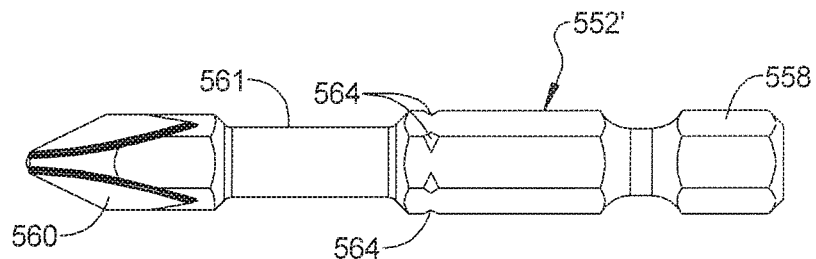
FIG. 85 is a side plan view of the tool bit shown in FIG. 84.
Figure 86:
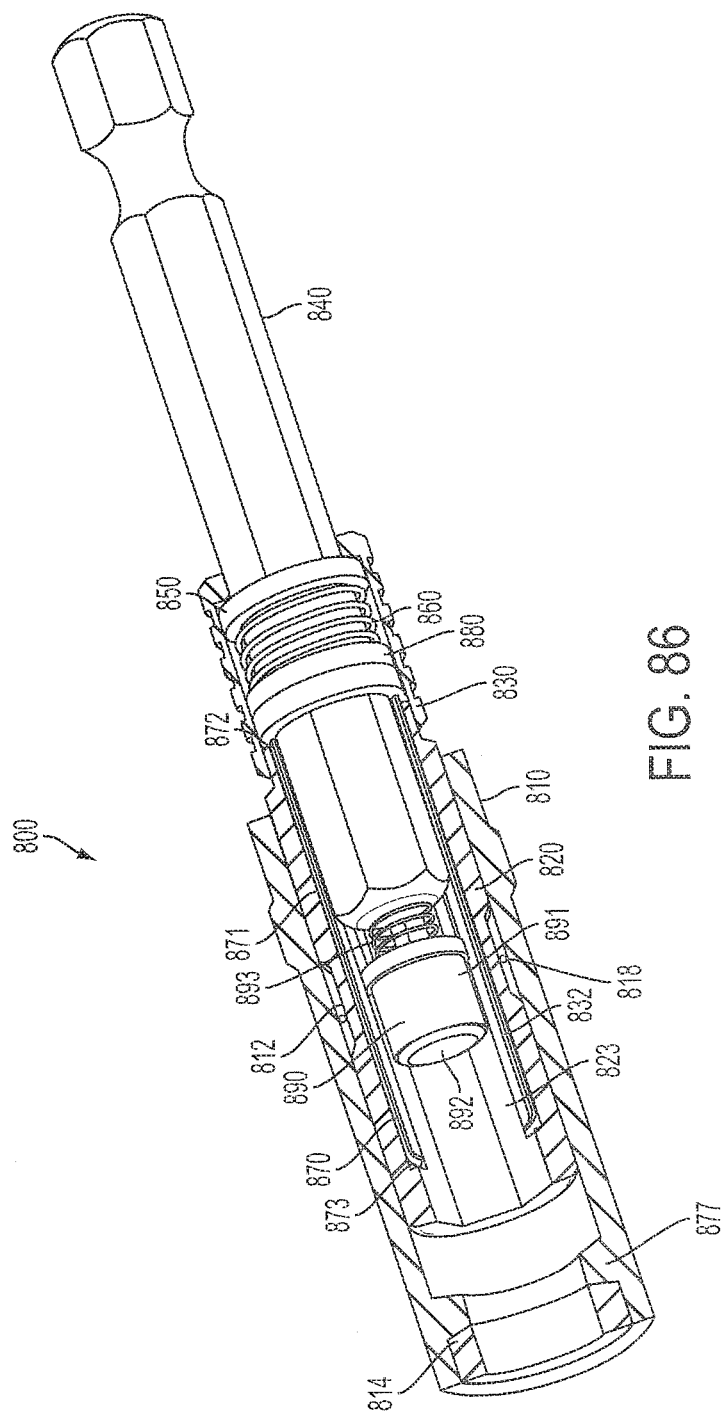
FIG. 86 is a partial cross-sectional perspective view of another embodiment of a tool bit holder assembly.

With reference to FIGS. 82-85, the base collar 554' of the tool bit assembly 550 of FIGS. 76-81 has been modified to include an internal shoulder portion 590 that engages a forward shoulder 592 of the reduced diameter portion 561 of the tool bit 552. The shoulder portion 590 and the retainer ring 570 secure the base collar 554' relative to the tool bit 552 so that the movement of the floating sleeve 556 can be better controlled. FIGS. 82 and 84 show the modified base collar 554' engaged with alternative tool bits 552, 552'.

With reference to FIGS. 86-88C, a bit holder assembly 800 includes a body portion 820 coupled to a shank 840, and a floating sleeve 810 received over the body portion 820. The body portion 820 and shank 840 are similar to the sleeve 20 and connecting rod 40 of the bit holder described in U.S.

Pat. App. Pub. No. 2012/0126497, titled "Small Outer Diameter Quick Release Extension Rod," which is incorporated herein by reference ("the '497 application"). As described in greater detail in the '497 application, the body 820 includes a socket 823 configured to receive a tool bit 40. A pair of lateral accommodation portions 832 is defined in a circumference of the socket 823. A pair of elongated elastic elements 870 are each received in the lateral accommodation portions 832. Each elongated elastic element 870 is sheet shaped and includes a body portion 871 connected between a pushed end portion 872 and an engaging end portion 873, which extends from the body portion 871 at an angle of approximately 45±15 degrees.

An actuator sleeve 830 is received over the shank 840 and a rear end of the body 820 and is moveable axially relative to the body 820 and the shank 840. A return spring 860 is held axially by a first positioning ring 850 that is fixedly connected to the shank 840. The return spring 860 biases the actuator sleeve 830 toward a forward or locked position. The actuation sleeve 830 is fixedly connected to a second positioning ring 880. The second positioning ring 880 is fixedly connected to the pushed end portions 872 of the elongated elastic elements 871. When the actuator sleeve 830 is in its forward position (as shown in FIG. 4 of the '497 application), the engaging end portions 873 of the elongated elastic elements 870 project into the socket 823 to engage and retain a tool bit 40 in the socket 823. When the actuator sleeve 830 is retracted against the force of the return spring 860 (as shown in FIG. 6 of the '497 application), the second positioning ring 880 pulls the end portions 872 of the elongated elastic elements 870 to retract the engaging end portions 873 from the socket 823, enabling removal of the tool bit 40 from the socket 823.

Inside of the socket 823 is an ejection mechanism 890 includes a plunger 891, a magnetic element 892 and an elastic element 893. The magnetic element 892 is disposed on one end of the plunger 891, and the other end of the plunger 891 abuts against one end of the elastic element 893. The other end of the elastic element 893 abuts against an end of the connecting rod 840. The magnetic element 892 faces toward front end of the socket 823. When a tool bit is inserted into the socket 823, the elastic element 893 is compressed. When the tool bit is released from the socket 823, the elastic element 893 pushes the plunger 891 toward the open end of the socket, causing at least partial ejection of the tool bit out of the socket 823. This helps enable removal of the tool bit from the socket 823. The magnetic element 892 prevents the tool bit from being fully ejected from the socket 823 when the actuator sleeve 830 is retracted to release the tool bit.

The outer surface of the body 820 is provided with an elongated annular recess 812. The floating sleeve 810 is substantially surrounds the body 820 and supports a ring magnet 814 at an end thereof. The floating sleeve 810 includes an interior annular groove 816 that receives a retainer 818 therein. The floating sleeve 810 can be removably attached to the body 820 by force fitting the body 820 into a rear opening 822 of the floating sleeve 810 until the retainer 818 is received in the recess 812 of the body 820.

Figure 87A:
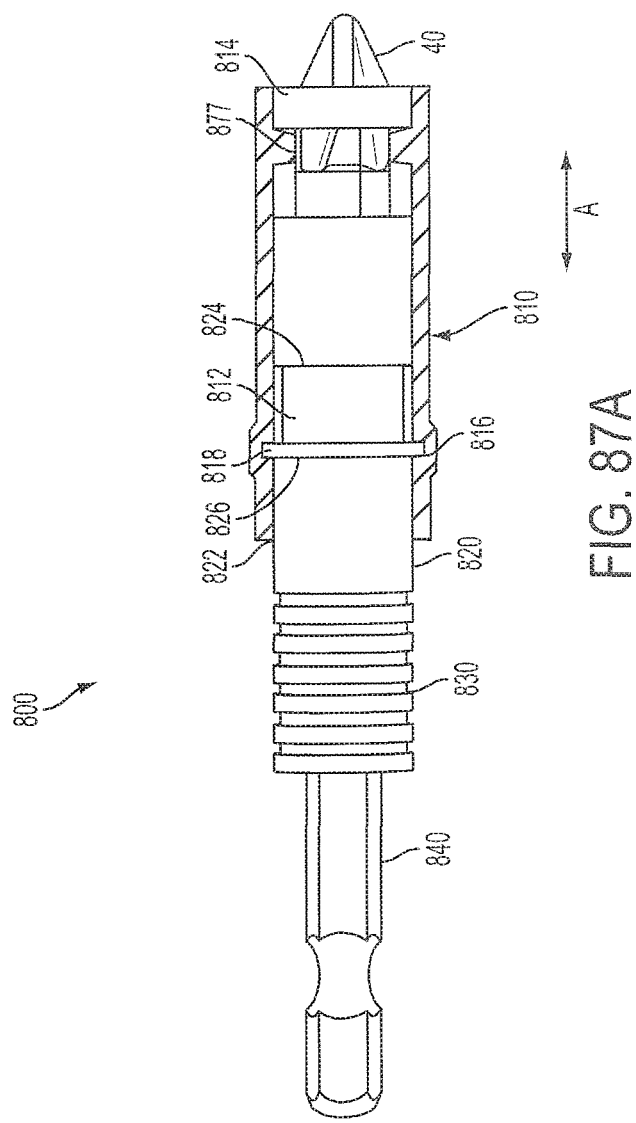
FIGS. 87A-87B are partial cross-sectional plan views of the tool bit holder assembly of FIG. 86.
Figure 87B:
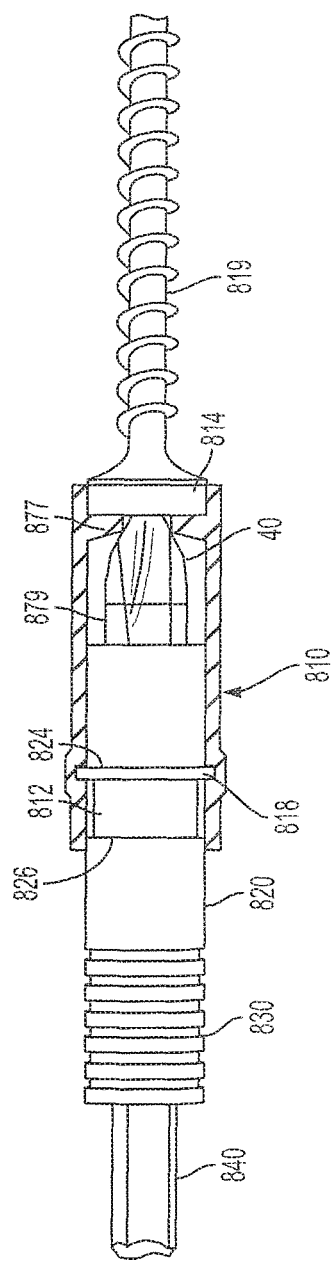
Figure 88C:
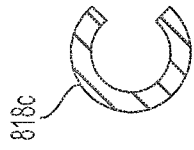
FIGS. 88A-88C are plan views of various retention members for use with the bit holder assemblies of FIGS. 87A-87C.
Figure 88B:
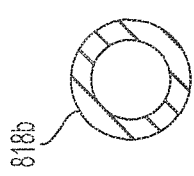
Figure 88A:
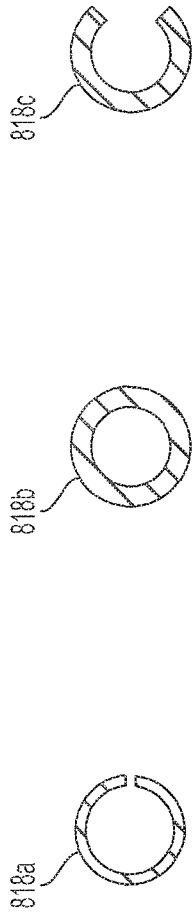
Figure 94:
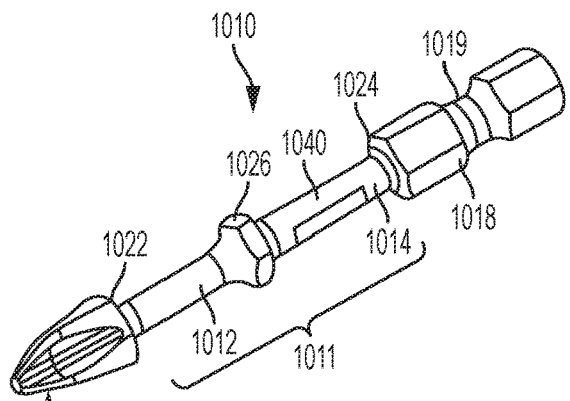
FIG. 94 is a perspective view of an embodiment of a screw driving bit with two torsion zones according to the principles of the present disclosure.
Figure 95:
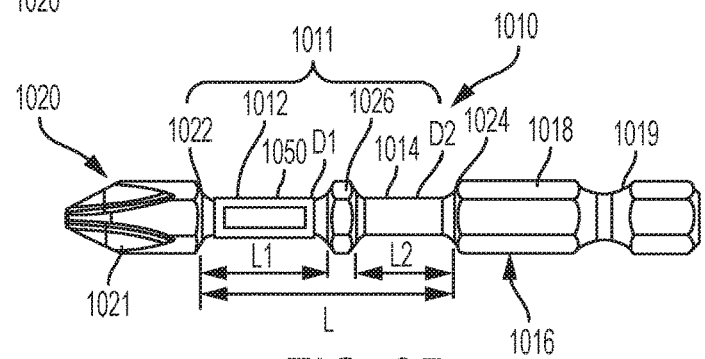
FIG. 95 is a side plan view of the screw driving bit shown in FIG. 94.
Figure 96:
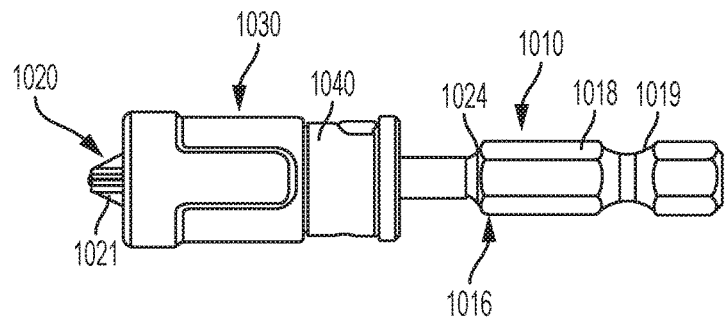
FIG. 96 is a side plan view of the screw driving bit of FIG. 94 with a floating magnet sleeve mounted thereon.
Figure 97:
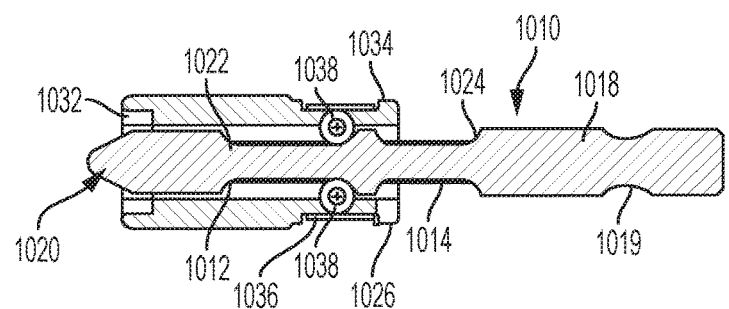
FIG. 97 is a cross-sectional view of the screw driving bit and floating magnet sleeve shown in FIG. 96.
Figure 98:
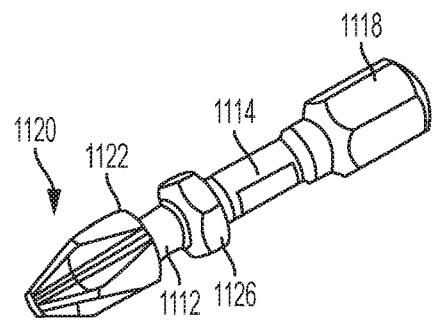
FIG. 98 is a perspective view of another embodiment of a screw driving bit with two torsion zones having a shorter length than the screw driving bit of FIG. 94.
Figure 99:
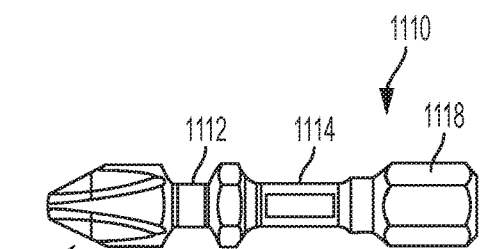
FIG. 99 is a side plan view of the screw driving bit shown in FIG. 98.

The recess 812 is provided with a forward shoulder 824 and a rearward shoulder 826 that allow the floating sleeve 170 to travel in a forward and rearward direction as indicated by arrow A while the shoulders 824 and 826 limit the travel of the floating sleeve 810 by engagement with the retainer member 818. Thus, the floating sleeve can float freely between a rear position, as shown in FIG. 87A, in which the retainer 818 engages the rear shoulder 826, and a front position as shown in FIG. 87B, in which the retainer 818 engages the front shoulder 824 and the ring magnet 814 can engage the head of a threaded fastener 819. As shown in FIGS. 88A-88C, the retainer 818 can take the form of a non-elastic member, such as a steel hog ring 818a, as shown in FIG. 88A, or an elastic member, such as an elastic O-ring 818b as shown in FIG. 88B or an elastic C-ring 818c as shown in FIG. 88C.

Figure 87C:
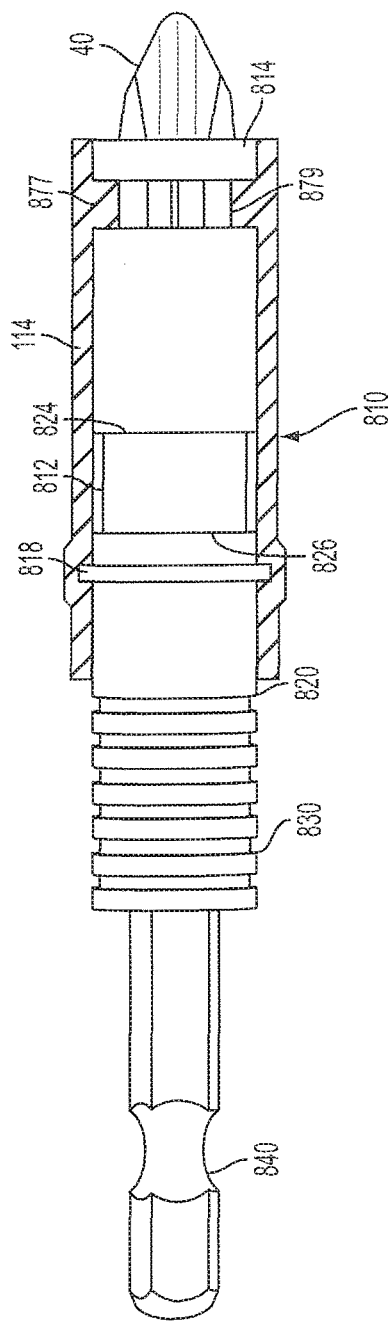
FIG. 87C is a partial cross-sectional plan view of an alternative embodiment of the tool bit holder assembly of FIG. 86.

With reference to FIG. 87C, in an alternative embodiment, the floating sleeve 810 can also be moved rearward to a parked position in which the retainer 818 is positioned rearward of the rear shoulder 826. In this embodiment, the retainer 818 comprises an elastic element (such as an elastic O-ring 818b or an elastic C-ring 818c) that is stretched and expands when the floating sleeve 810 is pulled axially rearward to the parked position. The expanded elastic retainer 818 frictionally engages the outer wall of the body portion 820 in a tight manner to maintain the floating sleeve 810 in the parked position until the user pulls the floating sleeve 810 forward back to one of the floating positions shown in FIGS. 87A and 87B. An internal shoulder 877 on the front end of the floating sleeve 810 abuts a front end 879 of the body portion 820 to prevent further rearward movement of the floating sleeve 810 beyond the parked position. In the parked position, it is easier for the user to grasp and remove the bit 40 when it is ejected from the socket 823 when the actuator sleeve 830 is retracted. In another embodiment, similar to the embodiment of FIG. 12E, the body portion 820 may be formed with an annular parking groove rearward of the annular recess 812 to more securely retain the retainer 818 and the floating sleeve 810 in the parked position.

With reference to FIGS. 94-97, in another embodiment, a torsion tool bit 1010 having a torsion zone 1011, according to the principles of the present disclosure, will now be described. The tool bit 1010 is formed from a shaft 1016 having a polyogonal (e.g., hex-shaped) shank 1018 at a first end, and a fastening bit tip or working region 1020 disposed at a second end. The shank 1018 includes an annular groove 1019 that is configured to receive a retaining member in a bit holder of a power tool. The shaft 1016 includes the torsion zone 1011, which in this example, includes a pair of torsion sub-zones 1012, 1014 defined by a pair of reduced diameter regions disposed between two shoulders 1022, 1024 and an intermediate shoulder 1026. The pair of torsion sub-zones 1012, 1014 allow the shaft 1016 to twist to absorb forces while the tool bit 1010 is being used to drive a fastener. The torsion tool bit is particularly well suited for use with an impact tool that delivers drive impulses at high speeds and at high toque levels. The two torsion sub-zones 1012, 1014 can have the same or different lengths L1, L2 and the same or different diameters D1, D2, while the torsion zone 1011 has an overall length L.

As illustrated in FIGS. 94-97, the working region 1020 of the torsion tool bit 1010 can be provided with a Phillips head fastening bit tip 1021 while other fastening bit tips such as a star tip 1070 (as shown in FIG. 14), flat, hex, square, and other known types of drive heads can also be used with a dual torsion zone and/or optimized torsion zone according to the principles of the present disclosure.

With reference to FIGS. 94-97 a floating sleeve 1030 supporting a ring magnet 1032 at a forward end can be retained on the tool bit 1010. In one embodiment, the floating sleeve 1030 may be similar to the floating sleeve 510 shown in FIGS. 64-70. In this embodiment, the floating sleeve 1030 includes an elongated annular recess 34 on an outer surface thereof and a pair of tapered window openings 1036 extending through the sleeve 1030 opposite one another within the region of the elongated annular recess 1034. The window openings 1036 each receive a ball 1038 therein and a spring band 1040 is received within the elongated annular recess 1034 over top of the balls 1038 to secure the balls 1038 within the tapered window openings 1036. The balls 1038 are designed to be received in the forward torsion zone 1012 of the tool bit 1010 between the forward and intermediate shoulders 1022, 1026. The length of the forward torsion zone 1012 can be designed to allow a desired amount of movement of the floating sleeve 1030 on the tool bit 1010. The ring magnet 1032 is disposed at a forward end of the floating sleeve 1030 and is designed to magnetize a fastener that is engaged to the fastening bit tip 1020. Other embodiments of floating magnet sleeves usable with the tool bit 1010 are disclosed elsewhere in this application.

One or both of the torsion zones 1012, 1014 can be provided with an over-molded plastic or elastomeric branding strip or band 1050 that can include the company or product name or other information. The branding strip 1050 can extend over a predetermined length of the torsion zone(s) and can alternatively be in the form of an adhesive band.

The present disclosure provides a method of designing the torsion bit 1010 with a torsion zone 1011 that is geometrically optimized for fatigue life when used with an impact driver. The optimization uses the principle of wave attenuation. More specifically, an energy wave can be attenuated as it travels through the torsion zone 1011. An energy wave in a fastening tool bit generated by modern powerful impact drivers delivers a large amount of torsional impact energy to the screw driving bit 1010. The amplitude of the energy wave may be far greater than what an ordinary fastening tool bit (even with a torsion zone) can handle, causing an ordinary fastening tool bit to break instantly, or at a low impact cycle count. These types of failures typically occur when a fastener is fully inserted in a workpiece with the head bottomed out against the workpiece so that an impact against the tool bit is fully absorbed by the tool bit 1010. The frequency of such an impact wave may be on the order of approximately 50 Hz.

The design optimization method uses a geometrically optimized torsion zone 1011 between the shank 1018 (starting point of the wave) and the fastening bit tip 1020 (end point of the wave). The torsion zone 1011 is used to attenuate the amplitude of the wave by dissipating at least some of the wave energy to elastically twist the torsion zone 1011. In other words, the torsion zone 1011 functions as a torsion spring. The simplest and most well understood mathematical model for the torsion zone 1011 is a cylinder. For purposes of the present method, the torsion zone 1011 can comprise a single torsion zone (e.g., as disclosed in the embodiments of FIGS. 16-19) or a dual or multiple torsion sub-zones 1012/1014 (e.g., as disclosed in the embodiments of FIGS. 1-9, 14 and 15). The intermediate shoulder 1026 between the torsion subzones 12/14 has little effect on the torsion spring properties of the overall torsion zone 1011. Instead, the main purpose of the intermediate shoulder 1026 is to provide a stop for the floating magnet sleeve.

Figure 102:
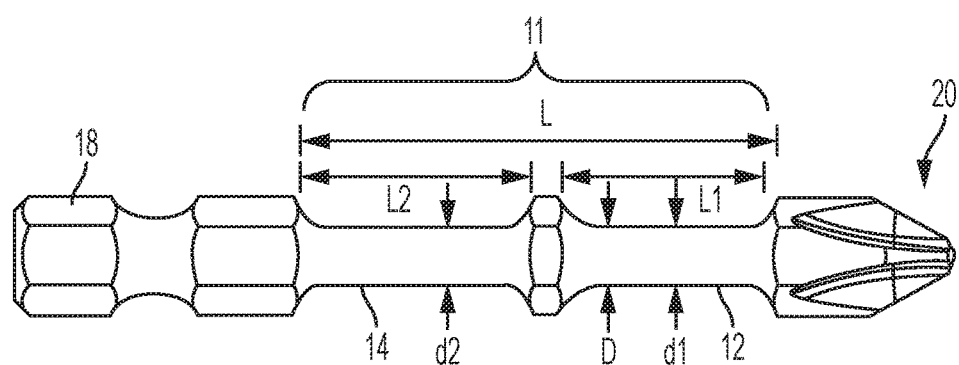
FIG. 102 is a side plan view of the screw driving bit of FIG. 94 illustrating the relevant dimensions of the torsion zones.
Figure 103:
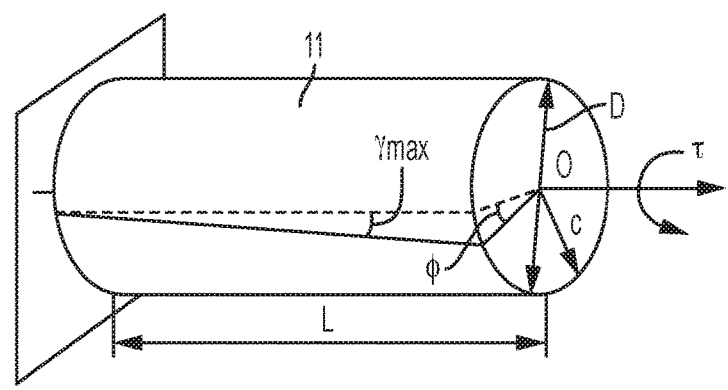
FIG. 103 is a schematic illustration of a torsion zone for illustrating the relevant criteria for optimization of the torsion zone according to the principles of the present disclosure.

The torsion zone 1011 (whether single or multiple sub-zones) is mathematically modeled as a cylinder functioning as a torsion spring. The two dimensions to be optimized are the cylinder length (L) and its diameter (D) or radius (c), as illustrated in FIGS. 102 and 103. It is well known from classical mechanics that the potential energy of a torsion spring ($PE_{spring}$) and its twist angle ($\phi$) are related by a constant k as follows:

$$PE_{spring} = \tfrac{1}{2} k \cdot \phi^2 \quad (1)$$

A conservation of work and energy analysis yields the following:

$$\text{Work} = E_{in} - Q - PE_{spring} \quad (2)$$

where Work is the work delivered to the fastening bit tip 20, Q is the heat generated by cyclic loading of the torsion zone 11, and $E_{in}$ is the kinetic energy delivered by the power tool. Equation (2) gives us a mechanism to calculate the amount of Work that is delivered to the fastening bit tip 20. Although the kinetic energy $E_{in}$ delivered by the power tool may be greater than the bit 10 can handle under high load applications, this kinetic energy $E_{in}$ is reduced by the amount of heat Q generated and the potential energy $PE_{spring}$ of the spring.

Heat Q is the amount of heat generated is a function of the frequency of the energy wave ($Ei_n$) and the angle of twist ($\phi$). The higher the frequency and the higher the angle of twist, the higher the heat is expected to be.

$PE_{spring}$ can be increased by either increasing k or increasing $\phi$. The present disclosure focuses on the fact that the $\phi$ is inversely proportional to k (see Equation 3 below). In other words, as the spring constant k increases, $\phi$ decreases. So both k and $\phi$ are working against each other. The important thing to recognize is that $\phi$ is squared in Equation 1, so it will dominate over k. Based on the above analysis, it is clear that the objective is to optimize length (L) and the cross sectional radius (c) (the torsion zone geometry) to achieve the highest angle of twist $\phi$. It is also well known from classical mechanics that:

$$\phi = \frac{T}{k} \quad (3)$$

where T is a given torque; and, $$k = \frac{J \cdot G}{L} \quad (4)$$

where, J is the polar moment of inertia, L is the length of the cylinder and G is the shear modulus, a property of the material from which the bit is made. For a round cross-section around the center axis the polar moment of inertia is:

$$J = \tfrac{1}{2} \pi \cdot c^4 \quad (5)$$

Substituting J into Equation 4 and the resulting equation into Equation 3, then:

$$\phi = T \left( \frac{2L}{\pi \cdot c^4} \right) \frac{1}{G} \quad (6)$$

The geometric parameters L and c are arranged inside the parenthesis. For any given torque T, $\phi$ will increase if the length L is increased, or the radius c is decreased. And, as discussed above, an increase in $\phi$ will attenuate the input energy wave $E_{in}$ by converting more of the energy into spring potential $PE_{spring}$ and heat (Q).

Equation 6 presents a simplified picture because the torque T is not a constant. In fact, torque T is a function of the spring constant k. Without knowing the relation between torque T and the spring constant k, then Equation 6 can only be used as a guide as to how to alter the parameters length L and radius c.

It has been discovered that when breakage of the bit occurs approximately half of the time in the fastening bit tip and about half of the time in the torsion zone, the cycle life of the tool bit tends to be at a maximum. The fatigue life of the bit is directly related to the cross sectional areas of the torsion zone and the tip. When the stress on the torsion zone is higher than the stress on the tip, the torsion zone fails first and when the stress on the tip area is higher than the stress on the torsion zone, the tip fails first. When the maximum stress on the tip equals the maximum stress on the torsion zone, the bit reaches its optimal fatigue life. Through experimentation, one can determine the spring constant k at which this peak life tends to occur. By knowing the optimal spring constant k for a particular type of material and a particular fastening bit tip type (e.g., Phillips, star, etc.), one can design a bit having the optimal torsion zone length L and diameter D.

Figures 104A, 104B:
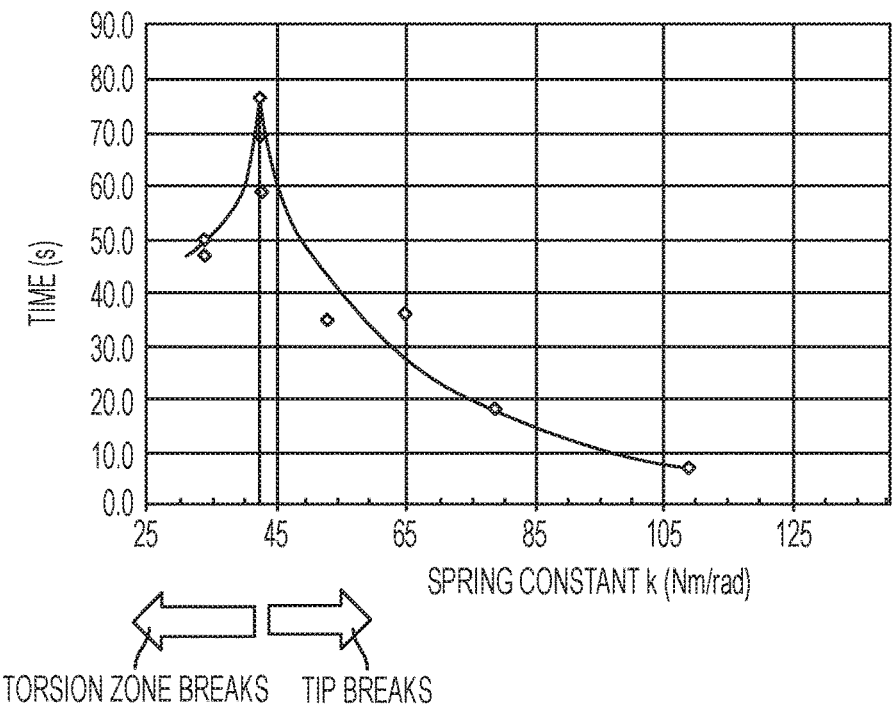
FIG. 104A is a plot of the cycle life of a Phillips 2 bit-tip geometry measured in seconds averaged of at least four samples versus spring constant k.
FIG. 104B is a reproduction of Table 6 of ISO standard 8764-1 illustrating the minimum torque requirements for various bit tip types.

In one embodiment, test samples were created using the above equations as a guide and the samples were tested. The experimental results are shown in the graph in FIG. 104A. The graph in FIG. 104A is a plot of the spring constant k vs. cycle life (time in seconds) for a 2.5 inch tool bit with a Phillips #2 Head. The peak represents the optimized spring constant k where approximately half of the bits failed in the torsion zone and approximately half of the bits fall at the bit tip. It is anticipated that every bit-tip type and geometry will have a similar graph. According to the present disclosure, the torsion zone length and diameter is tuned to the particular bit-tip geometry in-order to operate at the optimized peak where an approximate equal number of bits fall at the bit tip and at the torsion zone.

For the optimized 2.5 inch tool bit with a Phillips #2 head that was tested, the first torsion sub-zone 1012 had a length L1 in a range from approximately 8 mm to approximately 12 mm, e.g. approximately 10 mm and a radius (c) in a range from approximately 1.6 mm to approximately 2.0 mm, e.g. approximately 1.8 mm and the second torsion sub zone 1014 had a length L2 in a range from approximately 10 mm to approximately 15 mm, e.g. approximately 12.5 mm and a radius (c) in a range from approximately 1.6 mm to approximately 2.0 mm, e.g. approximately 1.8 mm. It is noted that there are a myriad of possible combinations of c, L1 and L2 since k is proportional to $c^4/(L1+L2)$. The distance L1 is constrained by the amount of float of the magnet sleeve, and the overall c, L1, L2 is limited by the International Standard ISO 8764-1. In particular, International Standard-ISO 8764-1 specifies the shapes and dimensions, technical requirements and torque test methods for the tips of hand drivers and of machine operated bits for cross-recessed head screws. The standard also provides torque test requirements for various sizes and types of bit tips. In particular, FIG. 104B illustrates Table 6 of ISO 8764-1 which lists the minimum torque ($M_{machine}$) at which the driver tips shall not exhibit any fracture or permanent distortion. According to the present method, the optimized torsion zone must be able to transmit at least this minimal amount of torque to the bit tip. For example, for a type 2 Phillips tip a minimum torque of 10.3 N·m is required to be transmitted. If the optimized torsion zone for a particular bit tip does not satisfy this minimal ISO torque requirement, the bit design may need to be altered accordingly. There also may be a limit on how long the bit can be for user ergonomics.

Figure 105:
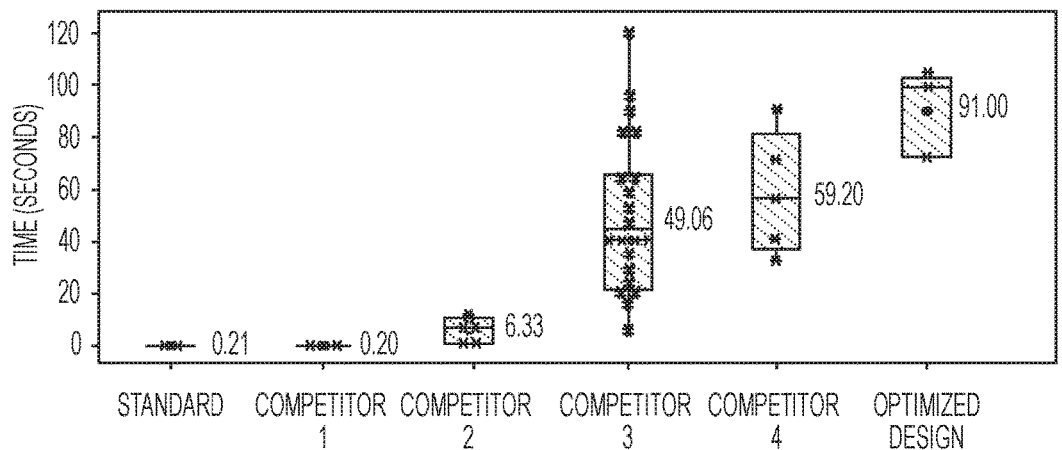
FIG. 105 is a plot illustrating the run time in seconds until breakage of several 2 inch and 2½ inch bit samples.

The graph in FIG. 105 shows the relative performance of the optimized 2.5 inch Phillips #2 screwdriver bit 1010 designed according to the principles discussed above versus other competitor Philips #2 torsion bit products. The vertical axis shows the run time in seconds until breakage of a tool bit that is installed in a test apparatus that simulates an impact driver driving a screw that is fully inserted. The optimized design according to the principles of the present disclosure averaged 91 seconds until breakage while the closest similarly sized competitor torsion bit lasted an average of 59 seconds until breakage. Other competitor torsion bit designs averaged even less time until breakage.

Figure 100:
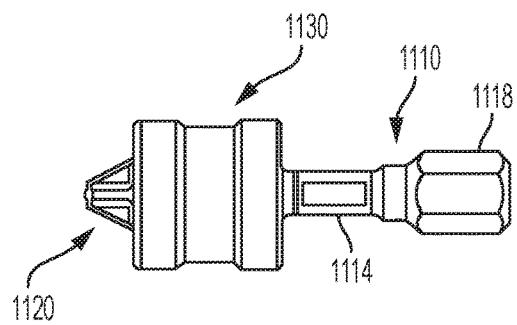
FIG. 100 is a side plan view of the screw driving bit of FIG. 98 with a floating magnet sleeve mounted thereon.
Figure 101:
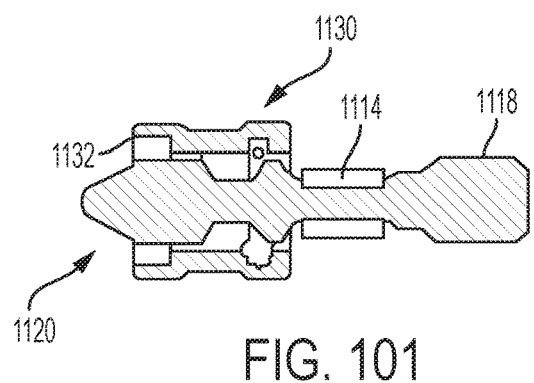
FIG. 101 is a cross-sectional view of the screw driving bit and floating magnet sleeve shown in FIG. 100.

With reference to FIGS. 98-101, in another embodiment, a 1.5 inch torsion bit 1110 is shown including a torsion zone having dual torsion sub-zones 1112, 1114 separated by an intermediate shoulder 1126, similar to the 2.5 inch torsion bit 1010 shown in FIGS. 93-97. The remaining reference numerals designate the same or similar elements as those referenced in Figures FIGS. 93-97 with a leading "11" instead of a leading "10". The floating sleeve 1130 has a design similar to the floating sleeve 170 in FIGS. 12A-12C, although it should be understood that the floating sleeve 1130 can be similar to any of the other floating sleeves disclosed elsewhere in this application. The torsion bit 1110 differs from the torsion bit 1010 in that the first torsion sub-zone 1112 has a length L1 that is shorter than a length 12 of the second torsion sub-zone 1112, with both torsion sub-zones 1112, 1114 having the same diameter D. As shown in FIGS. 100 and 101, the length L1 of sub-zone 1112 has been selected for desired movement of the above-described floating magnet sleeve 1130. The length L and diameter D of the torsion zone 1111 has been optimized according to the principles of the present disclosure. It should be noted that although a 1.5 inch and 2.5 inch torsion bit is shown, other lengths of torsion bits can be utilized with an optimized torsion zone (whether including one or multiple torsion zones) according to the principles of the present disclosure.

Figure 107:
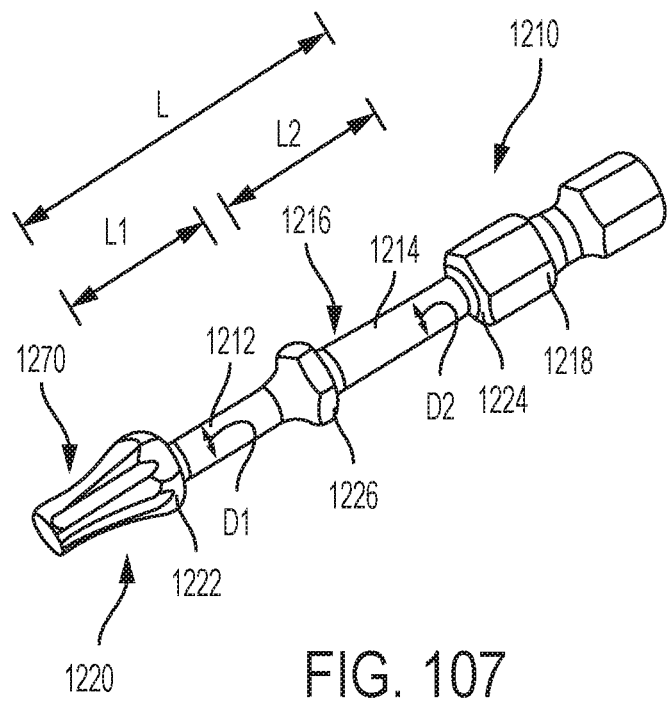
FIG. 107 is a perspective view of another embodiment of a screw driving bit with two torsion zones and a star tip according to the principles of the present disclosure.

As illustrated in FIG. 107, in another embodiment, a working region 1220 of a torsion tool bit 1210, similar to the torsion bit 1010, can be provided with a star tip 1270 or other alternative shapes. With reference to FIG. 107, the torsion tool bit 1210 is formed from a shaft 1216 having a polyogonal (e.g., hex-shaped) shank 1218 at a first end, and a fastening bit tip or working region 1220 disposed at a second end. The shank 1218 includes an annular groove 1219 that is configured to receive a retaining member in a bit holder of a power tool. The shaft 1216 includes the torsion zone 1211, which in this example, includes a pair of torsion sub-zones 1212, 1214 defined by a pair of reduced diameter regions disposed between two shoulders 1222, 1224 and an intermediate shoulder 1226. The pair of torsion sub-zones 1212, 1214 allow the shaft 1216 to twist to absorb forces while the tool bit 1210 is being used to drive a fastener. The torsion tool bit is particularly well suited for use with an impact tool that delivers drive impulses at high speeds and at high toque levels. The two torsion sub-zones 1212, 1214 can have the same or different lengths L1, L2 and the same or different diameters D1, D2, while the torsion zone 11 has an overall length L.

Figure 108:
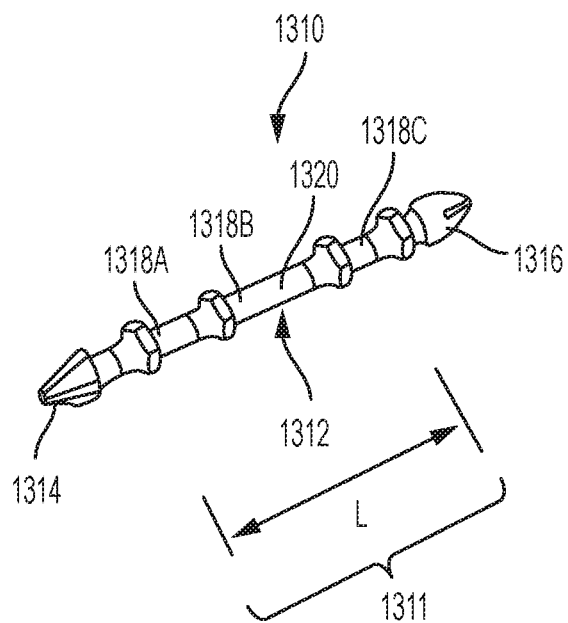
FIG. 108 is a perspective view of another embodiment of a screw driving bit having bit tips at opposite ends and multiple torsion zones according to the principles of the present disclosure.

With reference to FIG. 108, in another embodiment, a double ended tool bit 1310 is shown including a shaft 1312 with a first working portion (e.g., screw driving head) 1314 at a first end and a second working portion (e.g., a screw driving head) 1316 at a second end. The shaft 1312 includes a torsion zone 1311 having three reduced diameter torsion sub-zones 1318A-1318C. The combined torsion zones 1318A-1318C can be optimized with the overall torsion zone 1311 having a combined length (L) and diameter (d) that have been optimized according to the method of the present disclosure, as described above. The torsion sub-zones 1318A, 1318C are of equal length and are longer than the torsion sub-zone 1318B. The torsion sub-zone 1318B can be provided with a shrink band 1320 for branding. A pair of ball grooves 1320 are disposed adjacent to the tips 1314, 1316 which are used for securing the bit 1310 within a bit holder or chuck. The ball grooves are of a shorter length and a shallower depth that the sub-torsion zones 1318A, 1318B, 1318C.

Figure 109:
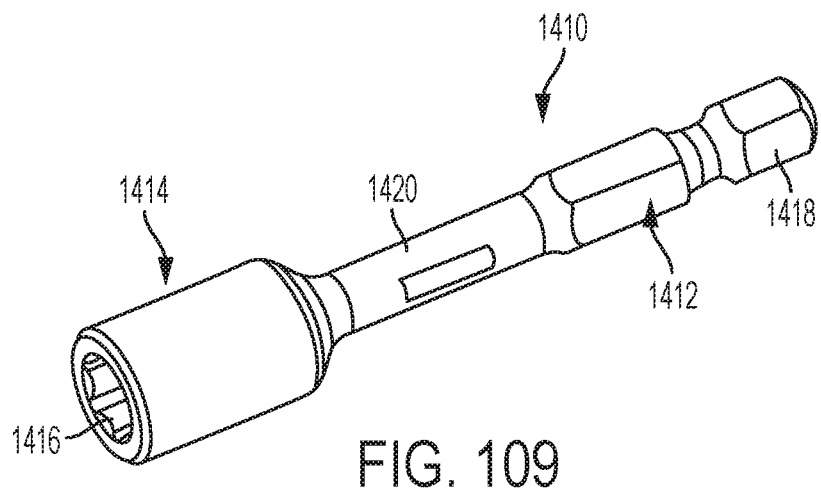
FIG. 109 is a perspective view of a nut driver having an optimized torsion zone according to the principles of the present disclosure.
Figure 110:
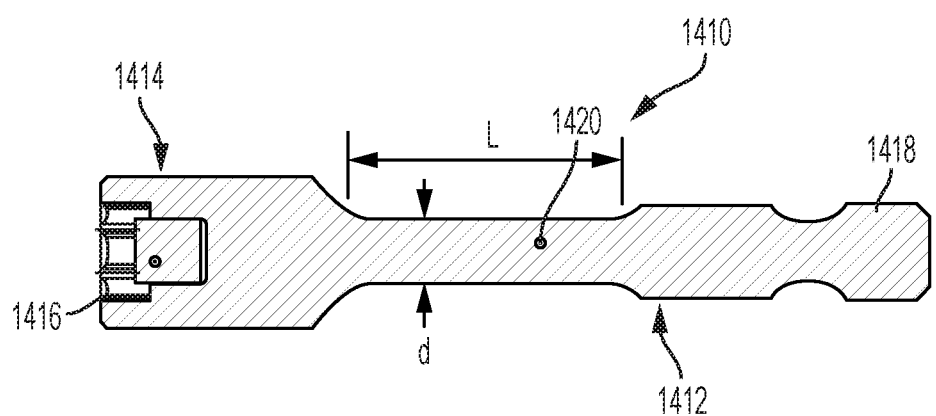
FIG. 110 is a cross-sectional view of the nut driver shown in FIG. 109.

With reference to FIGS. 109 and 110, in another embodiment, a nut setter bit 1410 is shown including a shaft 1412 having a working end 1414 having a recessed cavity 1416 for receiving a hex head of a screw or a nut and a shank 1418. A reduced diameter torsion zone 1420 is disposed between the working end 1414 and the shank 1418. The torsion zone 1420 has a length (L) and diameter (d) that have been optimized according to the method of the present disclosure, as described above.

Figure 111:
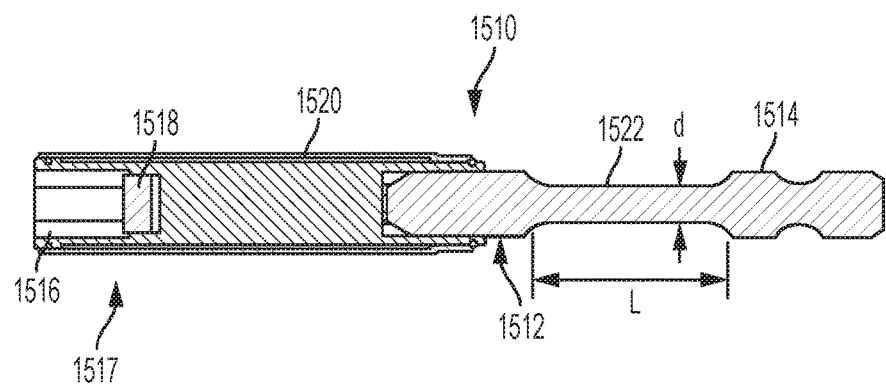
FIG. 111 is a cross-sectional view of a magnetic drive guide having a drive shank with an optimized torsion zone according to the principles of the present disclosure.

With reference to FIG. 111, in another embodiment, a magnetic drive guide 1510 is shown including a shaft 1512 having a shank 1514 at a first end and a bit receiving cavity 1516 at a second working end 1517. The second working end 1517 can be formed integral with or as a separate attachment to the shaft 1512. A magnet 1518 can be disposed within the cavity 1516 and a sliding sleeve 1520 can be slidably received on an outer surface of the working end for guiding an elongated screw received within the sleeve 1520. The shaft includes a reduced diameter torsion zone 1522. The torsion zone 1522 has a length (L) and diameter (d) that have been optimized according to the method of the present disclosure, as discussed above, with a bit received in the drive guide.

Figure 106:
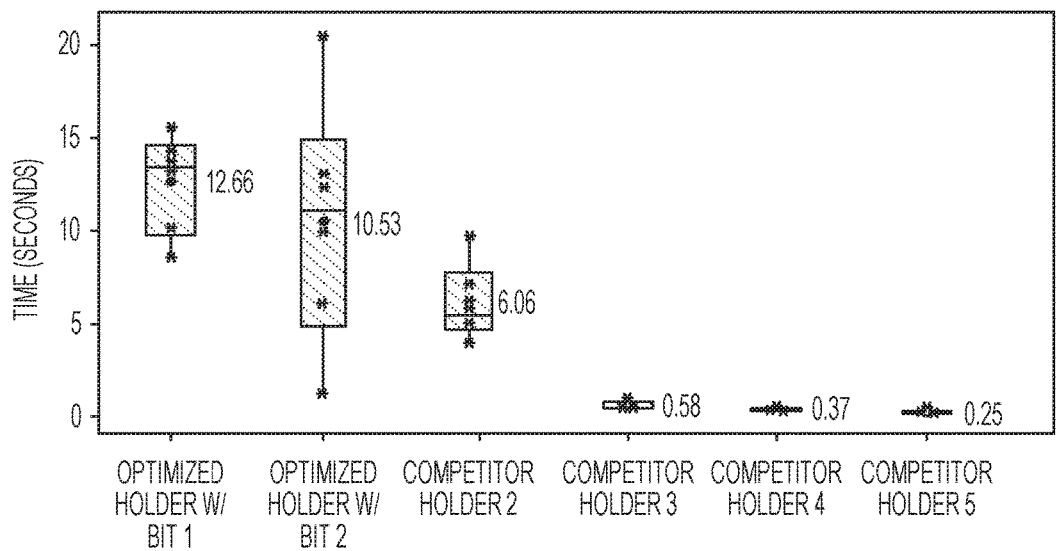
FIG. 106 is a plot illustrating the runtime in seconds until breakage of several 1 inch bit tips held by several bit holder samples.
Figure 112:
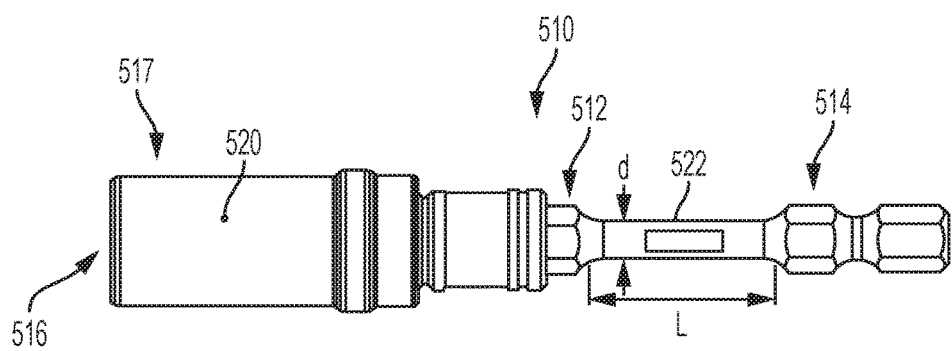
FIG. 112 is a side view of a bit holder and having a drive shank with an optimized torsion zone according to the principles of the present disclosure.

With reference to FIG. 112, a bit holder 1610 and floating magnet sleeve 1620 is shown, which is similar to the bit holder 800 and floating magnet sleeve 810 shown in FIGS. 86-88C. The bit holder 1610 differs from the bit holder 800 in that it includes a shaft 1612 with a reduced diameter torsion zone 1622. The torsion zone 1622 has a length (L) and diameter (d) that have been optimized according to the method of the present disclosure with a bit received in the bit holder 1610. FIG. 106 is a graph showing the run time until breakage of the bit holder 1610 when holding a Phillips #2 1-inch bit tip in the holder, as compared to several competitor bit holders. The average time until breakage for the optimized tool bit holder 1610 was 12.66 seconds (with far less variability) as compared to 10.53 seconds for the next closest design, with each of the remaining competitor designs having significantly less time until breakage.

The length and diameter of the torsion zones in the other disclosed embodiments of tool bits and tool bit holders (e.g., those shown in FIGS. 22-26, 28-29, 33-35, 37-38, 40-41, 43-44, 47-49, 54-56, 64-66, 70-71B, 76-77, 82-85, and 89-93) may be optimized according to the method of the present disclosure, as described above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A fastener driving tool, comprising:
a shaft with a working region disposed at a first end of the shaft and configured to drive a fastener, a shank portion disposed proximate a second end of the shaft and configured to couple the shaft to a power tool, and a reduced diameter torsion zone disposed between the shank portion and the working region, the torsion zone extending from a first shoulder closer to the working region to a second shoulder closer to the shank portion, wherein a length (L) and radius (c) of the torsion zone have been determined based on an equation

$$\phi = T\left(\frac{2L}{\pi \cdot c^4}\right)\frac{1}{G}$$

where φ is an angle of twist, T is a torque input, and G is a shear modulus of the shaft, such that the length (L) and the radius (c) of the torsion zone have been optimized so that approximately half of breakages occur in the working region and approximately half of breakages occur in the torsion zone.

2. The fastener driving tool of claim 1, wherein the working region comprises one of a fastening bit tip and a holder for a fastening bit.

3. The fastener driving tool of claim 1, wherein the torsion zone comprises a first reduced diameter torsion zone extending from the first shoulder to an intermediate shoulder between the first and second shoulders, and a second reduced diameter torsion zone extending from the intermediate shoulder to the second shoulder, the length (L) extending from the first shoulder to the second shoulder.

4. The fastener driving tool of claim 3, wherein each of the first and second torsion zones has the radius (c).

5. The fastener driving tool of claim 3, wherein the first torsion zone has a first length (L1) and the second torsion zone has a second length (L2) that is equal to the first length (L1).

6. The fastener driving tool of claim 5, further comprising a band around one of the first and second torsion zones.

7. The fastener driving tool of claim 3, wherein the first torsion zone has a first length (L1) and the second torsion zone has a second length (L2) that is different from the first length (L1).

8. The fastener driving tool of claim 1, further comprising a floating sleeve having a radially inwardly projecting retention member and a magnet at a front end of the sleeve, the floating sleeve receivable over the shaft with the retention mechanism received in the torsion zone such that the floating sleeve may move axially between a forward position in which the magnet is proximate the working region and able to engage a fastener being driven by the working region and a rearward position in which the retention member abuts the second shoulder.

9. The fastener driving tool of claim 8, wherein the retention member comprises one of an O-ring, a C-ring, a hog ring, a flexible finger, and a ball received in a window with a spring band biasing the ball radially inward.

10. The fastener driving tool of claim 8, wherein the retention member comprises one of an O-ring, a C-ring, a hog ring, a flexible finger, and a ball received in a window with a spring band biasing the ball radially inward.

11. The fastener driving tool of claim 1, wherein the torsion zone comprises a first torsion sub-zone having a length L1 of approximately 8 mm to approximately 12 mm and a second torsion sub-zone having a length L2 of approximately 10 mm to approximately 15 mm, and the radius (c) of the first torsion sub-zone and the second torsion sub-zone each are approximately 1.6 mm to approximately 2.0 mm.

12. A fastener driving tool, comprising:
a shaft with a first working region disposed at a first end of the shaft and configured to drive a fastener, a second portion disposed proximate a second end of the shaft and configured to couple the shaft to a power tool, and a reduced diameter torsion zone disposed between the second portion and the first working region; and
a floating sleeve having a radially inwardly projecting retention member and a magnet at a front end of the sleeve, the floating sleeve receivable over the shaft with the retention mechanism received in the torsion zone such that the floating sleeve may move axially between a forward position in which the magnet is proximate the working region and able to engage a fastener being driven by the working region and a rearward position in which the magnet is retracted from the working region, wherein a length (L) and radius (c) of the torsion zone have been determined based on an equation $$\phi = T\left(\frac{2L}{\pi \cdot c^4}\right)\frac{1}{G}$$

where φ is an angle of twist, T is a torque input, and G is a shear modulus of the shaft such that the length (L) and the radius (c) of the torsion zone have been optimized so that approximately half of breakages occur in the working region and approximately half of breakages occur in the torsion zone.

13. The fastener driving tool of claim 12, wherein the first working region comprises one of a fastening bit tip and a holder for a fastening bit.

14. The fastener driving tool of claim 12, wherein the torsion zone comprises a first reduced diameter torsion zone extending from a first shoulder, which is closer to the first end, to an intermediate shoulder, and a second reduced diameter torsion zone extending from the intermediate shoulder to a second shoulder, which is closer to the second end, the length (L) extending from the first shoulder to the second shoulder.

15. The fastener driving tool of claim 14, wherein each of the first and second torsion zones has the radius (c).

16. The fastener driving tool of claim 14, wherein the first torsion zone has a first length (L1) and the second torsion zone has a second length (L2) that is equal to the first length (L1).

17. The fastener driving tool of claim 14, wherein the first torsion zone has a first length (L1) and the second torsion zone has a second length (L2) that is different from the first length (L1).

18. The fastener driving tool of claim 14, further comprising a band around one of the first and second torsion zones.

19. The fastener driving tool of claim 12, further comprising a second working region disposed at the second end of the shaft and configured to drive a fastener, and wherein the first end of the shaft is further configured to couple the shaft to a power tool.

20. The fastener driving tool of claim 12, wherein the torsion zone comprises a first torsion sub-zone having a length L1 of approximately 8 mm to approximately 12 mm and a second torsion sub-zone having a length L2 of approximately 10 mm to approximately 15 mm, and the radius (c) of the first torsion sub-zone and the second torsion sub-zone each are approximately 1.6 mm to approximately 2.0 mm.

* * * * *